(12) United States Patent
Dribus

(10) Patent No.: US 12,293,290 B2
(45) Date of Patent: May 6, 2025

(54) SPARSE LOCAL CONNECTED ARTIFICIAL NEURAL NETWORK ARCHITECTURES INVOLVING HYBRID LOCAL/NONLOCAL STRUCTURE

(71) Applicant: Benjamin Forrest Dribus, Hattiesburg, MS (US)

(72) Inventor: Benjamin Forrest Dribus, Hattiesburg, MS (US)

(*) Notice: Subject to any disclaimer, the term of this patent is extended or adjusted under 35 U.S.C. 154(b) by 588 days.

(21) Appl. No.: 16/928,219

(22) Filed: Jul. 14, 2020

(65) Prior Publication Data

US 2021/0073642 A1 Mar. 11, 2021

Related U.S. Application Data

(60) Provisional application No. 62/890,615, filed on Aug. 23, 2019.

(51) Int. Cl.
*G06N 3/082* (2023.01)
*G06N 3/04* (2023.01)
*G06N 3/063* (2023.01)

(52) U.S. Cl.
CPC .............. *G06N 3/082* (2013.01); *G06N 3/04* (2013.01); *G06N 3/063* (2013.01)

(58) Field of Classification Search
CPC ........... G06N 3/082; G06N 3/04; G06N 3/063
See application file for complete search history.

(56) References Cited

U.S. PATENT DOCUMENTS

| | | | |
|---|---|---|---|
| 11,315,018 B2* | 4/2022 | Molchanov | G06N 3/082 |
| 2006/0287842 A1* | 12/2006 | Kim | G01N 29/0609 |
| | | | 702/183 |
| 2017/0060958 A1* | 3/2017 | Van Rest | G06F 16/9024 |
| 2018/0027004 A1* | 1/2018 | Huang | H04L 63/1425 |
| | | | 726/23 |
| 2018/0219888 A1* | 8/2018 | Apostolopoulos | |
| | | | G06F 16/9024 |
| 2019/0087529 A1* | 3/2019 | Steingrimsson | G06F 16/2465 |
| 2019/0278593 A1* | 9/2019 | Elango | G06F 8/447 |
| 2020/0207339 A1* | 7/2020 | Neil | G06V 20/58 |
| 2020/0382377 A1* | 12/2020 | Cohen | H04L 45/48 |

OTHER PUBLICATIONS

Geometric deep learning: going beyond Euclidean data (Bronstein et al., May 3, 2017) (Year: 2017).*
"Positive-homogeneous operators, heat kernel estimates and the Legendre-Fenchel transform" (Randles et al., Dec. 21, 2016) (Year: 2016).*

(Continued)

*Primary Examiner* — Jason B Dunham
*Assistant Examiner* — Huma Waseem
(74) *Attorney, Agent, or Firm* — Andrew Morabito

(57) ABSTRACT

The present invention in a first embodiment is a method of constructing a geometry-induced sparse local connected network architecture, the method comprising: choosing a geometry, choosing a direction of data flow in the geometry, choosing a node set as a finite subset of the geometry, choosing local edges between each node and nodes in preceding layers with respect to the geometry and direction of data flow, and choosing sparse nonlocal edges between each node and nodes in preceding layers with respect to the geometry and direction of data flow.

20 Claims, 14 Drawing Sheets

(56) References Cited

OTHER PUBLICATIONS

"The Many Aspects of Counting Lattice Points in Polytopes" (Jesús A. De Loera, 2005) (Year: 2005).*
"Topological maps and robust hierarchical Euclidean skeletons in cubical complexes" (Michel Couprie, Dec. 1, 2012) (Year: 2012).*
Sinha et al. ("Deep Learning 3D Shape Surfaces Using Geometry Images", 2016) (Year: 2016).*

\* cited by examiner

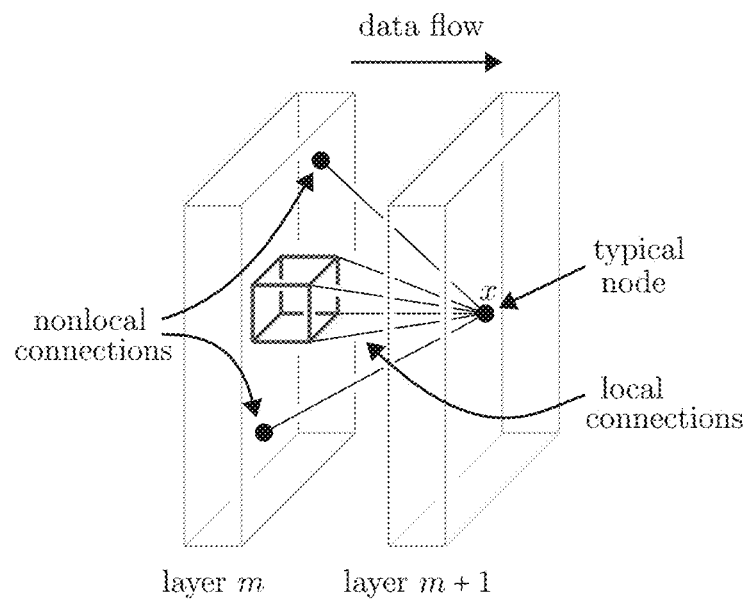
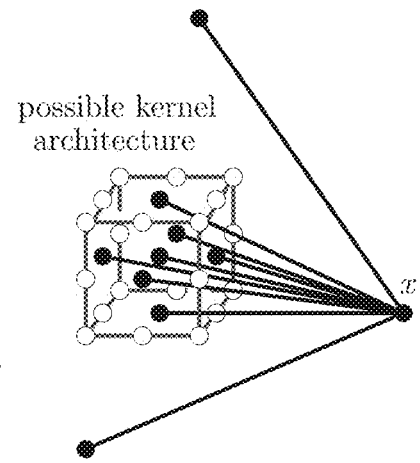
FIG. 1A
FIG. 1B
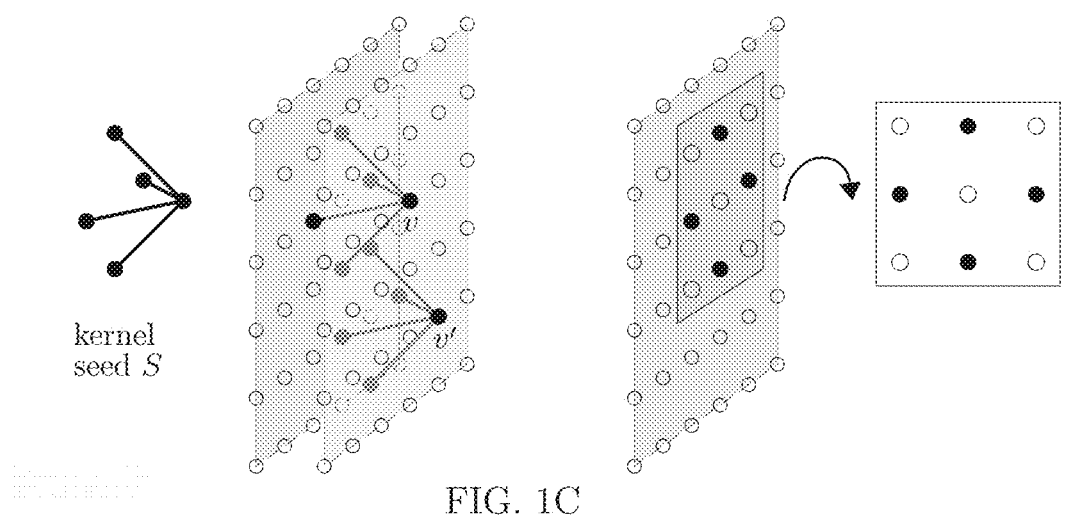
FIG. 1C

SPARSE LOCAL CONNECTED ARTIFICIAL NEURAL NETWORK ARCHITECTURES INVOLVING HYBRID LOCAL/NONLOCAL STRUCTURE

CROSS-REFERENCE TO RELATED APPLICATIONS

This application is a continuation (and claims the benefit of priority under 35 USC 120) of U.S. application No. 62/890,615 filed Aug. 23, 2019. The disclosure of the prior applications is considered part of (and is incorporated by reference in) the disclosure of this application.

BACKGROUND OF THE INVENTION

The present invention relates to the construction of artificial neural networks (ANNs) in the field of machine learning and artificial intelligence, and more particularly to convolutional neural networks (CNNs) and their generalizations, focusing on three technical problems elaborated below, namely, the problems of achieving sparsity, locality, and connectivity in such networks.

Artificial neural networks (ANNs) are central to modern machine learning and have revolutionized such fields as image classification, speech recognition, vehicle navigation, and game strategy.

An ANN consists of nodes, analogous to biological neurons, connected via edges, analogous to biological synapses. It processes data by converting real-valued inputs to real-valued outputs via activation functions. It is trained to minimize a loss function, which measures the error of actual outputs for training samples whose correct outputs are known. The arguments of the loss function are the parameters characterizing the network. The number of such parameters is the parameter space dimension of the network, roughly determined by its number of edges and its degree of weight sharing. If the network has few edges relative to its size, then it is called sparse. If most of its edges connect "nearby" nodes, then it is called local. If a large proportion of its node pairs, particularly input-output pairs, are connected by directed paths, then it is called highly connected.

Convolutional neural networks (CNNs) are special graded or layered types of feedforward neural networks (FNNs), i.e., nonrecurrent or acyclic ANNs, in which each non-input node is connected to a local kernel of nodes in the previous layer. CNNs are modeled after biological vision systems. CNNs typically have low parameter space dimension due to relatively small kernel size and significant weight sharing. Their architecture is relatively sparse and local, but not necessarily highly connected. Adding local connections to the entire 3×3×3 cube of nodes in FIG. 1, and omitting nonlocal connections, gives an example of a 3-dimensional CNN kernel architecture, which leads to a 4-dimensional CNN. Diagram 3 of FIG. 4 shows a 2-dimensional CNN.

CNNs are the most successful ANNs to date. This success has led to the term "CNN" acquiring a broader meaning, namely, any ANN whose principal functionality depends on the use convolutional layers employing a special type of kernel architecture, which essentially performs a uniform inner product in the linear algebra sense. By contrast, a pure CNN means an ANN with only convolutional layers and possibly pooling layers, which combine nearby outputs in previous layers.

A common problem for pure CNNs is low connectivity. In particular, a typical output may have only a small perceptive field in the input layer. In popular classification problems, this shortcoming limits the sensitivity of the classification categories associated with the outputs (e.g., "dog" or "cat") in responding to the entire range of inputs (e.g., pixels). Pure CNNs are therefore often augmented by adding dense (fully-connected) layers. However, dense layers drastically increase the parameter space dimension of the network, and hence the computational cost to train it. An oft-cited example is the 16-layer VGG network, whose dense layers comprise about 90% of its edges. Diagram 6 in FIG. 4 shows a small 2-dimensional network with three dense layers.

Empirical and theoretical evidence demonstrates that sparse network architectures are often possible, meaning that only a small percentage of possible edges need actually be used to obtain high performance. Even without special design, network training tends to induce functional sparsity, though at high computational cost. Recent research linking machine learning to Hamiltonian mechanics demonstrates that basic structural properties such as symmetries and locality, common to most physical and information-theoretic problems, naturally promote functional sparsity. For example, photographic images inherit locality from the geometry of the physical space of their subjects.

Some success has already been achieved in constructing sparse, highly-connected network architectures. Established methods to achieve this include (a) functional sparsity via training; (b) pruning edges during or after training; and (c) a priori sparse architectures.

Functional sparsity via training. Training induces correlations among the edge weights of an ANN. The simplest type of correlation occurs when many weights approach zero. Training methods explicitly favoring weight reduction, such as Tikhonov regularization, have produced favorable results. Remaining edges with significant weights then constitute a sparse residual network. A drawback of this method is that it requires significant computational cost to achieve what could, in principle, be accomplished via better original architecture.

Pruning edges during or after training. Pruning, inspired by biological synaptic pruning, may be applied to a network to eliminate unnecessary edges entirely, rather than just functionally suppressing them. Pruning may be carried out dynamically as part of the training process, or it may be imposed a posteriori when training has already achieved functional sparsity. Either method requires computation to identify which edges to prune, although dynamic pruning can limit cost by progressively "locking in" architectural improvements.

A priori sparse architectures. Sparse network architectures constructed a priori, rather than achieved via training or pruning denser networks, have been studied only recently. One fruitful innovation has been to allow edges that skip layers, thereby carrying information directly from the "distant past" to the "distant future" in an ANN. Influential examples of such architectures are ResNets and DenseNets. More recent architectures such as X-Nets and RadiX-Nets employ novel graph-theoretic constructions within individual layers. Highly-connected sparse networks of this type have already produced efficient and accurate results. However, such architectures tend to lack local feature-extraction capabilities. Diagram 2 in FIG. 4 shows a small RadiX-Net.

To summarize, well-known ANN architectures such as CNNs combine the two properties of sparsity and locality, and recent architectures such as X-Nets and RadiX-Nets combine the two properties of sparsity and connectivity. However, there remains a shortage of architectures that combine all three properties of sparsity, locality, and connectivity in a systematic and effective way. The sparse, local connected architectures provided by the present invention help to address this deficiency.

SUMMARY

The present invention in a first embodiment is a method of constructing a geometry-induced sparse local connected network architecture, the method comprising: choosing a geometry, choosing a direction of data flow in the geometry, choosing a node set as a finite subset of the geometry, choosing local edges between each node and nodes in preceding layers with respect to the geometry and direction of data flow, and choosing sparse nonlocal edges between each node and nodes in preceding layers with respect to the geometry and direction of data flow.

The present invention in a second embodiment is a method of constructing a geometry-induced sparse local connected network architecture, the method comprising: choosing a node set consisting of a finite subset of a union of lattices in a finite-dimensional Euclidean space, choosing a direction of data flow as one of the axes of the Euclidean space, choosing local edges between each node and nodes in preceding layers defined by a family of kernel architectures with respect to the Euclidean space and direction of data flow, and choosing sparse nonlocal edges between each node and nodes in preceding layers via a weighted-random edge-selection process with respect to the Euclidean space and direction of data flow.

The present invention in a third embodiment is a method of constructing a geometry-induced sparse local connected network architecture, the method comprising: choosing a node set consisting of a subset of a union of lattices inside a closed convex polytope in a finite-dimensional Euclidean space, gluing together one or more pairs of equivalent faces of the polytope to obtain a quotient space, choosing as a direction of data flow one of the axes of the original Euclidean space not producing cycles under the gluing operation, choosing local edges between each node and nodes in preceding layers defined by a family of kernel architectures with respect to the quotient space and direction of data flow, and choosing sparse nonlocal edges between each node and nodes in preceding layers via a weighted-random edge-selection process with respect to the quotient space and direction of data flow.

BRIEF DESCRIPTION OF THE DRAWINGS

FIG. 1A shows a schematic of an SLC-network, with a zoomed-out view of local and non-local connections between two consecutive layers terminating at a particular node x, in accordance with one embodiment of the present invention.

FIG. 1B shows a schematic of an SLC-network, with a zoomed-in view of local and non-local connections between two consecutive layers terminating at a particular node x, in accordance with one embodiment of the present invention.

FIG. 1C shows a metrically-homogeneous kernel architecture with kernel seed S, along with a shorthand "domino" diagram for encoding such kernel seeds in the case of 2D kernels, in accordance with one embodiment of the present invention.

DETAILED DESCRIPTION OF THE INVENTION

Figure 2:
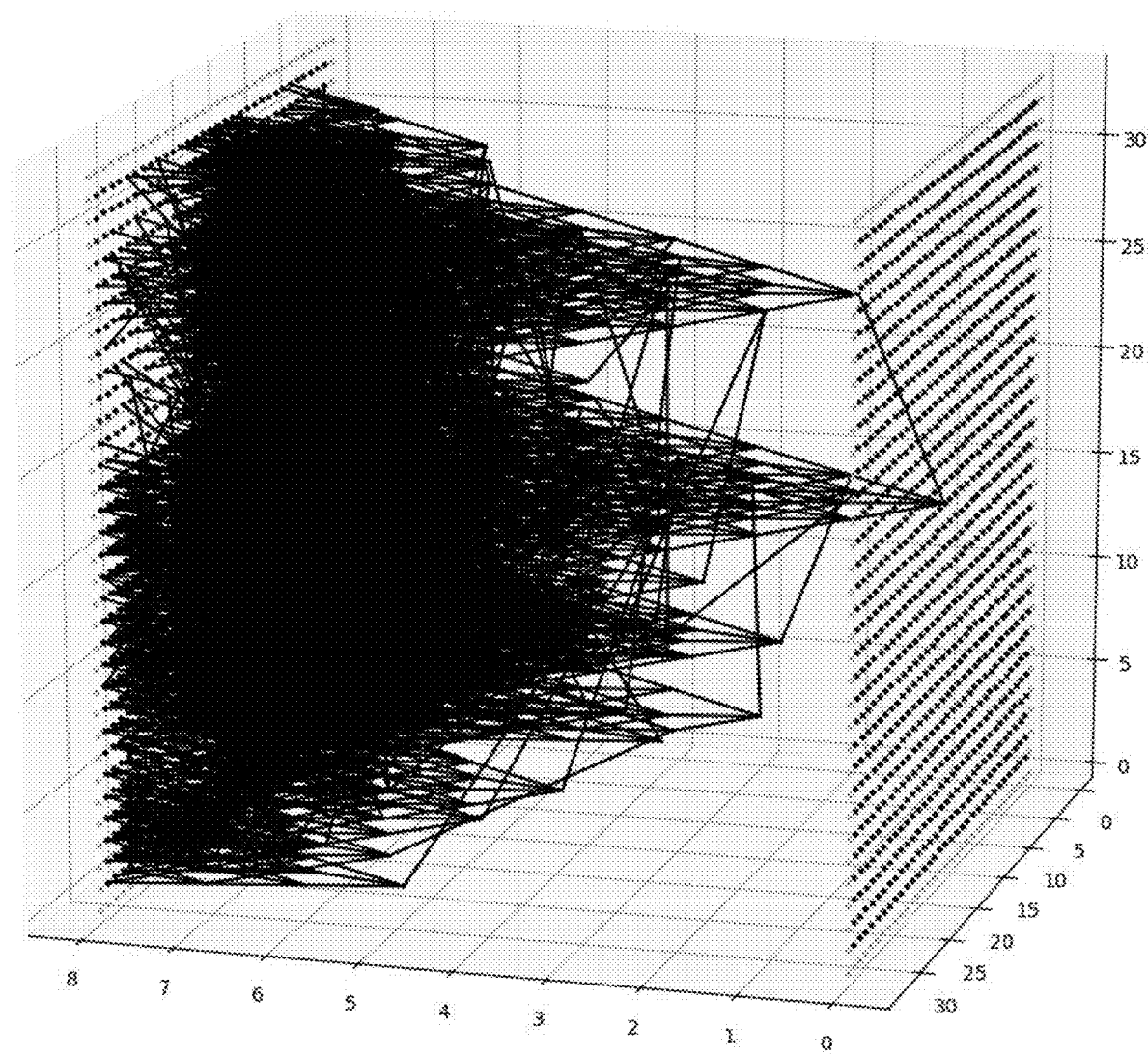
FIG. 2 shows the perceptive field of an output node in a 32×32×8 SLC-network called a Diamond4 or D4-net, in accordance with one embodiment of the present invention.

The present invention provides novel architectures for artificial neural networks (ANNs), which simultaneously exhibit extreme sparseness, local structure similar to that of convolutional neural networks (CNNs), and connectivity similar to that of dense networks. They are called SLC-networks, where "S" stands for "sparse," "L" for "local," and "C" for "connected." Sparsity means minimizing the number of edges or synapses in an ANN to reduce parameter-space dimensions and improve training efficiency. Locality means enhancing local feature-extraction abilities in an ANN, similar to those exhibited by a CNN. Connectivity means achieving sufficient connectivity in an ANN to ensure flexible training potential. SLC-networks combine local structure, usually defined via a kernel architecture, with sparse nonlocal structure, usually defined via a weighted-random edge-selection process, thereby enhancing both feature extraction ability and flexible training potential. FIG. 1A shows a schematic illustration of an SLC architecture, while FIG. 2 shows the self-similar structure of the perceptive field of an output node in a small representative SLC-network. Two specific embodiments of the invention are the main focus, namely, certain hybrid lattice-Euclidean (HLE) architectures in which the nodes or neurons are lattice points in an n-dimensional Euclidean space, and certain hybrid lattice-torus (HLT) architectures, which are similar except that equivalent pairs of faces of a closed cell in a lattice containing the node set are glued together to form a multiply-connected geometry.

The present invention also provides network architecture construction algorithms (NACAs) to construct such architectures. They are specifically designed to enhance sparsity, locality, and connectivity. These algorithms produce families of specific ANN architectures, including:
  (a) Hybrid lattice-Euclidean networks (HLE-nets) combining a metrically-homogeneous deterministic local kernel architecture with a nonlocal edge-addition process.
  (b) HLE-nets combining two metrically-homogeneous deterministic kernel architectures, one local and one nonlocal.
  (c) HLE-nets constructed via a generally non-deterministic metric-dependent edge-selection process producing both local and nonlocal structure.
  (d) Hybrid lattice-torus networks (HLT-nets) with combinations of local/nonlocal structure analogous to those described for HLE-nets.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements or use of a "negative" limitation.

As a whole this application provides the necessary theory to interpret the Description of Architectures and the Enumerated Claims.

The following standard mathematical notation and terminology is used for basic mathematical objects. $\mathbb{N}$ denotes the natural numbers $\{0, 1, 2, \ldots\}$. $\mathbb{Z}$ denotes the integers. $\mathbb{R}$ denotes the real numbers. For non-negative real numbers a and b, the notation a<<b means that a is much less than b, usually by orders of magnitude. I denotes the closed unit interval $[0,1] \subset \mathbb{R}$ R. $S^n$ denotes the n-dimensional sphere, not necessarily of unit size. $A^n$ denotes the n-fold Cartesian product $A \times \ldots \times A$ of a set A. The sphere $S^n$ is an exception. $T^n$ denotes the n-dimensional torus $S^1 \times \ldots \times S^1$, often viewed as the quotient space $\mathbb{R}^n / \mathbb{Z}n$, or a scaled version, where the term quotient space and the notation $\mathbb{R}^n / \mathbb{Z}Z^n$ mean that all elements of $\mathbb{Z}^n$ are identified or "glued together." A convex polytope in $\mathbb{R}^n$ is a compact subset of $\mathbb{R}^n$ given by intersecting a finite number of closed half-spaces, i.e., regions on one side of a hyperplane. A face of a convex polytope is the intersection of its boundary and a lower-dimensional plane, not necessarily a hyperplane. Two faces of convex polytope are equivalent if there exists a smooth map between them identifying faces of equal dimensions in a one-to-one manner. A quotient space of a convex polytope is a space defined by gluing together one or more pairs of equivalent faces. A lattice in $\mathbb{R}^n$ means an additive subgroup of $\mathbb{R}^n$ isomorphic to $\mathbb{Z}^n$. $\mathbb{Z}^n$ itself is an integer lattice, while certain other lattices such as the lattice corresponding to the equilateral triangular tiling of $\mathbb{Z}^2$ are non-integer lattices. A lattice in a subset of $\mathbb{R}^n$ is the intersection of a lattice in $\mathbb{R}^n$ with the subspace. A lattice in a quotient space of $\mathbb{R}^n$ or a subset of $\mathbb{R}^n$ is the image of a lattice in $\mathbb{R}^n$ or a subset of $\mathbb{R}^n$ under the quotient map, whenever this makes sense. For example, if $\Lambda$ is the square integer lattice in $\mathbb{R}^2$, then $\mathbb{R}^2/\Lambda$ is homeomorphic to the torus $T^2$, and the square half-integer lattice $\Lambda'$ on $\mathbb{R}^2$ descends to a four-point lattice on $T^2$. $T^2$ may be equivalently viewed as a quotient space of a square (a special two-dimensional convex polytope) given by "gluing together" opposite sides. As another example, if $\Lambda$ is the cubic integer lattice in $\mathbb{R}^3$, D is a large closed regular dodecahedron containing several hundred lattice points, and X is the quotient space given by gluing together two of the six pairs of pentagonal faces of D, then the resulting "lattice" in X may contain all the same points, but with different distance relations among them due to the multiply-connected structure of the quotient space. Unprimed and primed notation A and A' denotes objects in the same category, not differentiation. Element-inclusion notation $a \in A$, subset notation $A \blacksquare \subset A'$, and list notation $a_1, \ldots, a_n$, are used. Set-builder notation {elements|conditions} is used; for example, the set difference A-A' means $\{a | a \in A \text{ but } a \notin A'\}$. |A| denotes the cardinality of a set A. sup and inf denote supremum and infimum. ø denotes the empty set.

The following standard mathematical notation and terminology is used for functions, maps, and morphisms. Mapping notation $f: A \to A'$ denotes a function between sets A and A'. The terms "function" and "map" are used interchangeably. Category-theoretic terminology involving morphisms, such as injective, surjective, and bijective, is used. Composition of functions $f: A \to A'$ and $h: A' \to A''$ is denoted by $h \circ f$. Restriction of a map $f: A \to A'$ to a subset $B \subset A$ is denoted by $f|_B$. The image $f(A)$ of a map $f: A \to A'$ is the subset of A' consisting of all elements of the form $f(a)$ for some $a \in A$. The notation $f \equiv a'$ means that $f(a)=a'$ for all $a \in A$. $Id_A$ denotes the identity function on a set A. $A \cong A'$ denotes isomorphism in the appropriate category, and $\langle A \rangle$ denotes the isomorphism class of A. If maps $f_i: A_i \to A'$ agree on intersections $A_i \cap A_j$, then the union $f = \cup_i f_i$ is defined by setting $f(a) = f_i(a)$ for any i such that $a \in A_i$.

The following standard mathematical notation and terminology is used for manifolds. (X,g) denotes a pseudo-Riemannian manifold, i.e., a real manifold X equipped with a pseudo-Riemannian metric g. X may be used as an abbreviation. A coordinate system on an open subset U of X is a diffeomorphism $\psi: U \to \mathbb{R}^n$, where n is the dimension of X. $\mathbb{R}^n$ itself is assumed to have the Euclidean metric and the unique coordinate system $\psi_x$ induced by the Cartesian product x unless stated otherwise. Quotient spaces such as the n-dimensional torus $T^n = \mathbb{R}^n / \mathbb{Z}^n$, or quotient spaces involving convex polytopes, are assumed to have the quotient metric unless stated otherwise. A subset U of X is called convex if all geodesics connecting two elements x and y of U are contained in U. The convex hull Conv(U) of a subset U of X is the intersection of all convex subsets of X containing U.

Structural notions such as homogeneity, or descriptive quantities such as radii, sometimes require different definitions with respect to different types of structure. Examples are used to clarify how such subtleties are treated here:

(a) A family of nodes in a network may be homogeneous in the loose graph-theoretic sense that each node has an equivalent family of neighbors, or in the stronger metric sense that these neighbors are arranged equivalently with respect to some ambient geometry. Incorporating non-architectural details, the family may be homogeneous in the algebraic sense that equivalent edges are assigned equal weights. These different notions are called g-homogeneity, n-homogeneity, and a-homogeneity, respectively.

(b) A graph-theoretic neighborhood U of a node v in a network may possess an $\mathbb{N}$-valued undirected g-radius, which measures the smallest number of single-edge steps necessary to reach any node in U from v while ignoring edge directions, an $\mathbb{N}$-valued directed g-radius, which requires such steps to fit together into a directed path, and a $\mathbb{R}$-valued n-radius, which measures the "actual maximal distance" away from v in U with respect to some ambient geometry.

Graph-theoretic description of networks: An ANN may be described in terms of nodes and edges. For example, a strictly-graded ANN might be described as consisting of M+1 layers of L nodes each, including input and outputs, with each node connected by edges to specified nodes in neighboring layers. Each edge has a weight, and each node combines signals arriving along these edges and processes them, with their appropriate weights, via an activation function, possibly incorporating additional bias parameters. This description harmonizes with the biological inspiration for ANNs and is easy to conceptualize.

Algebraic description of networks: The same ANN may be described purely in terms of weight matrices, activation functions, and bias vectors. From this viewpoint, the ANN consists of a sequence of L weight matrices $W_l$, bias vectors $b_l$, and vectors of activation functions $f_l$, where the action of layer l is understood as conversion of the data vector $x_l$ to the data vector $x_{l+1} = f_l(W_l x_l + b_l)$. Different numbering conventions are possible. This description harmonizes with how ANNs are actually implemented on ordinary computers. The graph-theoretic and algebraic descriptions are functionally equivalent. Given the graph-theoretic description, the weights, biases, and activation functions may be assembled into the appropriate matrices and vectors. Conversely, given the algebraic description, layer numbers and sizes may be identified from the number and dimensions of the weight matrices, and which edges are functionally present may be determined by identifying nonzero entries in these matrices. The graph-theoretic description is followed here because the invention is architectural; values of weights, biases, or activation functions are not specified and may vary. Absent the need for such purely algebraic data, the algebraic description is less convenient because it suppresses powerful motivating notions from topology and geometry.

Digraphs

This section provides graph-theoretic definitions and terminology to enable precise description of ANN architectures.

Definition (digraphs): A directed graph or digraph G consists of a set of nodes V, a set of edges E, and initial and terminal node maps $\alpha, \omega: E \to V$, such that for each pair of nodes $v, v' \in V$, there is at most one edge e satisfying $\alpha(e)=v$ and $\omega(e)=v'$.

A digraph G is often represented as a quadruple (V, E, $\alpha$, $\omega$), particularly in definitions that reference the structural ingredients V, E, $\alpha$, and/or $\omega$. Use of the symbol V for the node set of G is a carryover from abstract graph theory, where nodes are typically called vertices. V and E are assumed to be finite. E may be defined, equivalently, to be a subset of V×V. Under either definition, an edge is uniquely specified by its initial and terminal nodes, but the definition here generalizes better and meshes with the scientific references. When considering multiple digraphs simultaneously, subscripts such as $V_G, E_G, \alpha_G$ and $\omega_G$ may be used to specify structural ingredients of G.

Definition (subgraphs and dual graphs): Let G=(V, E, $\alpha$, $\omega$) be a digraph. A subgraph of G is a digraph N=($V_N$, $E_N$, $\alpha_N$, $\omega_N$), where $V_N \subset V$, $E_N \subset E$, and $\alpha_N$ and $\omega_N$ are restrictions of $\alpha$ and $\omega$ to $E_N$, with images in $V_N$. N is called node-complete if $V_N = V$. The family of all node-complete subgraphs of G is denoted by N. The union N∩N' of two subgraphs N=($V_N$, $E_N$, $\alpha_N$, $\omega_N$) and N'=($V_{N'}$, $E_{N'}$, $\alpha_{N'}$, $\omega_{N'}$) of G is the subgraph (V∪V', E∪E', a∪a', ω∪ω'). The dual graph N* of a node-complete subgraph N of G is the node-complete subgraph with edge set $E-E_N$.

The symbol N is used for a subgraph to evoke the word "network," because ANN architectures are realized as subgraphs N of an "ambient digraph" G. The mathscript symbol $\mathcal{N}$ is later used for probabilistic G-networks, which may be viewed as weighted families of subgraphs N. Node-complete subgraphs are the main focus, since optimizing ANNs of a specified shape involves choosing edges for a fixed node set. Important exceptions are the small local subgraphs involved in kernel architectures. Unions of subgraphs make sense because the maps involved are all restrictions of $\alpha$ and $\omega$. Notions such as paths and connectivity are defined for a subgraph N of a digraph G, rather than for G itself, since G typically plays the role of an "ambient universal object" with standard uniform properties, while N is viewed as a specific ANN architecture.

Definition (digraph morphisms): Let $G=(V, E, \alpha, \omega)$ and $G'=(V', E', \alpha', \omega')$ be digraphs. A morphism $\phi: G \to G'$ from G to G' is a pair of maps $\phi_V: V \to V'$ and $\phi_E: E \to E'$ such that $\alpha'(\phi_E(e))=\phi_V(\alpha(e))$ and $\omega'(\phi_E(e))=\phi_V(\omega(e))$ for every edge $e \in E$. The image $\phi(G)$ of a morphism $\phi: G \to G'$ is the subgraph of G' with node set $\phi_V(V)$, edge set $\phi_E(E)$, and initial and terminal element maps defined by restricting $\alpha'$ and $\omega'$ in the obvious way. If $\phi: G \to G'$ is a morphism and $N'=(V_{N'}, E_{N'}, \alpha_{N'}, \omega_{N'})$ is a subgraph of G', then the inverse image $\phi^{-1}(N')$ is the subgraph of G with node set $\phi_V^{-1}(V_{N'})$, edge set $\phi_E^{-1}(E_{N'})$, and initial and terminal element maps defined by restricting $\alpha$ and $\omega$ in the obvious way. The identity morphism $\mathrm{Id}_G: G \to G$ is the pair of identity set maps $(\mathrm{Id}_{V_G}, \mathrm{Id}_{E_G})$. An isomorphism between G and G' is a morphism $\phi: G \to G'$ with inverse $\psi: G' \to G$, meaning that $\psi \circ \phi = \mathrm{Id}_G$ and $\phi \circ \psi @= \mathrm{Id}_{G'}$. The notation $G \cong G'$ means that G and G' are isomorphic. The isomorphism class $<G>$ of G consists of all digraphs G' isomorphic to G. A monomorphism $\phi: G \to G'$ is a morphism such that the induced morphism $\phi: G \to \phi(G)$ is an isomorphism.

Digraph morphisms identify when two digraphs possess the same or similar abstract structure. For the definition of $\phi^{-1}(N')$ to make sense, it must be true that $\alpha(e) \in \phi_V^{-1}(V_{N'})$ whenever $e \in \phi_E^{-1}(E_{N'})$, and similarly for $\omega(e)$. This follows by unwinding the definition: $e \in \phi_E^{-1}(E_{N'})$ means that $\phi_E(e) \in E_{N'}$, which means that $\alpha'(\phi_E(e))=\phi_V(\alpha(e)) \in V_{N'}$ by the definition of a morphism, which means that $\alpha(e) \in \phi_V^{-1}(V_{N'})$ as desired. The same argument applies to $\omega(e)$. Often only the isomorphism class of a digraph matters, since isomorphic network architectures are functionally equivalent. In a kernel architecture, different representatives of an isomorphism class may play different roles at different locations in an ANN. Morphisms are defined in terms of "ambient" digraphs G and G' rather than subgraphs N and N' because it is frequently necessary to consider the ambient structure.

Definition (paths): Let $N=(V_N, E_N, \alpha_N, \omega_N)$ be a subgraph of a digraph G, and let $v, v' \in V_N$ be nodes. A (undirected) path $\beta$ between v and v' in N is a sequence of edges $e_1, \ldots, e_n \in E_N$ such that for each $1 \le m \le n-1$, two of the nodes $\alpha_N(e_m), \omega_N(e_m), \alpha_N(e_{m+1})$, and $\omega_N(e_{m+1})$ coincide, and the two "left over" nodes are v and v'. The length $l(\beta)$ of $\beta$ is its number of edges n. Nodes v and v' are called weakly connected in N if there is a path between them in N. A directed path $\gamma$ from v to v' in N is a path with edges $e_1, \ldots, e_n$ such that $\omega_N(e_m)=\alpha_N(e_{m+1})$ for all $1 \le m \le n-1$, $\alpha_N(e_1)=v$, and $\omega_N(e_n)=v'$.

Definition (connectivity for nodes): Let $N=(V_N, E_N, \alpha_N, \omega_N)$ be a subgraph of a digraph G, and let $v, v' \in V_N$ be nodes. Then v and v' are called strongly connected, and v' is said to be accessible from v, in N, if there is a directed path from v to v' in N. A path is called edge-simple if its edges are distinct. It is called node-simple if the initial and terminal nodes of its edges are distinct. A (directed) cycle in N is a nontrivial directed path in N from a node v to itself.

Definition (connectivity for subgraphs): Let $N=(V_N, E_N, \alpha_N, \omega_N)$ be a subgraph of a digraph G, and let $v, v' \in V_N$ be nodes. N is called weakly connected or topologically connected if every pair of nodes $v, v' \in V_N$ is weakly connected in N. N is called strongly connected if every pair of nodes $v, v' \in V_N$ is strongly connected in N.

Path length $l(\beta)$ is a graph-theoretic g-length, distinct from the metric m-length defined below. Intuitively, connected nodes v and v' are strongly connected if the edge directions along some path connecting them "agree." Strong connectivity is a directed property, since there may exist a directed path from v and v' but not from v' and v. Weak connectivity is an undirected property; if v and v' are weakly connected, then so are v' and v. Acyclic digraphs are the main focus here, since the invention defines feedforward neural networks (FNNs). N is called acyclic if it has no directed cycles.

Definition (minimal and maximal nodes): Let $N=(V_N, E_N, \alpha_N, \omega_N)$ be a subgraph of a digraph G, and let $v \in V_N$ be a node. Then v is called minimal in N if there is no edge $e \in E_N$ such that $\omega_N(e)=v$, and maximal in N if there is no edge $e \in E_N$ such that $\alpha_N(e)=v$. If v is minimal or maximal, then it is called extremal.

Minimal and maximal nodes are used here principally to define sets $V^{\pm}$ of input and output nodes in a corresponding ANN architecture. Extremal nodes in the ambient digraph G are automatically extremal in any subgraph N. A major focus of subgraph selection processes defined below is to produce subgraphs N sharing the same minimal and maximal nodes as G. This is because G itself is typically chosen so that its extremal nodes satisfy input/output requirements determined by the data to be analyzed and the possible outcomes of the analysis.

Definition (horizons): Let $N=(V_N, E_N, \alpha_N, \omega_N)$ be a subgraph of a digraph G, $v \in V_N$ a node, $W \subset V_N$ a family of nodes, and m a natural number. The degree-m future horizon $\sigma_{N,m}^+(v)$ of v in N is the set of nodes $v' \in V_N$ such that there is a directed path of length m from v to v' in N. The degree-m future horizon $\sigma_{N,m}^+(W)$ of W in N is $\bigcup_{v \in W} \sigma_{N,m}^+(v)$. The degree-m past horizon $\sigma_{N,m}^-(v)$ of v in N is the set of nodes $v' \in V_N$ such that there is a directed path of length m from v' to v in N. The degree-m past horizon $\sigma_{N,m}^-(W)$ of W in N is $\bigcup_{v \in W} \sigma_{N,m}^-(v)$.

Horizons measure the rate at which sets of nodes strongly connected to a node v grow as one moves away from v. If G is graded, then $\sigma_{N,m}^{\pm}(v)$ are the "cross-sections of N at distance m from v." Similar intuition applies more generally. In relativistic physics, "horizons" in spacetime are defined to be boundaries rather than cross sections, but the latter are easier to generalize to non-geometric settings. In a random digraph, horizons grow exponentially until they are limited by the overall size of the graph. In a local "geometric" digraph such as a typical CNN, horizons grow much more slowly, like a fixed power of the distance. The union $W_1: \sigma_{N,1}^-(W) \cup \sigma_{N,1}^-(W)$ is the set of nearest neighbors of elements of W in N. $W_1-W$ is the corresponding set of strict nearest neighbors.

Definition (posets): Let A be a set and $<$ a binary relation on A, i.e., a subset of $A \times A$. The binary relation $<$ is called a strict partial order, and the pair $(A, <)$ is called a partially ordered set or poset, if $<$ is irreflexive (meaning that for all $a \in A, a \not< a$) and transitive (meaning that given three elements a, b, and c in A, if $a \prec b \prec c$, then $a \prec c$). A strict partial order $\prec$ on A is called total if $a \prec b$ or $b \prec a$ for each pair of distinct elements a and b in A.

Posets are closely related to digraphs. In fact, posets may be defined as special acyclic digraphs, but they are separated here for clarity. The term "strict" means that $\prec$ relates only distinct elements. It is therefore analogous to the "less than" relation $\leq$ on $\mathbb{Z}$, rather than the non-strict "less than or equal to" relation $\leq$. Here the most important strictly-totally-ordered sets are $\mathbb{Z}$ and its subsets, such as $\mathbb{N}$ and finite discrete intervals. Partial orders are used below to define gradings on digraphs. When designing an ANN architecture, such a grading defines the layers of the ANN.

Definition (special discrete subsets): Let n be a non-negative integer. The nth discrete interval $I_n$ is the subset $\{1, \ldots, n\} \subset \mathbb{Z}$. The discrete hyperrectangle of dimensions $k_1 \times \ldots \times k_m$ is the Cartesian product $I_{k_1} \times \ldots I_{k_m} \subset \mathbb{Z}^m$, where $k_1, \ldots, k_m$ are positive integers. In particular, the mth discrete hypercube of edge length n, denoted by $I_n^m$, is the m-fold Cartesian product $I_n \times \ldots \times I_n \subset \mathbb{Z}^m$.

$I_n$ inherits the strict total order<from $\mathbb{Z}$. A lexicographic strict total order may be defined on a discrete hyperrectangle $I_{k_1} \times \ldots I_{k_n}$, but a strict partial order induced by the strict total order on one of the factors $I_{k_m}$ is typically used instead, since this corresponds to the direction of information flow in an ANN. Typical CNNs have hyperrectangular layers and kernels. Adding local connections to the entire 3×3×3 cube of nodes in FIG. 1A, and omitting the nonlocal connections, gives an example of a 3-dimensional hyperrectangular CNN-type kernel. ANN architectures provided by the present invention often use hyperrectangular layers, but may not use hyperrectangular kernels, since other shapes are often more efficient. For example, the actual connections shown in FIG. 1A define a novel octahedral kernel.

Definition (poset morphisms): A morphism $\psi: (A, \prec) \to (A', \prec')$ of posets is a set map $\psi: A \to A'$ such that $\psi(a) \prec' \psi(b)$ in A' whenever $a \prec b$ in A.

Definition: Let $G=(V, E, \alpha, \omega)$ be an acyclic digraph. Define a partial order $\prec$ on V by setting $v \prec v'$ whenever v and v' are strongly connected in G. A grading on G is a poset morphism $v: (V, \prec) \to (\mathbb{Z}, <)$. The grading v is called strict if $v(\alpha(e))+1=v(\omega(e))$ for any edge $e \in E$.

A strictly-graded digraph is its own transitive reduction, since a strict grading forbids an edge from v to v' whenever there is a longer path from v to v'. A grading v on a digraph G induces a grading on any subgraph N of G by restriction. However, not every grading on N is the restriction of a grading on G. For example, N may be acyclic but G may contain cycles. Here, gradings are defined in terms of G rather than a subgraph N because subgraph gradings are almost always induced. Typical CNNs are strictly graded, while ANNs with "layer-skipping edges" such as ResNets and DenseNets are graded, but not strictly graded. The "levels" of a grading may be called layers or generations. The word "layer" can mean either a level along with its incoming edges (or just the edges themselves), while "generation" always refers exclusively to nodes. With this convention, a network with L layers has L+1 generations, where generation 0 is the input nodes. Non-input generations and layers are then in 1-1 correspondence.

Definition (digraph transitivity): Let $G=(V, E, \alpha, \omega)$ be a digraph, and let $v, v' \in V$ be nodes. G is called transitive if there is an edge directly from v to v' in G whenever there is a directed path from v to v' in G. The transitive closure Tr(G) of G is the smallest transitive digraph containing G as a subgraph. It is constructed by adding an edge from v to v' whenever there is a directed path from v to v', if this edge is not already present in G. An edge $e \in E$ is called reducible in G if there is a directed path of length at least 2 from $\alpha(e)$ to $\omega(e)$ in G. The transitive reduction Red(G) is the smallest node-complete subgraph of G with the same accessibility properties as G. It is constructed by deleting every reducible edge in G.

The recipe to construct Red(G) does not apply to infinite posets or digraphs; for example, every relation $a \prec b$ in $\mathbb{Q}$ is reducible. Only the finite case is needed for the purposes of the invention. Transitivity is defined in terms of G rather than a subgraph N because subgraphs used to define ANN architectures are rarely transitive. The transitive closure is used principally to define when the ambient digraph G is dense, which occurs when Tr(G) is full in an appropriate sense.

A useful method to construct a graded digraph G is to embed a set of nodes V into an (n+1)-dimensional real manifold X via a map $f: V \to X$, then use one of the local coordinates t on X to define the directions of edges. G may be regarded a posteriori as structurally independent of X, so X is said to induce a grading on G via the embedding $f$. An obvious modification of this idea applies to subspaces of X or quotient spaces of such subspaces that may include lower-dimensional singular regions (i.e., they may be orbifolds), but the manifold case is described here for simplicity.

Definition (compatible coordinates): Let X be an (n+1)-dimensional real manifold, $x, x' \in X$ points, and $\{U_i\}_{i \in J}$ a family of open subsets of X, where $J$ is some index set. Coordinate systems $\psi_i := (x_i, t_i)$ on $U_i$ and $\psi_j := (x_j, t_j)$ on $U_j$ are called compatible if they satisfy the condition that $t_i(x) < t_i(x')$ if and only if $t_j(x) < t_j(x')$ for every $x, x' \in U_i \cap U_j$. The family of coordinate systems $\Psi := \{(x_i, t_i)\}_{i \in J}$ is called compatible if its members are pairwise compatible.

Definition (coordinate-induced grading): Let $G=(V, E, \alpha, \omega)$ be a digraph, X a real manifold, and $f: V \to X$ an injective map. Let $\{U_i\}_{i \in J}$ be a family of open subsets of X covering $f(V)$, equipped with a compatible family of coordinate systems $\Psi := \{(x_i, t_i)\}_{i \in J}$. The map $f$ is called a compatible embedding with respect to $\Psi$ if $t_i(f(\alpha(e))) < t_i(f(\omega(e)))$ for any edge $e \in E$ such that $\alpha(e), \omega(e) \in U_i$. The union of images $\cup_{i \in J} t_i(f(V))$ forms a finite subset of $\mathbb{R}$, uniquely isomorphic as a strictly totally ordered set to a unique discrete interval $I_n$. The resulting induced map $v_f: V \to I_n \hookrightarrow \mathbb{Z}$ is called the grading on G induced by $f$. The full digraph $F_{f,\Psi}(V)$ over V with respect to $f$ induced by $\Psi$ is the digraph with edge set $E_F$ containing an edge from v to v' whenever $t_i(f(v)) < t_i(f(v'))$ for some $i \in J$. G is called dense with respect to $f$ if $Tr(G) = F_f(V)$. G is called dense reduced with respect to $f$ if $Tr(G) = F_f(V)$ and $Red(G) = G$.

For the purposes of the invention, compatibility need prevail only on the finite set $f(V)$. Familiar "dense" ANNs are special cases of this construction, where $X = \mathbb{R}^{n+1}$, and where $f$ maps V to a subset of the integer lattice $\mathbb{Z}^{n+1} \subset \mathbb{R}^{n+1}$. Often such networks are dense reduced, omitting "layer-skipping edges." $\mathbb{R}^{n+1}$ is inadequate to naturally induce all such gradings. For example, $S^2 \times \mathbb{R}$ is more natural for large time-dependent networks on the surface of the earth. The focus of the present invention is on Euclidean spaces and tori. The notation "$t_i$" for the coordinates used to define edge directions is intended to evoke the "arrow of time." X has n "space dimensions" for inputs, and 1 "time dimension" for information flow. Feed-forward networks (FFNs) may be defined using a "global time coordinate" t. In this case, X may be chosen to be a cylinder, i.e., a Cartesian product $B \times \mathbb{R}$, where the "base" B defines "spatial structure" in the network, and the "fiber" $\mathbb{R}$ defines "temporal structure." While G is usually dense, G-networks used here to define ANN architectures are usually sparse. This is because G defines possible connections, while the ANN itself defines active connections. Since F, G and the various subgraphs N of G arising in network construction typically share the same node set V, terms such as "dense," "sparse," "local," or "connected," are sometimes applied to a subset of $E_F$, understood to mean the full subgraph of F corresponding to that subset.

Definition (initial/terminal digraphs): Let $K_2$ and $K_{v'}$ be digraphs containing nodes v and v'. $K_v$, viewed as a pair $(K_v, v)$ consisting of a digraph and a distinguished node, is called a pointed digraph. A morphism of pointed digraphs $\phi$: $(K_v, v) \to (K_{v'}, v')$ is a morphism of digraphs $K_v \to K_{v'}$, that maps v to v'. A terminal digraph is a pointed digraph $(K_v, v)$ such that every node of $K_v$ is strongly connected to v. An initial digraph is a pointed digraph $(K_v, v)$ such that v is strongly connected to every node of $K_v$.

Initial and terminal digraphs help identify when two nodes v and v' in a subgraph N of a digraph G possess local graph-theoretic neighborhoods with the same abstract structure. This leads to the notion of g-homogeneity for a family of nodes. A distinct metric notion called m-homogeneity is introduced below. Another notion is algebraic a-homogeneity, which generalizes the idea of weight-sharing in a typical CNN. Choice of the symbol "K" reflects use of pointed digraphs to define kernel architectures below. Pointed digraphs are defined independently from the usual context of an "ambient" digraph G and subgraph N, because it is useful to think of $K_v$ as defining an "extrinsic kernel geometry" that is mapped into G. Images, isomorphisms, etc. for pointed digraphs are defined in the obvious ways. Special isomorphism classes are introduced below.

Definition (g-radius): Let $(K_v, v)$ be a weakly-connected pointed digraph. $\ell$ The directed g-radius of (K,v) is $\sup_{v'} (\inf_{\gamma} ( \ell (\gamma)))$, where for each $v' \in K$, $\gamma$ ranges over all directed paths connecting v' and v in either order.

g-radius captures the idea of "how many edges away" one can travel from the distinguished node in a pointed digraph. Analogous metric radii are discussed below. It is useful to organize isomorphism classes of pointed digraphs by directed g-radius.

Definition (g-radius classes): Let r be a non-negative integer. $S_r$ denotes the set of isomorphism classes of finite pointed digraphs of directed g-radius r. $S_r^-$ and $S_r^+$ denote the sets of isomorphism classes of finite terminal and initial digraphs of directed g-radius r, respectively.

Definition (g-stars): Let $N=(V_N, E_N, \alpha_N, \omega_N)$ be a subgraph of a digraph G, and let $v \in V_N$ be a node. The directed graph-theoretic star, or g-star, of radius r at v in N, denoted by $\star_{N,r}(v)$, is the pointed subgraph of N with distinguished node v, which consists of v itself, all nodes connected to v by a directed path $\gamma$ of length at most r in N in either direction, and the connecting edges. The incoming g-star of radius r, denoted by $\star_{N,r}^-(v)$, is the terminal subgraph of $\star_{N,r}(v)$ given by restricting to directed paths $\gamma$ terminating at v. The outgoing g-star of radius r, denoted by $\star_{N,r}^+(v)$, is the initial subgraph of $\star_{N,r}(v)$ given by restricting to directed paths $\gamma$ beginning at v.

Definition (g-homogeneity): Let $N=(V_N, E_N, \alpha_N, \omega_N)$ be a subgraph of a digraph G, and let W be a subset of $V_N$. N is called graph-theoretically homogeneous, or g-homogeneous, to radius r over W, if $\star_{N,r}(v) \cong \star_{N,r}(v')$ for any pair of nodes $v,v' \in W$. N is called g-homogeneous to radius r in the negative direction over W if $\star_{N,r}^-(v) \cong \star_{N,r}^-(v')$ for any pair of nodes $v,v' \in W$. N is called g-homogeneous to radius r in the positive direction over W if $\star_{N,r}^+(v) \cong \star_{N,r}^+(v')$ for any pair of nodes $v,v' \in W$.

Homogeneity for individual subgraphs N generalizes to yield corresponding notions for subgraph selection processes, and thence for G-networks $\mathcal{N}$. Homogeneity in the negative direction is especially important, due to its relationship with kernel architectures. Digraph homogeneity, whether graph-theoretic, metric, or algebraic, is modeled after familiar homogeneity of spacetime or of physical substances such as fluids. In this context, homogeneity is often limited by boundary conditions, such as at the interface of two materials, or near a spacetime singularity such as a black hole. For ANNs, there are at least two different ways to handle inhomogeneities arising from boundary effects. First, padding adds nonfunctional structure near network boundaries, with functional boundary nodes treated provisionally as interior nodes. Padding may be "stripped away" at the end of a network architecture construction algorithm (NACA). For example, orange nodes in FIGS. 2, 3, 10, 11, and 14 are padding nodes. Second, the ad hoc approach acknowledges explicit structural exceptions involving boundary nodes.

Metric Digraphs

This section describes auxiliary metric structure that may be added to digraphs. While digraphs possess intrinsic notions of distance, such as path lengths and g-radii, these notions treat all edges as the same length. ANN applications require separate notions of "short edges," which form local direct connections in a network, and "long edges," which form nonlocal direct connections analogous to dendrites stretching across the brain or wormholes between distant galaxies.

Definition (metric digraphs): Let $G=(V, E, \alpha, \omega)$ be a digraph, and let $N=(V_N, E_N, \alpha_N, \omega_N)$ be a subgraph of G. G is called a metric digraph if it is equipped with a metric function d: $V \times V \to [0, \infty)$. The metric length or m-length l(e) of an edge e between nodes v and v' in G is d(v,v'). The metric diameter or m-diameter $\text{diam}_m(N)$ of N in G is $\sup_{v,v' \in V_N} d(v,v')$. The induced metric on N, also denoted by d, is the restriction of d to $V_N \times V_N$. The average edge length l(N) of N is $$\ell(N) := \frac{1}{|E_N|} \sum_{e \in E_N} \ell(e)$$

A morphism of metric digraphs $\phi$: $(G,d) \to (G', d')$, is a morphism $(\phi_V, \phi_E)$ of digraphs such that $d'(\phi_V(u), \phi_V(v))=d(u,v)$ for any pair of nodes $u,v \in V$.

A metric digraph may be denoted by a pair (G,d), or by just G when the metric d is obvious from context. Unless stated otherwise, d is assumed to possess the "standard metric properties" of identity d(v,v)=0, symmetry d(v, v')=d(v', v), subadditivity $d(v,v'') \leq d(v,v')+d(v',v'')$, and distinguishability $d(v,v') \neq 0$ unless v=v'. The length $\ell$ (e) is specified as m-length to promote clarity even though the only other sensible notion of edge length, namely the g-length, is equal to 1 by definition. Subgraphs are assumed to possess the induced metric unless stated otherwise. If N is a node-complete subgraph, then it shares the same m-diameter as G. Hence, m-diameter is often used to quantify overall network size. The average edge length l(N) is used to define locality of a G-network. Images, isomorphisms (called isometries), etc. for metric digraphs are defined in the obvious ways. Special isometry classes are introduced below.

Definition (manifold-induced metric): Let $G=(V, E, \alpha, \omega)$ be a digraph, $v, v' \in V$ nodes, $(X,g)$ a pseudo-Riemannian manifold, $x, x' \in X$ points, and $f: V \to X$ a compatible embedding with respect to some compatible family $\Psi$ of coordinate systems on an open subset U of X containing $f(V)$. Then the induced metric $d_f$ on G is the metric defined by pulling back the metric g on X along the mapping $f$, i.e., $d_f(v,v'):=g(f(v), f(v'))$, where $g(x,x')$ means the infimum over the lengths of all continuous, piecewise-continuously-differentiable curves from x to x' in X.

V is often defined as a discrete subset of X, after which E, $\alpha$, and $\omega$ are defined via the order-theoretic structure of $\Psi$. The abstract structure of $G=(V, E, \alpha, \omega)$ may then be regarded a posteriori as independent of X, with the relationship between G and X reconstructed via the inclusion embedding $V \hookrightarrow X$. In this case, the induced metric $d_f$ may be denoted by just d. Actual computation of edge lengths is usually much simpler than naïve interpretation of the definition would suggest. For example, for a typical CNN, V is a subset of integer lattice points in $\mathbb{R}^{n+1}$, so the length of an edge between two nodes follows from the Pythagorean theorem.

Definition (subgraph dimension): Let $(X,g)$ be a pseudo-Riemannian manifold, $G=(V, E, \alpha, \omega)$ a digraph, $f: V \to X$ a compatible embedding with respect to some compatible family T of coordinate systems on an open subset U of X containing $f(V)$, and W a subset of V. Then the dimension $\dim_f(W)$ of W with respect to $f$ is the dimension $\dim_X(\text{Conv}(f(W)))$ of the convex hull $\text{Conv}(f(W))$ as a subset of X.

The notion of dimension is useful in defining dimensions of kernel architectures for G. The dimension of $f(W)$ itself as a subset of X is zero, but direct use of manifold dimension is useless for ANNs, since they involve finite sets. While $\dim_f(W)$ does not depend on the family of coordinate systems T, it does depend on the embedding $f: V \to X$. This might raise a question of "meaningfulness" if G were really independent of X and $f$. But the motivation for introducing X in the first place is to construct networks that efficiently process data involving geometric correlations captured by X.

Definition (pointed metric digraphs): Let $(K_v, d)$ and $(K_{v'}, d')$ be metric digraphs containing nodes v and v'. $(K_v, d)$, viewed as a triple $(K_v, d, v)$, is called a pointed metric digraph. A morphism of pointed metric digraphs $\phi: (K_v, d, v) \to (K_{v'}, d', v')$ is a morphism of metric digraphs $(K_v, d) \to (K_{v'}, d')$ that maps v to v'. A terminal metric digraph is a pointed metric digraph $(K_v, d, v)$ such that every node of $K_v$ is strongly connected to v. An initial metric digraph is a pointed metric digraph $(K_v, d, v)$ such that v is strongly connected to every node of $K_v$.

A pointed metric digraph $(K_v, d, v)$ may be denoted by just $K_v$ when the metric d is obvious from context. Images, isometries, etc. for pointed metric digraphs are defined in the obvious ways. Special isometry classes are introduced below.

Definition (m-radius): The metric radius, or m-radius, of a pointed metric digraph $(K_v, d, v)$, is the supremum $\sup_{v' \in K_v} d(v, v')$.

Definition (m-radius classes): Let $\rho$ be a non-negative real number. $S_\rho$ denotes the set of isometry classes of finite pointed metric digraphs of directed m-radius $\rho$. $S_\rho^-$ and $S_\rho^+$ denote the sets of isometry classes of finite terminal and initial metric digraphs of directed m-radius $\rho$, respectively.

Definition (metric local neighborhoods): Let (G,d) be a metric digraph, $N=(V_N, E_N, \alpha_N, \omega_N)$ a subgraph of G, and $v \in V_N$ a node. The directed metric star, or m-star, of radius $\rho$ at v in N, denoted by $\star_{N,\rho}(v)$, is the subgraph of N consisting of v, all nodes along directed paths entirely within distance $\rho$ of v, and the connecting edges. The incoming m-star of radius $\rho$, denoted by $\star_{N,\rho}^-(v)$, is the subgraph of $\star_{N,\rho}(v)$ given by restricting to directed paths $\gamma$ terminating at v. The outgoing m-star of radius $\rho$, denoted by $\star_{N,\rho}^+(v)$, is the subgraph of $\star_{N,\rho}(v)$ given by restricting to directed paths $\gamma$ beginning at v. The directed m-star $\star_{N,\rho}^-(v)$ excludes nodes within distance $\rho$ of v if they are connected to v only via directed paths containing nodes at distance exceeding $\rho$ from v.

Definition (metric homogeneity): Let (G, d) be a metric digraph, $N=(V_N, E_N, \alpha_N, \omega_N)$ a subgraph of G, and W a subset of $V_N$. N is called metrically homogeneous, or m-homogeneous, to radius $\rho$ over W, if $\star_{N,\rho}(v) \cong \star_{N,\rho}(v')$ for any pair of nodes $v, v' \in W$. N is called m-homogeneous to radius p in the negative direction over W if $\star_{N,\rho}^-(v) \cong \star_{N,\rho}^-(v')$ for any pair of nodes $v, v' \in W$. N is called m-homogeneous to radius p in the positive direction over W if $\star_{N,\rho}^+(v) \cong \star_{N,\rho}^+(v')$ for any pair of nodes $v, v' \in W$.

As in the case of g-homogeneity, m-homogeneity in the negative direction is of particular interest due to its relationship with kernel architectures. Like g-homogeneity, m-homogeneity for individual subgraphs generalizes to yield a corresponding notion for subgraph selection processes.

G-Networks

This section introduces G-networks, probabilistic ANN architectures constructed in terms of an ambient digraph G, often equipped with a metric d. Defining a G-network $\mathcal{N}$ involves a subgraph selection process for identifying particular subgraphs N of G, often guided by d. To facilitate simultaneous consideration of multiple networks with different ambient digraphs simultaneously, it is sometimes useful to fix a category $\mathcal{G}$ of digraphs, and call $\mathcal{N}$ a G-network if G belongs to the object class of $\mathcal{G}$.

Definition (subgraph selection processes): Let $G=(V, E, \alpha, \omega)$ be a digraph. A subgraph selection process (SSP) $\mathcal{P}$ for G is a procedure that outputs a subgraph N of G. The support $\text{supp}(\mathcal{P})$ of $\mathcal{P}$ is the family of possible outputs of $\mathcal{P}$.

$\mathcal{P}$ may be interpreted as a probability distribution on the family N of subgraphs of G, i.e., a function $\mathcal{P}: \mathcal{N} \to I$ such that $\Sigma_{N \in \mathcal{N}} \mathcal{P}(N) = 1$. A deterministic SSP is supported at a specific subgraph N of G, i.e., $\mathcal{P}(N)=1$. Other $\mathcal{P}$ are nondeterministic; different process runs may output different subgraphs. The symbol $\mathcal{P}$ is deliberately overloaded (re-used) to mean "process" and "probability." A map such as $\mathcal{P}$ whose source is N may be called a subgraph function for G. In terms of probability, $\text{supp}(\mathcal{P})=\{N \in \mathcal{N} | \mathcal{P}(N) \neq 0\}$. $\mathcal{P}(N)$ is typically assumed to be zero if N is not node $\mathcal{P}$ complete.

Some ANN architectures arise from nondeterministic SSPs. Such processes can represent legitimate architectural innovations for the following reasons:

(a) Nondeterministic methods in computer science often outperform deterministic methods. The literature includes description of superior nondeterministic methods involving problems such as primality testing and various connectivity problems.

(b) Some of the best deterministic methods are derived from nondeterministic methods via de-randomization.

(c) Random structures are notoriously hard to "fake," so it is usually unlikely that architectures indistinguishable from those output by a typical nondeterministic SSP would arise "accidentally" by essentially different means.

(d) Nondeterministic SSPs involved in the present invention are chosen for their specific properties, such as homogeneity and high connectivity. They are well-defined and precise, with only modest variability of functionality in the resulting networks.

(e) Many other physical and/or information-theoretic products are constructed via nondeterministic processes. For example, products involving the synthesis of alloys or composite materials typically rely on random thermodynamic processes to determine small-scale structure.

(f) It is broadly acknowledged that, regardless of the product type, a specific product architecture need not determine the finest details of the product, but only those details necessary to achieve the specific functionality distinguishing it from other products. The SSPs used here satisfy this criterion.

Definition (G-networks): A G-network is a pair $\mathcal{N}=(G, \mathcal{P})$, where G is a digraph and $\mathcal{P}$ is a SSP for G.

G is usually a metric digraph. If $\mathcal{P}$ is nondeterministic, then the word "network" in the phrase "G-network" does not mean a particular subgraph N of G. However, an individual "run" of $\mathcal{P}$ does return a particular N. The ANN architectures provided by the present invention are specific subgraphs N, but they are often "drawn" from nondeterministic G-networks. The notion of a G-network is too general to constitute a specific architectural innovation in its own right. In particular, any subgraph N of G may be realized as a G-network by taking $\mathcal{P}(N)=1$. However, G-networks are useful to describe the specific architectural innovations of the present invention. A complete kernel architecture $\mathcal{K}:=\{\mathcal{K}_v\}_{v\in V}$ for G defines a G-network, since the local probability functions $\mathcal{K}_v$ may be combined to yield probabilities $\mathcal{P}(N)$ of obtaining each subgraph N of G. A nonlocal edge-selection process Q also induces a G-network, but most SSPs provided here combine both types of structure.

Having defined G-networks, it is natural next to define subnetworks and morphisms of networks. Here these notions are needed for just a few specific purposes:

(a) Subnetworks help to distinguish network components with different functions or properties, such as local kernel architectures and complementary nonlocal structures, which are often constructed in different ways in a network architecture construction algorithm (NACA).

(b) Special subnetworks, often identified via training or pruning processes, can sometimes display properties superior to those of their "parent networks;" for example, the TO-nets defined below often exhibit better connectivity uniformity than the D4-nets from which they are derived.

(c) Network morphisms are useful for discussing subnetworks and quotient networks. It is convenient to define subnetworks in terms of subgraphs of an ambient digraph G, rather than in terms of G itself.

Definition (subnetworks): A subnetwork of a G-network $\mathcal{N}=(G,\mathcal{P})$ is a pair (S, Q), where S is a subgraph of G and Q is a SSP for S satisfying the condition that $$Q(N') := \sum_{\{N|S\cap N=N'\}} \mathcal{P}(N),$$

for each member N' of the family $\mathcal{N}(S)$ of node-complete subgraphs of S.

The intuition behind the condition on Q is that it should be possible to re-cover the probability of obtaining N' by first applying the SSP $\mathcal{P}$ to G, then intersecting all the possible outputs with S and grouping together common intersections. The formula for Q fixes a 1-1 correspondence between subgraphs of G and subnetworks of $\mathcal{N}$, i.e., it specifies a unique SSP for every subgraph S. In particular, if $\mathcal{P}$ is deterministic with $\mathcal{P}(N)=1$ for some N, then Q is deterministic with $Q(S\cap N)=1$. For Q to make sense as a probability distribution, it must be true that $\Sigma_{N'\in\mathcal{N}(S)} Q(N')=1$. This follows because each subgraph N of G has a unique intersection $S\cap N$, and therefore contributes to $Q(N')$ for exactly one N'.

Definition (Categorical G-networks): Let G be a category of digraphs. A G-network is a G-network $\mathcal{N}=(G,\mathcal{P})$ for some G in the object class of G. A morphism $\Phi:\mathcal{N}\to\mathcal{N}'$ of G-networks $\mathcal{N}=(G, \mathcal{P}')$ and $\mathcal{N}3=(G', \mathcal{P})$ is a digraph morphism $\phi: G\to G'$ satisfying the condition that $$\mathcal{P}(N)=Q(\phi(N)),$$

where Q is the unique SSP for $\phi(G)$ induced by $\mathcal{P}'$.

This general definition agrees with the case where G is a subgraph of G' and $\phi$ is the inclusion map, since in this case $\phi(N)=N$ and $\mathcal{P}=Q$. The intuition behind the morphism condition given here is that $\mathcal{P}'$ should select (via Q) the same probabilities for each $\phi(N)$ as $\mathcal{P}$ selects for the corresponding N. A naïve alternative condition would be to require that $\mathcal{P}(N)=\mathcal{P}'(\phi(N))$, rather than working in terms of the subnetwork SSP Q induced by $\mathcal{P}'$. This condition would not work well for non-surjective $\phi$, however, because it would limit target networks $\mathcal{N}'$ for morphisms from $\mathcal{N}$ to those with SSPs supported on $\phi(G)$. More generally, the cases in which probability distributions behave well under digraph morphisms are limited, which strongly constrains the behavior of network morphisms. Exploring these possibilities leaves few if any reasonable alternatives to the definition given here, but the analysis is omitted here.

Definition average edge length): Let $G=(V, E, \alpha, \omega)$ be a digraph, and let $\mathcal{N}=(G,\mathcal{P})$ be a G-network. The average edge length $\ell(\mathcal{N})$ of $\mathcal{N}$ is $$\ell(\mathcal{N}) := \sum_{N\in\mathcal{N}(G)} \ell(N),$$

where $\ell(N)$ is the average edge length of an individual subgraph.

Definition (local structure distribution): Let $G=(V, E, \alpha, \omega)$ be a di$\mathcal{N}$ graph, v an element of V, and W a subset of V. Let $\mathcal{N}=(G,\mathcal{P})$ be a G-network. Let S be a pointed digraph of directed g-radius r, and let $\theta:=\langle S\rangle$ be its class in the set $S_r$ of isomorphism classes. Let $\mathcal{N}_v(\theta)$ be the set of node-complete subgraphs N of G such that $\star_{N,r}(v)\cong S$. Define a family of probability distributions $\mathcal{P}_{v,r}$ on $S_r$, one for each node $v\in V$, by setting $$\mathcal{P}_{v,r}(\theta) = \sum_{N\in\mathcal{N}_v(\theta)} \mathcal{P}(N).$$

Then $\mathcal{P}_{v,r}$ is called the local structure distribution to g-radius r for $\mathcal{N}$ at v. $\mathcal{N}$ is called g-homogeneous to g-radius r over W if $\mathcal{P}_{v,r}=\mathcal{P}_{v',r}$ for any pair of nodes v,v'∈W. Local structure distributions $\mathcal{P}_{v,r}^{\pm}$ in the positive and negative directions, with corresponding notions of homogeneity, are defined in the obvious way via the sets $S_r^{\pm}$ of isomorphism classes of initial/terminal digraphs. If G has a metric d, then a pointed metric digraph S of directed m-radius ρ with isometry class θ in the appropriate set $S_\rho$ of isometry classes may be chosen instead, with other steps following mutatis mutandis. The resulting distribution $\mathcal{P}_{v,\rho}$ is called the local structure distribution to m-radius ρ for $\mathcal{N}$ at v. $\mathcal{N}$ is called m-homogeneous to radius ρ over W if $\mathcal{P}_{v,\rho} = \mathcal{P}_{v',\rho}$ for any pair of nodes v,v'∈W. Local structure distributions $\mathcal{P}_{v,\rho}^{\pm}$ in the positive and negative directions, with corresponding notions of homogeneity, are defined in the obvious way via the sets $S_\rho^{\pm}$ of isometry classes of initial/terminal metric digraphs.

Intuitively, $\mathcal{N}$ is homogeneous over W if it selects the same local structures $\mathcal{P}$ with the same probabilities at different nodes in W. An individual "run" of $\mathcal{P}$ may produce different local structures near v, v'∈W, though the differences are often small. This is a manifestation of spontaneous symmetry breaking, in which an intrinsically symmetric process produces asymmetric individual results. An asset of homogeneous ANNs is their flexible training potential. While certain data types are known a priori to exhibit specific correlations, recognizing more obscure relationships is a principal part of the machine-learning task, and cannot be pre-engineered. Homogeneity enables unbiased identification of such relationships.

Kernel Architectures

Figure 5A:
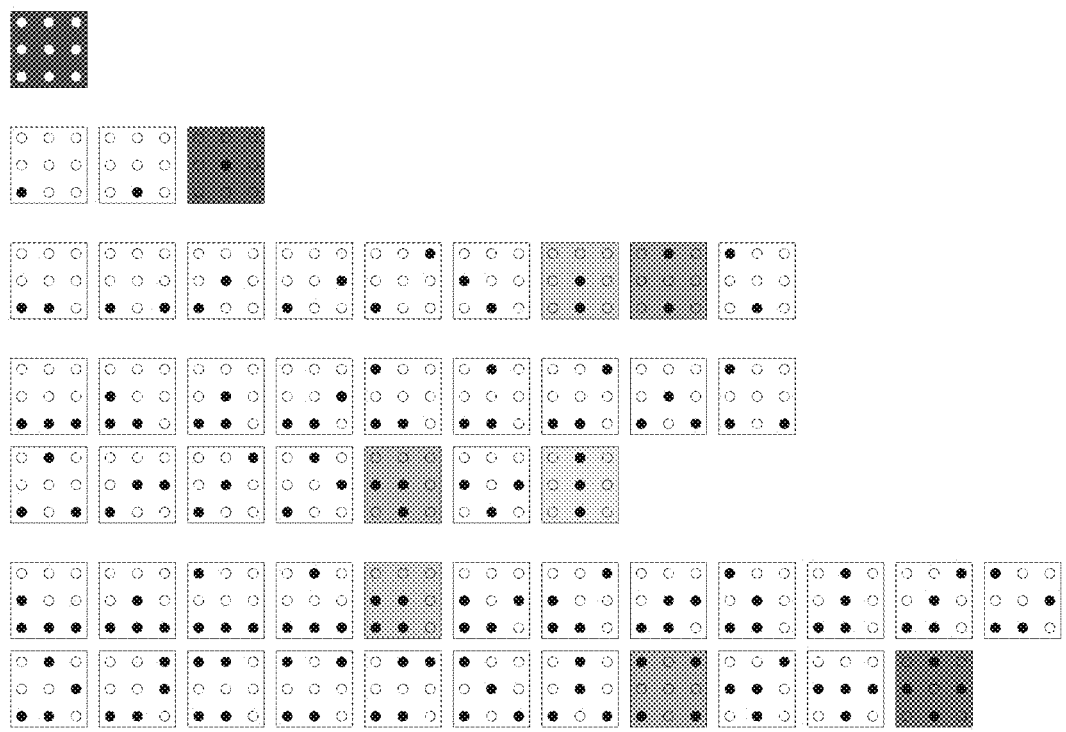
FIG. 5A lists shorthand "domino" diagrams encoding the connections in small kernels of dimension ≤2 in a 3D lattice-Euclidean network, in accordance with several different embodiments of the present invention.

This section introduces kernel architectures, used primarily to generate local structures similar to convolutional neural network (CNN) kernels, with the purpose of facilitating extraction of local features in data. A complete kernel architecture defines a subgraph selection process, and hence a G-network, typically sparse and local. Augmenting a kernel architecture with nonlocal structure improves connectivity, leading to SLC architectures. FIG. 1A shows an octahedral 3D kernel architecture, while FIG. 1B shows a 2D diamond-shaped analogue called Diamond4 or D4. FIG. 5A shows "domino" shorthand for small architectures in networks with 2D rectangular lattice-shaped layers.

A typical CNN kernel consists of edges connecting a hyperrectangle of nodes in one layer to a node in the next layer. Omitting nonlocal connections in FIG. 1A and adding local connections to the entire 3×3×3 cube of nodes gives an example of a 3D CNN-type kernel. Diagram 3 in FIG. 1B shows a 1D kernel architecture in a 2D network, which connects each non-input node to three neighboring nodes in the previous generation. In a CNN, the entire kernel structure at a given node, along with its edge weights, is cloned at other nodes, enabling extraction of similar data features at different locations. The kernel performs the processing task of cross-correlation, imprecisely called convolution. Cloning of edge weights, called weight sharing, results in an algebraic form of homogeneity, or a-homogeneity, stronger than g-homogeneity. Typical CNNs are also m-homogeneous, at least away from their boundaries, since equivalent edges at different locations have equal lengths. The dimension of the hyperrectangle defining a typical CNN kernel is the same as the layer dimension, determined by the application. For example, CNNs for analyzing gray-scale images have 2D kernels, while color requires a third dimension, and video analysis requires a fourth. Kernel uniformity is made possible by special overall network geometry; in particular, the layers of a CNN are typically hyperrectangular, though often of different sizes.

The present invention uses a notion of a kernel architecture more general and flexible than that of a CNN. The same architecture may be combined with weight-sharing for local feature extraction in one application, while being used purely to promote connectivity and computational richness in another. Kernel architectures may also be used to build nonlocal structure. For these reasons, attention is restricted to the architectures themselves, leaving weights to be chosen on an application-dependent basis.

Definition (kernel architecture): Let G=(V, E, α, ω) be a digraph, W a subset of V, and v∈W a node. Let $E_v^-$ abbreviate $E_{\star_{G,1}(v)}^-$, i.e., the set of edges of G terminating at v. A kernel for G at v is a function $\mathcal{K}_v: E_v^- \to I$. The support supp($\mathcal{K}_v$) of $\mathcal{K}_v$ is the nonvanishing set $\{e \in E_v^-: \mathcal{K}_v(e) \neq 0\}$. A subkernel of $\mathcal{K}_v$ is a restriction of $\mathcal{K}_v$ to a subset of supp($\mathcal{K}_v$). The subgraph $K_v$ of $\mathcal{K}_v$ is the subgraph of G whose edge set is supp($\mathcal{K}_v$), and whose node set is the set of all initial and terminal nodes of edges in supp($\mathcal{K}_v$). It is usually viewed as a pointed subgraph $(K_v, v)$. A kernel architecture for G over W is a family $\mathcal{K}: \{\mathcal{K}_v\}_{v \in W}$ of kernels. The support supp($\mathcal{K}$) of $\mathcal{K}$ is the union $\cup_{v \in W}$ supp($\mathcal{K}_v$). A subkernel architecture of supp($\mathcal{K}$) is a family of subkernels, one for each node in W. The subgraph K of $\mathcal{K}$ is the union $\cup_{v \in W} K_v$. $\mathcal{K}$ is called complete if W=V. $\mathcal{K}$ is called deterministic if $\mathcal{K}_v(e) \in \{0,1\}$ for every choice of v and e.

$\mathcal{K}_v(e)$ is interpreted as the probability of including e in the edge set of a node-complete subgraph N of G constructed via the kernel architecture $\mathcal{K}$. Since each edge e possesses a unique terminal node v, the notation $\mathcal{K}_v(e)$ is actually redundant; the notation $\mathcal{K}(e)$ could be used instead. A complete kernel architecture $\mathcal{K}$ is equivalent to a SSP, also denoted by $\mathcal{K}$, where $$\mathcal{K}(N) := \prod_{e \in E_N} \mathcal{K}(e) \prod_{e \in E - E_N} (1 - \mathcal{K}(e)).$$

A deterministic complete kernel architecture $\mathcal{K}$ is equivalent to the node-complete subgraph K of G including precisely those edges e for which $\mathcal{K}(e)=1$. CNN kernel architectures are deterministic by definition. supp($\mathcal{K}_v$) is often restricted to edges connecting v to a small local "patch" of nodes. FIG. 1B illustrates a 4-edge diamond-shaped kernel architecture of this type, called Diamond4 or D4. In the case of 2D layers, it is convenient to represent such a patch via the "domino" shorthand in the right-hand part of FIG. 1B. FIG. 5 shows "domino" shorthand for kernels constructed from a 3×3 patch of nodes. Each "domino" may be used twice; once for the edges connecting to the black nodes, and once for the "dual" edges connecting to the white nodes. FIG. 1A illustrates a similar 3-dimensional octahedral architecture via a "3D domino" shorthand. $\mathcal{K}_v$ is automatically local in a graph-theoretic sense, since it is defined in terms of $\star_{G,1}^-(v)$. However, it need not be "small" or "local" in a metric sense.

A deterministic kernel architecture $\mathcal{K}$ over a node set W ⊂ V "selects its entire subgraph $K_v$ with unit probability at each v∈W." On the other hand, $\mathcal{K}_v$ could assign non-zero connection probabilities between v and all nodes in a previous layer or family of previous layers. Such kernels could be used to define connection probabilities that decay with metric distance rather than exhibiting a sharp cutoff. For example, an approximately local "fuzzy kernel" may be defined using a discretized Gaussian or some other such distribution. Here such nonlocal structures are described in terms of edge-inclusion processes instead. However, any subgraph N of G may be realized via the unique kernel architecture $\mathcal{K}$ for which $\mathcal{K}_v \equiv 1$ on $E_v^- \cap E_N$, and $\mathcal{K}_v$ vanishes elsewhere. The notion of a kernel architecture is therefore too general to constitute a specific architectural innovation in its own right. However, kernel architectures are useful to describe the specific architectural innovations of the present invention.

Definition (local versus nonlocal architectures): Let $G=(V, E, \alpha, \omega)$ be a digraph, $\mathcal{K}=\{\mathcal{K}_v\}_{v \in W}$ a kernel architecture for G over a subset W of V, and v an element of W. $\mathcal{K}_v$ is local if the m-radius k of its subgraph $K_v$ is small compared to $\text{diam}_m(G)$. $\mathcal{K}$ is local if all of its individual kernels are local. $\mathcal{K}_v$ is nonlocal if the m-radius k of its subgraph $K_v$ is comparable to $\text{diam}_m(G)$. $\mathcal{K}$ is nonlocal if any of its individual kernels are nonlocal.

It is unnatural to fix an artificial cutoff for "smallness" of k compared to $\text{diam}_m(G)$. Instead, the ratio $k/\text{diam}_m(G)$ may be used as a measure of the locality of $\mathcal{K}_v$. Finer measures of the locality of $\mathcal{K}_v$ may be chosen, factoring in the precise probabilities assigned by $\mathcal{K}_v$ rather than treating all edges of the subgraph $K_v$ on an equal basis. For example, k might be replaced with the $\mathcal{K}_v$-weighted average of edge lengths in $K_v$. This would allow, for example, nuanced versions of locality for approximately local "fuzzy kernels" Another way to define locality for kernel architectures is in terms of local density, meaning that the subgraph $K_v$ includes edges from a large proportion of previous-layer nodes that are "close" to v, say within the m-radius k of $K_v$. If $K_v$ is locally dense but the overall subgraph K of $\mathcal{K}$ is sparse compared to G, then $K_v$ must be "small." Large networks may admit mesoscale kernel architectures, which are locally sparse but do not approach $\text{diam}_m(G)$ in metric size. A nonlocal kernel architecture may be denoted by Q instead of $\mathcal{K}$, since $\mathcal{K}$ is usually reserved for describing local structure.

Definition (kernel dimension for manifold embedding): Let (X,g) be a pseudo-Riemannian manifold, $G=(V, E, \alpha, \omega)$ a digraph, $f: V \to X$ a compatible embedding for an appropriate family of coordinate systems, $W' \subset W$ subsets of V, $v \in W$ a node, and $\mathcal{K}$ a kernel architecture for G over W, with kernel $\mathcal{K}_v: E_v^{-1} \to I$ at v. The dimension $\dim_f(\mathcal{K}_v)$ of $\mathcal{K}_v$ with respect to $f$ is the dimension of the set of initial nodes of edges in $\text{supp}(\mathcal{K}_v)$:

$$\dim_f(\mathcal{K}_v) := \dim(\text{Conv}(\{\alpha(e) \mathcal{K}_v(e) \neq 0\})).$$

The dimension $\dim_f(\mathcal{K})$ of $\mathcal{K}$ with respect to $f$ is $\sup_{v \in W} \dim_f(\mathcal{K}_v)$. $\mathcal{K}$ is called degenerate at v with respect to $f$ if $\dim_f(\mathcal{K}) < \dim(X)-1$. Otherwise, it is called nondegenerate at v. $\mathcal{K}$ is called nondegenerate over W' if it is nondegenerate at every node $v \in W'$. $\mathcal{K}$ is called saturated at v if $\dim_f(\mathcal{K}) = \dim(X)$.

$\dim_f(\mathcal{K}_v)$ is defined in terms of $\text{supp}(\mathcal{K}_v)$, which identifies "initial nodes of active incoming edges," because no other nodes, except v itself, play a nontrivial role in the kernel at v, and v plays a standard "receptive" role. Under this definition, the dimension of a typical CNN kernel is the familiar value: equal to the layer dimension, or one less than the manifold dimension. Kernels in general graded networks need not match the layer dimension, i.e., they may be either degenerate or saturated. For example, all the kernel supports defined by the single black nodes in the second row of FIG. 5A are 0-dimensional, and the 2-node supports in the third row are 1-dimensional. Three of the 3-node supports are also 1-dimensional. These are all degenerate. On the other hand, a saturated kernel architecture typically produces a network with "layer-skipping edges." Defining dimension in terms of an manifold embedding does not clash with the principle that meaningful quantities for ANNs should be intrinsic to the network structure, since in practice these embeddings derive from data properties that legitimately inform network construction, such as geometric correlations in image classification.

Definition (ball kernel): Let (X,g) be a pseudo-Riemannian manifold, $G=(V, E, \alpha, \omega)$ a digraph, $f: V \to X$ a compatible embedding for an appropriate family of coordinate systems, $v \in V$ a node, $\sigma$ a subset of X, and r a non-negative real number. A ball kernel of radius r for v in $\sigma$ is a kernel $\mathcal{K}_v$ supported on the set of edges $e \in E$ terminating at v and beginning at nodes $v^-$ in $\sigma$ within distance r of some point in L. In particular, if $X = \mathbb{R}^{n+1}$, $\Lambda \in \mathbb{R}^{n+1}$ is a lattice, and V is a subset of lattice points, then $\mathcal{K}_v$ is called a ball-lattice kernel.

Figure 5B:
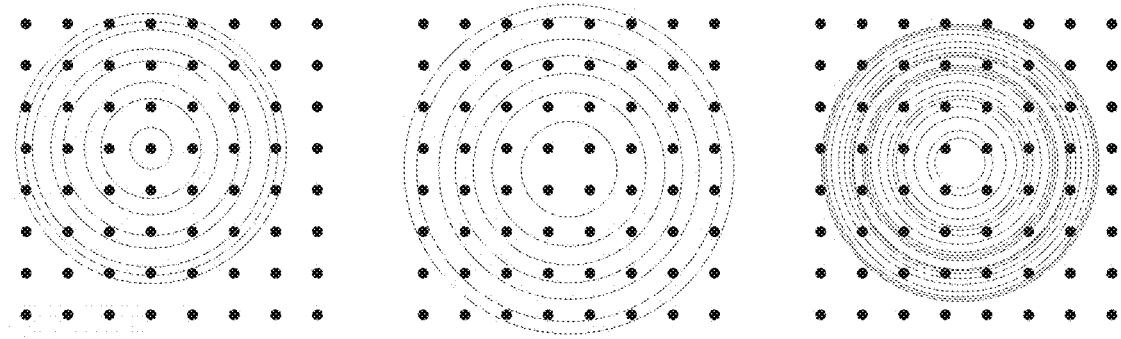
FIG. 5B illustrates some compact kernel geometries defined by ball-lattice intersections, in accordance with several different embodiments of the present invention.

The subset $\sigma$ of X referenced in the definition of a ball kernel is typically an n-dimensional slice orthogonal to the coordinate determining edge direction. In this case, "$\sigma$" stands for "section." FIG. 5B illustrates ball-lattice kernels in the 3D case, using a 2D layer. More generally, important classes of kernels for a digraph G defined via embedding into a manifold X are given by taking the kernel support to include all edges beginning at nodes within a certain specially-defined metric neighborhood of X, in the present case a closed ball, but possibly a hyperrectangle, simplex, etc. Often such a neighborhood has smaller dimension than X; in particular, it often involves nodes in a single layer of G. The case of hyperrectangles is already familiar from the case of CNNs, which is why the closed-ball case is used here as a representative example.

Definition (homogeneity for kernel architectures): Let $G=(V, E, \alpha, \omega)$ be a digraph, $\mathcal{K}=\{\mathcal{K}_v\}_{v \in W}$ a kernel architecture for G over a subset W of V, v an element of W, and W' a subset of W. Let S be a connected subgraph of $\star_{G,1}^-(v)$, considered as a pointed subgraph with distinguished node v. Define the probability that $\mathcal{K}$ selects S at v to be $$\mathcal{K}_v(S) := \prod_{e \in E_S} \mathcal{K}_v(e) \prod_{e \in E_{\bar{v}} - E_S} (1 - \mathcal{K}_v(e)).$$

Let $\theta := \langle S \rangle$ (be the class of S in the set $S_r^-$ of isomorphism classes. Define the probability that $\mathcal{K}$ selects $\theta$ at v to be $$\mathcal{K}_v(\theta) := \sum_{S' \in \theta} \mathcal{K}_v(S'),$$

where the sum ranges over all subgraphs of $\star_{G,1}^-(v)$ isomorphic to S. $\mathcal{K}$ is called g homogeneous over $W' \subset W$ if $\mathcal{K}_v(\theta) = \mathcal{K}_{v'}(\theta)$ for any v, $v\theta \in W'$. If G is a metric digraph, then metric subgraphs and their isometry classes may be used mutatis mutandis to define $\mathcal{K}_v(S)$ and $\mathcal{K}_v(\theta)$. In this case, the kernel architecture $\mathcal{K}$ is called m-homogeneous over $W' \subset W$ if $\mathcal{K}_v(\theta) = \mathcal{K}_{v'}(\theta)$ for any pair of nodes v, $v' \in W'$. If $\mathcal{K}$ is g-homogeneous or m-homogeneous over a node set W' and $v \in W'$ is a node, then the subgraph $K_v$ of $\mathcal{K}$ at v is called a seed for $\mathcal{K}$ over W'.

Intuitively, a kernel architecture is g-homogeneous or m-homogeneous over a family of nodes if it "generates the same distribution of local structures at each node" in the appropriate sense. In this context, "local" means "associated with a particular point," not necessarily "concentrated near a particular point." By construction, $\mathcal{K}$ is homogeneous over W' in the appropriate sense if the corresponding SSP is homogeneous over W'. Since $\mathcal{K}$ is defined in terms of terminal digraphs, "homogeneous" automatically means "homogeneous in the negative direction." The reason for the "connected" hypothesis is that isolated nodes are irrelevant to kernels, which are defined in terms of edges. G itself need not be homogeneous over W' for $\mathcal{K}$ to be homogeneous over W'. However, G is often homogeneous over the entire subset W ⊂ V. A g-homogeneous deterministic kernel architecture is equivalent to an isomorphism class $\theta = \langle S \rangle$ of terminal pointed digraphs, together with a family of equivalence classes of monomorphisms of pointed digraphs $\phi_v: S \to St_{G,1}^-(v)$, which "attach" the common structure of S to different points of V. It is often natural to take S to be a seed of $\mathcal{K}$ at some node in the homogeneous subset W'. Two such monomorphisms $\phi_v$, $\phi_v'$ are considered to be equivalent if they share the same image. Similarly, an m-homogeneous deterministic kernel architecture is equivalent to an isometry class of such a seed, together with corresponding monomorphisms. FIG. 1B illustrates an m-homogeneous kernel architecture from this viewpoint. A homogeneous kernel architecture rarely covers all of V, since G often exhibits inhomogeneities near its boundaries, leaving too little available structure to support the same kernel shape used at "interior" nodes. Padding is sometimes used to extend a set of nodes over which G is homogeneous. Stripping away padding at the end of a network architecture construction algorithm (NACA) may truncate some of the kernels. This can result in degeneracy near the boundary. Every probability function E→I may be represented as a kernel architecture, since every edge has a unique terminal node. Hence, the notions of homogeneity given here make sense for such probability functions in general. For a metric digraph (G, d), a g-homogeneous deterministic kernel architecture may not resemble a typical CNN kernel architecture, since one monomorphism $\phi_v$ may map a pair of nodes in the defining terminal digraph to near neighbors, while another such monomorphism may map them to nodes on opposite sides of the network. Attention may be restricted to more familiar-looking architectures by imposing metric conditions, of which the strongest is m-homogeneity.

Figure 6A:
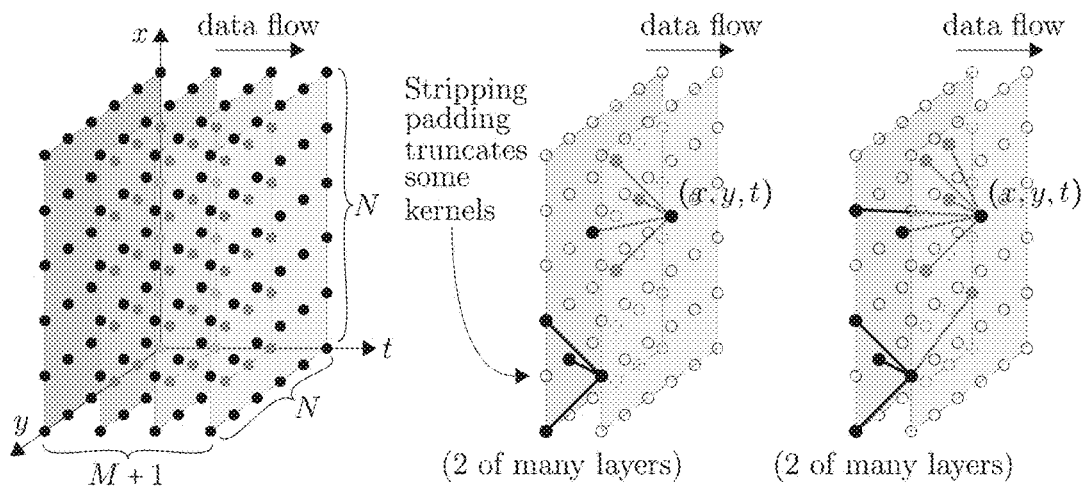
FIG. 6A illustrates a network architecture construction algorithm (NACA) for defining Diamond4 or D4-nets, in accordance with one embodiment of the present invention.
Figure 6B:
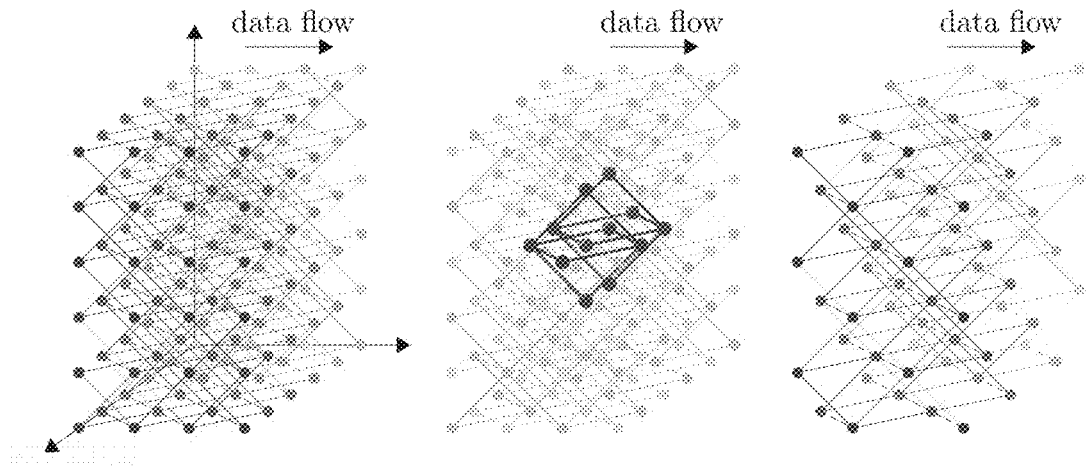
FIG. 6B illustrates how the D4 kernel architecture may be viewed as interleaved Tetra-octa-nets, or TO-nets, in accordance with one embodiment of the present invention.

One reason why the theory of kernel architectures provided here is so general is because the overall network geometries involved in the present invention are more varied than that of a typical CNN. They need not be strictly graded, so there need not exist a canonical decomposition into layers. If canonical layers do exist, they need not be hyperrectangular, and the underlying geometry, if any, need not be Euclidean. This full range of generality is not always used because it is often desirable to reproduce many of the same properties exhibited by CNNs, however, even g-homogeneous deterministic kernel architectures have significant flexibility, since for a given terminal digraph S and node v in G, there may exist multiple monomorphisms $\phi_v: S \to \star_{G,1}^-(v)$. Hence, images of S at different nodes in G may be oriented differently with respect to some ambient geometry. Even for networks with n-dimensional hyperrectangular layers, n-dimensional hyperrectangular kernels are often too restrictive for the purposes of the present invention. Kernels of different shapes and different dimensions can perform better in some settings. Such kernels may exhibit "missing edges" or other irregularities. The kernels illustrated in FIGS. 1, 5, and 6 are examples. For networks with a canonical decomposition into layers, the kernel architectures involved in the present invention may involve multiple layers. In particular, they may incorporate "layer-skipping" edges such as those used in ResNets and DenseNets.

Nonlocal Structure

This section describes methods for adding nonlocal structure to ANN architectures to improve connectivity and recognition of nonlocal correlations in data. Nonlocal kernel architectures offer one way to describe these methods, and such architectures indeed play a role in some of the network architecture construction algorithms (NACAs) provided below. However, since the kernel-related notion of "grouping together all edges terminating at a given node" is less relevant in the nonlocal context, nonlocal structure is often described in terms of other edge-selection processes, called edge-inclusion and edge-addition. Like kernel architectures, these processes may be used to define SSPs, and hence G-networks, but they are typically used as building blocks of more-sophisticated network construction processes.

Definition (edge-inclusion processes): Let G=(V, E, α, ω) be a digraph. A (global) edge-inclusion process for G is a function Ω: E→I encoding independent edge-inclusion probabilities for each e∈E. The subgraph selection process induced by Q, also denoted by Ω, is the probability function N→I given by combining the individual probabilities Ω(e):

$$\Omega(N) := \prod_{e \in E_N} \Omega(e) \prod_{e \in E - E_N} (1 - \Omega(e)).$$

The symbol Ω is deliberately overloaded (re-used) to describe nonlocal edge-inclusion or edge-addition processes from different viewpoints. In fact, the same symbol is re-used again for nonlocal kernel architectures below. In a network architecture construction algorithm (NACA), Ω defines a Markov process, which works through the edges of G sequentially, including each edge e with probability Ω(e). This explains the "process" terminology. A particular subgraph N of G may be obtained deterministically by setting Ω(e)=1 for e∈$E_N$ and Ω(e)=0 otherwise. Unless Ω(e)∈{1, 0} for all e, Ω does not select a specific number of edges; rather, different runs of the process may select different numbers of edges.

Definition (edge-addition processes): Let G=(V, E, α, ω) be a digraph. A (global) edge-addition process for G is a pair Ω:=(μ, τ), where μ is a function E→I encoding relative selection probabilities for each e∈E, and τ is a termination criterion for halting a selection sequence $\{e_1, e_2, e_3, \ldots\}$. The subgraph selection process induced by Ω, also denoted by Ω, is the probability function N→I given by combining p and r.

The sequence $\{e_1, e_2, e_3, \ldots\}$ is constructed by selecting edges randomly with relative probabilities at each step proportional to the values μ(e) for the remaining edges. It may be assumed without loss of generality that $\Sigma_{e \in E} \mu(e) = 1$. The absolute probabilities of adding edges in the order $e_1, e_2, e_3, \ldots$ are then $\mu(e_1), \mu(e_2)/(1-\mu(e_1)), \mu(e_3)/(1-\mu(e_1)-\mu(e_2)), \ldots,$ unless division by zero is encountered, which means that all possible edges have been exhausted, and subsequent probabilities are zero. Edge addition is not a Markov process, since the probability of selecting a given edge e at each step depends on which edges have already been chosen. As in the case of an edge selection process, an edge addition process defines a G-network, but such a process is typically used to construct only the "nonlocal part" of a more-sophisticated G-network. Formulae for $\Omega(N)$ are more complicated for an edge-addition process than for an edge-inclusion process, and vary with $\tau$, so they are omitted here. The simplest edge-addition processes select R edges randomly with uniform relative probabilities from a subset E' of E. In this case, the termination criterion is simply reaching R (additional) edges. A slight modification is to partition E' into subsets $E_1, \ldots E_n$, and select $R_i$ edges randomly from $E_i$. Such weighted-random processes are used below to select edges preferentially from the "middle" layers of G to increase connectivity in an ANN architecture. Though technically more complicated than edge-inclusion processes, edge-addition processes are useful for constructing networks with specific numbers of edges. This can be an advantage when it is necessary to precisely control the parameter space dimension of the resulting G-network.

Important classes of edge-inclusion and edge-addition processes are weighted-random processes, which select different types of edges with different frequencies.

Definition (weighted-random edge inclusion/addition): Let $G=(V, E, \alpha, \omega)$ be a digraph, and $\Pi:=(E_1, \ldots, E_L)$ a partition of E into disjoint subsets. A weighted-random edge-inclusion process for G with respect to $\Pi$ is a function $\Omega: E \to I$, constant on each $E_i$, encoding independent edge-inclusion probabilities for each $e \in E$. A weighted-random edge-addition process for G with respect to $\Pi$ is a pair $\Omega:=(\mu, \tau)$, where $\mu$ is a function $E \to I$, constant on each $E_i$, encoding relative selection probabilities for each $e \in E$, and $\tau$ is a termination criterion for halting a selection sequence $\{e_1, e_2, e_3, \ldots\}$. A weight vector $w=(w_1, \ldots, w_L)$ for a weighted-random edge-addition or edge-inclusion process $\Omega$ is a list of non-negative real numbers encoding each constant value $\Omega(e)$ for $e \in E_i$.

For the purposes of the present invention, the most relevant partitions $\Pi$ are those whose subsets $E_i$ consist of all edges between a given pair of generations in the ambient digraph G, or all edges of a given metric length, or all edges within a given length range. The example of D4-nets and TO-nets described below involves a layer-based weighted-random edge-addition process for a strictly-graded ambient digraph G. In this case, the number of entries of the weight vector is the same as the number of layers, excluding input nodes. Both weighted-random edge-inclusion processes and weighted-random edge-addition processes exhibit phase transitions (as described in the scientific references) near critical values of the associated inclusion probabilities or numbers of edges, with measures of connectivity such as input-output connectivity abruptly increasing. Recognition and utilization of such transitions can be an important aspect of network design.

Network Architecture Construction Algorithms

This section introduces network architecture construction algorithms (NACAs), which are lists of instructions for implementing subgraph selection processes (SSPs) to define G-networks. Abstract definition and description of a G-network treats subgraphs N of G as "finished products," usually "ignoring" or "erasing" any influence from auxiliary structure, such as a metric. In practice, it is often more natural to work constructively, assembling N out of building blocks such as local kernel architectures and nonlocal edge selection processes. A NACA "unzips" these constructive details.

Definition: Let $\mathcal{N}=(G, \mathcal{P})$ be a G-network. A network architecture construction algorithm (NACA) for $\mathcal{N}$ is a list of instructions for implementing $\mathcal{P}$ to obtain a subgraph N of G, viewed as an ANN architecture.

A NACA usually contains more information than just G and $\mathcal{P}$, since specifying both a product and a method for producing that product is more demanding than specifying the product alone. In particular, the steps in a NACA often depend on auxiliary structure, such as that of a manifold, which is not recoverable from the finished product $\mathcal{N}$. The NACAs provided here involve choosing increasingly-specific arguments, such as a manifold, a metric, coordinates, nodes, edges, and so on. Such a NACA may be abbreviated by representing the network in the form $\mathcal{N}$ (list of arguments).

The number of steps in a fully-detailed NACA is variable, but a NACA is often "unpacked" from a general schematic form such as $\mathcal{N}$ (geometric data, digraph data, local data, nonlocal data), to a more-detailed concrete form such as $\mathcal{N}$ (X, g, $\Psi$, V, E, $\alpha$, $\omega$, $V^\pm$, $\mathcal{K}$, $\Omega$), where in this case arguments 1-3 define a space such as a manifold, a metric structure, and a compatible family of coordinates, arguments 4-8 define an ambient metric digraph with input and output node sets, argument 9 defines a local kernel architecture, and argument 10 defines a nonlocal edge-selection process. Since any individual "run" of a NACA outputs a particular subgraph N of G, it is convenient to describe such outputs in a similar way via a list of arguments:

N(X, g, $\Psi$, V, E, $\alpha$, $\omega$, $V^\pm$, $\mathcal{K}$, $\Omega$).

This notation means that "N is an output a particular run of the NACA implementing the G-network $\mathcal{N}=(G, \mathcal{P})$, with the choice of arguments X, g, $\Psi$, V, E, $\alpha$, $\omega$, $V^\pm$, $\mathcal{K}$, $\Omega$." It does not mean that N is uniquely defined, since different "runs" of a nondeterministic NACA can produce different outputs from the same arguments.

Definition: The general geometry-induced network architecture construction algorithm, or GINACA, has the following steps.

(a) Geometric data:
(i) Choose a space X, usually a real manifold.
(ii) Choose geometric structure g for X, usually a pseudo-Riemannian metric.
(iii) Choose local analytic-geometric structure $\Psi$ on X, usually a compatible family of coordinate systems $\Psi:=\{(x_i, t_i)\}_{i \in \mathcal{I}}$ on a family $\{U_i\}_{i \in \mathcal{I}}$ of subsets of X, with union $U:=\cup_{i \in \mathcal{I}} U_i$. Use $\Psi$ to define a consistent choice of direction for data flow in the network.

(b) Digraph data:
(i) Choose a finite subset $V \subset U \subset X' \subset X$ as a node set. Let $F=(V, E_F, \alpha_F, \omega_F)$ be the full digraph over V induced by $\Psi$. In particular, the directions of the edges in F are defined via the direction of data flow determined by $\Psi$.
(ii) Choose an edge set $E \subset E_F$, and define initial and terminal node maps $\alpha, \omega: E \to V$ by restricting $\alpha_F$ and $\omega_F$, such that the digraph $G:=(V, E, \alpha, \omega)$ is dense with respect to F. G is the ambient digraph for the network. Define a metric d on G by restricting the geometric structure g on X to V. (G, d) is then a metric digraph.
(iii) Choose input and output node sets $V^\pm \subset V$ as subsets of the sets of maximal and minimal nodes of G, respectively.

(c) Local data:
  (i) Optionally, choose a subset W⊂V, called the homogeneous node set, over which G is g- or m-homogeneous to some radius in the negative direction.
  (ii) Optionally, choose padding for G to yield a larger digraph G'=(V', E', α', ω'), homogeneous over a larger node set.
  (iii) For some node v∈V, choose as a kernel seed a pointed metric subgraph ($K_v$, d, v) of the g-star $\star_{G,1}^-(v)$, of small m-radius, where d is the metric on G restricted to $K_v$.
  (iv) Choose an isomorphic or isometric image of ($K_v$, d, v) at each node in some subset W' of V or V'.
  (v) Choose a kernel architecture $\mathcal{K}$ over W' by assigning probabilities to the edges in the chosen images of ($K_v$, d, v).
  (vi) Choose an edge set $E_{\mathcal{K}}$ for a node-complete subgraph N$\mathcal{K}$ of G or G' by applying the probabilities encoded by X. $\mathcal{K}$
  (vii) Optionally, repeat items (i) through (vi) with additional kernel architectures encoding different types of local or mesoscale structure. Denote by $N_{\mathcal{K}}$ the subgraph of G or G' defined by all its kernel architectures.
  (viii) Optionally, prune $N_{\mathcal{K}}$ to obtain a subgraph with special properties. Reassign the notation $N_{\mathcal{K}}$ to this subgraph.
(d) Nonlocal data:
  (i) Choose and apply a nonlocal edge-selection process Ω, such as a nonlocal kernel architecture, edge-inclusion process, or edge-addition process, to the dual graph $N_{\mathcal{K}}^*$ of $N_{\mathcal{K}}$, to augment the existing structure of N$\mathcal{K}$ with an additional set $E_\Omega$ of edges from E−$E_{\mathcal{K}}$.
  (ii) Optionally, add or adjust a small number of edges to increase input-output connectivity.
  (iii) Strip away padding and/or apply further pruning. The resulting subgraph
  N(X, g, Ψ, V, E, α, ω, V$^\pm$, $\mathcal{K}$, Ω)
  of G is the final output of the GINACA.

A wide variety of more-specific NACAs for constructing SLC-networks are derived from the GINACA. In the present section, one specific example is provided as a preview. Input/output node sets V$^\pm$ are typically chosen to be the entire sets of minimal and maximal nodes of G, since G itself is typically chosen to satisfy input/output requirements determined by applications. G has the same maximal and minimal nodes as F, since Tr(G)=F. However, omitting edges from G can create new extremal nodes, since these are defined by the absence of certain edges. Hence, the subgraph N output by the GINACA may a priori have extremal nodes that are not extremal in G. This should usually be avoided, since such "accidental" extremal nodes do not correspond to desired ANN outputs.

The motivation for identifying the homogeneous node set W in the GINACA is to ensure that a choice of kernel seed can be meaningfully "cloned" to define a kernel architecture over W. This is a sufficient condition but often an unnecessary one, since a small kernel seed will often have enough isomorphic or isometric images even without such homogeneity. Padding need not be uniquely defined in general, since it must only include "enough" structure to temporarily suppress network boundary effects. When defining the kernel support, v is usually chosen from the homogeneous node set W. Since a kernel at v is a priori defined over the entire edge set of the g-star $\star_{G,1}^-(v)$, limiting the support to the edge set of a smaller subgraph is an explicit imposition of locality. The set W' is often chosen to be a homogeneous node set in a padded version G' of G, and is usually chosen to include the original homogeneous node set W. Equal probabilities are typically assigned to edges related by isomorphism or isometry, though these maps may not be unique. In many cases, $\mathcal{K}$ is actually chosen to be m-homogeneous and deterministic. N$\mathcal{K}$ is a subgraph of the subgraph K of $\mathcal{K}$.

An entire hierarchy of mesoscale structure may be defined in the GINACA, interpolating between the "fundamental scale" of individual nodes and edges and the "cosmological scale" of the entire network. Pruning may eliminate a large part of the network. For example, the kernel architecture of the Diamond4-nets or D4-nets discussed below produces two distinct topologically-connected components. Pruning away one of these produces a Tetra-octa-net or TO-net. Padding may sometimes be discarded at this stage, rather than waiting until the end of the GINACA. $N_{\mathcal{K}}^*$ is dual to $N_{\mathcal{K}}$ with respect to the appropriate ambient digraph, either G, G', or a subgraph obtained by pruning. G' (in case of padding) has a larger edge set E', but edges are chosen only from E, since padding is stripped away at the end of the GINACA. In fact, if pruning is applied, then only a subset of E−$E_{\mathcal{K}}$ may be available for use, since some edges may begin or end at pruned nodes.

Edges added to promote connectivity are typically chosen via a modified two-source breadth-first search, such as the GIO or MIO algorithms discussed below. The final output N may be different for different runs of the GINACA if some or all of the processes involved are nondeterministic. Given specific choices of arguments X, g, Ψ, V, E, ... for the GINACA, a SSPP $\mathcal{P}$ may be reconstructed a posteriori, leading to a corresponding abstract G-network $\mathcal{N}:=(G, \mathcal{P})$, but this is often unnecessary unless thorough statistical analysis of possible outputs is needed.

Example (D4-nets and TO-nets): A specific example NACA is now provided for constructing families of 3-dimensional G-networks called Diamond4-nets, or D4-nets. Interesting subnetworks called Tetra-octa-nets, or TO-nets, are obtained by pruning away one of two topologically-connected components defined by the D4 kernel architecture. D4-nets are examples of hybrid lattice-Euclidean networks, or HLE-nets. This NACA is a special case of the HLE NACA 1, a refinement of the GINACA, which combines a local m-homogeneous deterministic kernel architecture with a nonlocal weighted-random edge-addition process. The D4 kernel seed is encoded by the red "domino" diagram in FIG. 5A. FIG. 6A provides visualization of the NACA.

Definition (D4/TO NACA): The NACA for constructing D4-nets and/or TO-nets has the following steps:
(a) Geometric data:
  (i) Choose X=$\mathbb{R}^3$.
  (ii) Choose g to be the Euclidean metric.
  (iii) Choose Ψ to be the Cartesian product coordinate system (x, y, t), where increasing t is chosen to be the direction of data flow.
(b) Digraph data
  (i) Choose V to consist of all integer lattice points (x, y, t)∈$\mathbb{Z}^3 \subset \mathbb{R}^3$ for 0≤x, y<L and 0≤t≤M. The full digraph F over V includes an edge between nodes v=(x, y, t) and v'=(x', y', t') whenever t<t'.
  (ii) Choose E to consist of all edges between nodes v=(x, y, t) and v'=(x', y', t+1) for 0≤t<M. Choose α and ω to send such edges to v and v', respectively. The resulting ambient digraph G=(V, E, α, ω) is dense with respect to F and strictly graded. Define a metric d on G by restricting the Euclidean metric to V. (G, d) is then a metric digraph.

(iii) Choose $V^-$ to consist of all minimal nodes $(x, y, 0)$ of G, and $V^+$ to consist of all maximal nodes $(x, y, M)$ of G.

(c) Local data:
  (i) Choose $W=V-V^-$. Then G is m-homogeneous over W to radius $\sqrt{3}$ in the negative direction ($\sqrt{3}$=diagonal length of a unit cube).
  (ii) Choose padding to increase the size of G by one node in the positive and negative x and y-directions. The resulting padded digraph G' has nodes $(x, y, t) \in \mathbb{Z}^3 \cup \mathbb{R}^3$ for $-1 \leq x, y \leq L+1$ and $0 \leq t \leq M$, with edges between nodes $v=(x, y, t)$ and $v'=(x', y', t+1)$ for $0 \leq t < M$. G' is m-homogeneous (to radius $\sqrt{3}$ in the negative direction) throughout the node set $W':=V-V^-$.
  (iii) For any node $v=(x, y, t) \in W'$, choose as a kernel seed the pointed metric subgraph $(K_v, d, v)$ of $\star_{G,1}$(v) with four-node diamond-shaped base in the previous generation, consisting of the nodes $(x \pm 1, y \pm 1, t-1)$, where d is the metric on G restricted to $K_v$.
  (iv) There is a unique isometric image of $(K_v, d, v)$ at each node in W'.
  (v) Choose a kernel architecture $\mathcal{K}$ for G' over W' by assigning probability 1 to each edge in these isometric images. By construction, $\mathcal{K}$ is m-homogeneous and deterministic.
  (vi) There is a unique edge set $E_\mathcal{K}$ and node-complete subgraph $N_\mathcal{K}$ of G' determined by $\mathcal{K}$. Specifically, $E_\mathcal{K}$ consists of edges from each four-node family $(x \pm 1, y \pm 1, t-1)$ to each node $v=(x, y, t) \in W'$.
  (vii) No additional local or mesoscale structure is included in this network.
  (viii) To obtain a D4-net, proceed to step (d). To obtain a TO-net, prune $N_\mathcal{K}$ by selecting one of its two topologically-connected components.

(d) Nonlocal data:
  (i) Choose a nonlocal edge-addition process Q defined by randomly adding R total edges from $E-E_\mathcal{K}$ to $N_\mathcal{K}$, weighted by layer with (relative) weight vector $w=(w_1, \ldots, w_M)$. More precisely, choose $R_m$ new edges randomly with uniform probability in layer m, where (to the nearest integer), $R_m = w_m R / \Sigma_j w_j$.
  (ii) No edges are added or adjusted to increase input-output connectivity.
  (iii) Strip away padding to yield the output subgraph N of G.

Networks constructed via this specific NACA are called square-layered w-weighted Diamond4-nets or Tetra-octa-nets, due to their layer and kernel shapes. The latter name is chosen because the pruned kernel architecture selects the nodes and most of the edges of the tetrahedral-octahedral honeycomb, a quasiregular tessellation of $\mathbb{R}^3$. Abbreviations D4-nets and TO-nets are often used. Sizes of D4-nets and TO-nets are described as L×L×M, excluding input nodes by convention. Their total numbers of nodes are therefore $(M+1)L^2$ and $\frac{1}{2}(M+1)L^2$, respectively. The numbers of edges $|V_K|$ in their kernel architectures (after stripping away padding) are $4ML(L-1)$ and $2ML(L-1)$, respectively. The number of edges $|V|$ in the ambient D4-net digraph G is $ML^4$. TO-nets may be recognized a posteriori as involving smaller ambient digraphs with $\frac{1}{4}ML^4$ edges, or, alternatively, the requirement of choosing node-complete subgraphs in a SSP may be relaxed. A D4-net of size L×L×M includes in its node sets all integer lattice points inside the discrete hyperrectangle $I_L^2 \times I_{M+1}$, while the corresponding TO-net includes only alternating lattice points.

For a given size L×L×M and weight vector w, square-layered D4-nets or TO-nets form a discrete 1-parameter family $\mathcal{N}(|V_K|+R)$, where R is the number of random edges selected, and $|V_K|+R$ is the total number of edges. For D4-nets, R ranges from 0 to $ML^4-|V_K|$. In this case, $\mathcal{N}(|V_K|+0)$ has the architecture of a novel small-kernel CNN, while $\mathcal{N}(|V_K|+ML^4-V_K|)=G$. For these extremal values, the NACA is deterministic. For other values, different "runs" of the NACA typically output different subgraphs. Similar remarks apply to TO-nets.

Figure 7A:
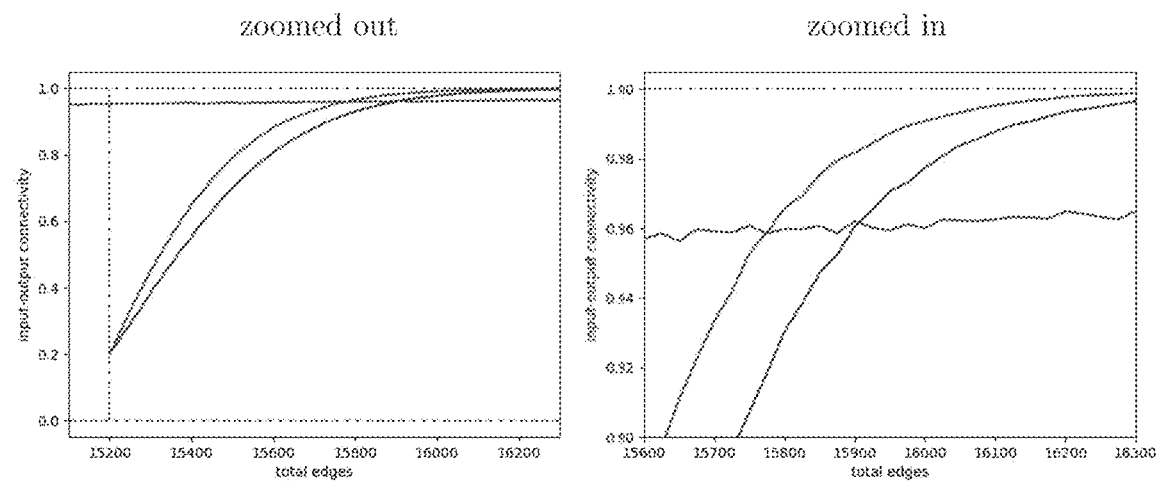
FIG. 7A compares variable input-output connectivity for strictly graded 10×20×20 networks with two different kernel architectures as random edges are added, in accordance with two different embodiments of the present invention.
Figure 7B:
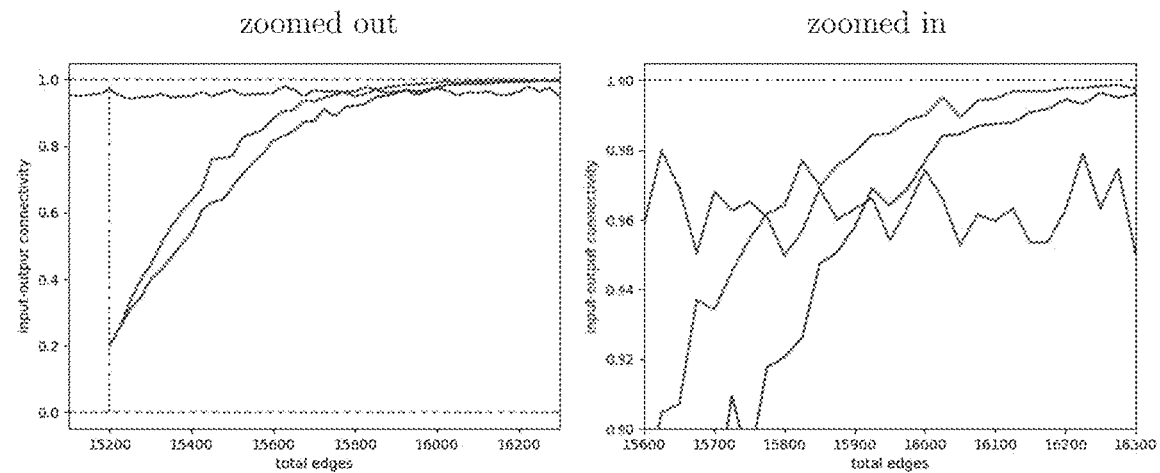
FIG. 7B shows connectivity for individual runs of the HLE NACA 1 producing these networks, in accordance with two different embodiments of the present invention.

For each value of R, the input-output connectivity of the D4-net or TO-net $\mathcal{N}(|V_K|+R)$ may be estimated by averaging over NACA outputs for multiple runs. FIG. 7 shows a toy case involving D4-nets of size 20×20×10, computed via a Python script, which compares the connectivity of $\mathcal{N}(|V_K|+R)$ for uniform and binomial weight vectors (blue and red) to the connectivity of random strictly-graded networks $\mathcal{R}(|V_K|+R)$ with the same number of edges (green). FIG. 7A shows values averaged over several "runs" of the NACA, while FIG. 7B shows an individual case. The abscissa is $|V_K|+R$, with the zoomed-out (left-hand) diagrams showing the range from $1.5 \times 10^4$ to $1.63 \times 10^4$. The ambient digraph G has $ML^4 = 1.6 \times 10^6$ edges, so all the networks in the illustrated range are quite sparse. Blue shows the connectivity of $\mathcal{N}(|V_K|+R)$ for the uniform weight vector $w=(1,1,1,1,1,1,1,1,1,1)$, while red shows the corresponding connectivity for the binomial weight vector $w=(1, 9, 36, 84, 126, 126, 84, 36, 9, 1)$. These are relative weights, so all three networks at each abscissa value share the same number of edges. The vertical dashed line in the left-hand diagrams are at $|V_K|=4ML(L-1)=15200$ edges, the case R=0. $\mathcal{N}(15200)$ has a CNN-type architecture with ≈20% connectivity for either weight vector, while $\mathcal{R}(15200)$ has ≈96% connectivity. However, the connectivity of $\mathcal{N}$ rapidly increases and surpasses the connectivity of $\mathcal{R}$ at around $|V_K|+R=15775$ (binomial, red) and $|V_K|+R=15905$ (uniform, blue). After adding $10^3$ random edges to the 20×20×10 D4-net $\mathcal{N}$, the total number of edges is $|V_K|+R=1.62 \times 10^4$. At this value, the connectivity of $\mathcal{N}$ has reached ~99.8% for the binomial weight vector and ~99.3% for the uniform weight vector. By contrast, $\mathcal{R}$ does not reach 99.8% connectivity until $|V_K|+R \approx 3 \times 10^4$, so $\mathcal{N}$ is roughly twice as efficient in terms of parameter space dimensions at this target connectivity.

Figure 3:
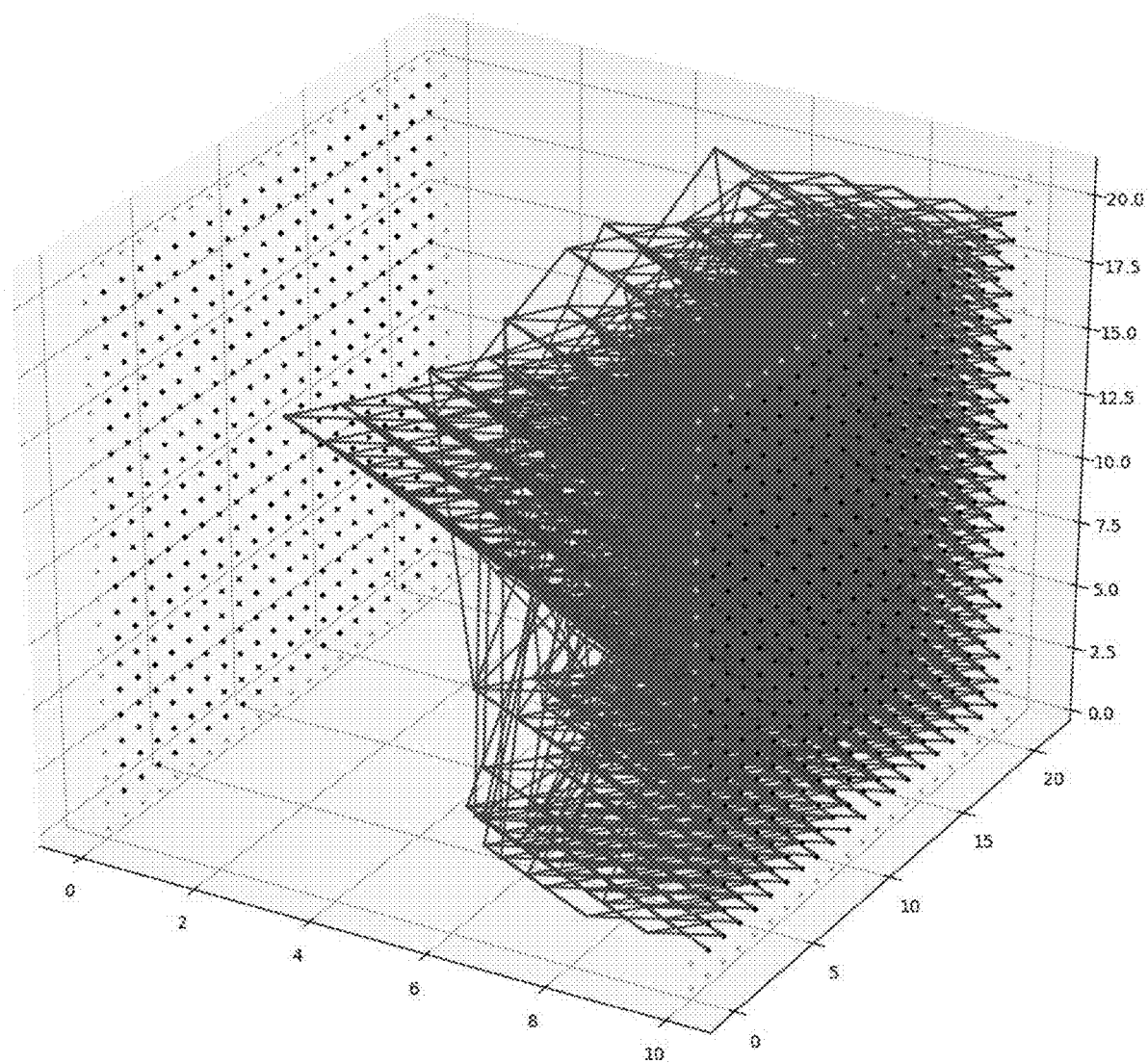
FIG. 3 shows horizon growth beginning from an input node in a 20×20×10 D4-net, in accordance with one embodiment of the present invention.

FIG. 3 illustrates horizon growth beginning at an input node in a 20×20×10 Diamond4-net $\mathcal{N}(|V_K|+R)$. The 1281 blue edges show horizon growth for R=0, i.e., growth in the kernel architecture with $1.52 \times 10^4$ total edges. The 6616 blue and green edges together show horizon growth when $R=10^3$ random edges are added, using a binomial weight vector $W=(1, 9,36,84,126,126,84,36,9, 1)$, to achieve $1.62 \times 10^4$ total edges. To avoid clutter, only input and output nodes are shown. Orange nodes are padding nodes, which play no role in the finished network. Perhaps the most striking feature of the figure is that increasing the total number of edges by about 6.6%, from $1.52 \times 10^4$ to $1.56 \times 10^4$, increases the number of edges in the future of the chosen input node by about 416%, from 1281 to 6616. Adding a small proportion of random edges therefore vastly increases the computational richness of the network.

The practical advantages of D4-nets over the corresponding random networks extend beyond raw connectivity. In particular, the CNN-type local kernel architecture of $\mathcal{N}$ endows it with local feature recognition potential that $\mathcal{R}$ lacks. Further, if weight-sharing is used in the kernel architecture of $\mathcal{N}$ then its parameter space dimension is drastically smaller than that of $\mathcal{R}$. The kernel $\mathcal{K}_v$ at each node v in $\mathcal{N}$ introduces only 4 parameters, one for each edge in the subgraph $K_v$. If $\mathcal{N}$ clones these edge weights layer-by-layer, then it has only 4×10+R independent parameters. More realistically, $\mathcal{N}$ might be replaced with a 4-dimensional network incorporating a variety of different choices for the 4 edge weights in each kernel to create different "filters" for local feature detection. For example, allowing $2^4-1=15$ different filters, one for each nontrivial combination of edges in the support, along with $10^3$ random edges distributed via a binomial weight vector, results in a network with $1.6 \times 10^3$ parameters. This is 10 times more efficient that a similarly-connected random network with negligible local structure, and 1000 times more efficient than G. In the context of weight sharing, the difference in connectivity between D4-nets with edges distributed via different weight vectors can be significant, because the overall number of parameters is much smaller than the number of edges. For example, the difference of roughly 150 edges at 99% connectivity between D4-nets with binomial and uniform weights can result in nearly 10% difference in efficiency.

It is important to consider the reliability of the connectivity advantage of hybrid networks such as D4-nets and TO-nets for individual NACA outputs. Numerical evidence suggests good reliability even for the relatively small network size 20×20×10, and even better reliability for larger networks. FIG. 7B shows connectivity for individual runs of the D4 NACA with the same parameter choices used in the top diagrams. 25-edge increments are used, so a total of 45 networks of each type are analyzed for $|V_K|+R$ between 15200 and 16300. For each network, $1.6 \times 10^4$ randomly-chosen input-output connections are tested, or 10% of the total of $20^2 \times 20^2 = 1.6 \times 10^5$ possible connections. The D4-nets $\mathbb{N}$ become reliably more connected than the random networks $\mathbb{R}$ near the same values as in the top diagrams, and the binomial weight vector reliably outperforms the uniform weight vector throughout the interval.

Figure 8A:
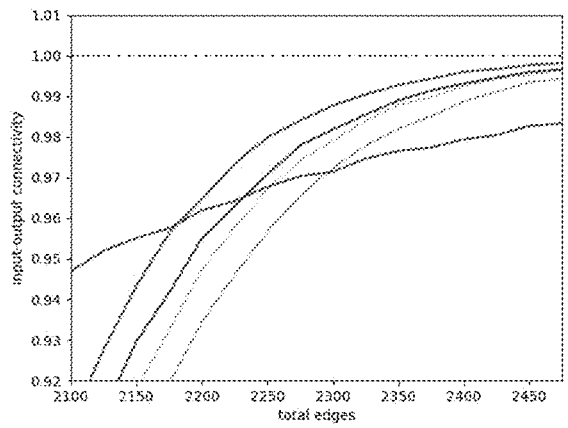
FIG. 8A compares variable input-output connectivity as random edges are added to several different embodiments (D4, D4 binomial, TO, and TO binomial) of the present invention.
Figure 8B:
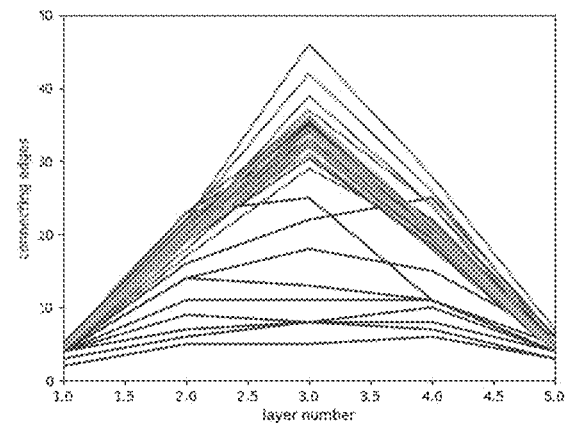
FIG. 8B shows the number of edges per layer along paths between inputs and outputs in two different embodiments (D4 binomial and TO binomial) of the present invention.
Figure 8C:
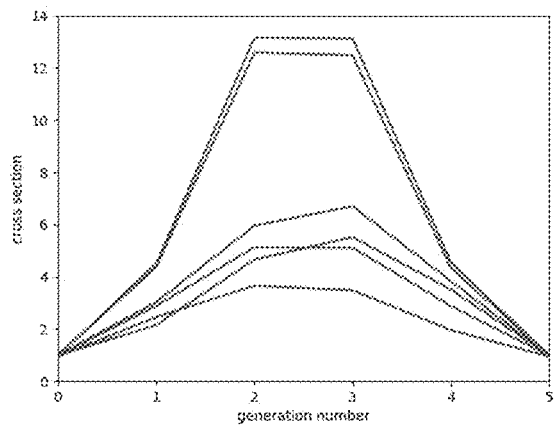
FIG. 8C shows cross sections of nodes between inputs and outputs in two different embodiments (random and TO) of the present invention.
Figure 8D:
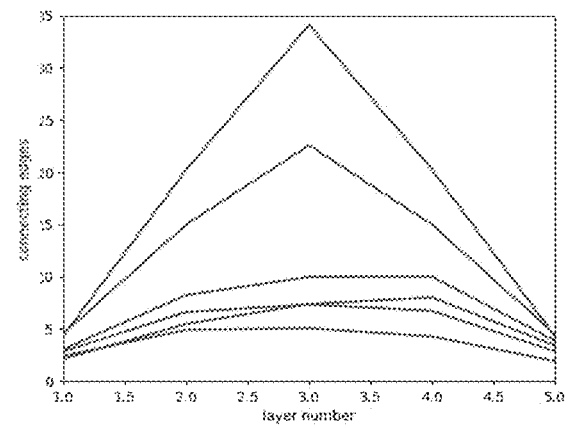
FIG. 8D shows the number of edges per layer along paths between inputs and outputs in two different embodiments (random and TO) of the present invention.

TO-nets are distinguished from D4-nets by superior connectivity properties. FIG. 8A compares the input-output connectivity of uniform and binomial D4-nets of size 10×10×5 (light and dark blue) to the input-output connectivity of uniform and binomial TO-nets of comparable size, i.e., 5 layers with 98 nodes per generation (light and dark red). The TO-nets display a small but significant advantage. More-sophisticated measures of connectivity such as intermediate-edge connectivity reveal a greater advantage for TO-nets. While input-output connectivity measures merely how many input-output pairs ($v^-$, $v^+$) are connected by directed paths, intermediate-edge connectivity measures, pair-by-pair, the dimension of the parameter subspace that contributes to the computation occurring between $v^-$ and $v^+$. FIG. 8B compares the numbers of edges per layer along directed paths between a fixed input $v^-$ and neighboring outputs $v_1^+$ and $v_2^+$ for binomial D4-nets (blue, magenta) and binomial TO-nets (red, orange). The multiple curves of each color record results for repeated individual NACA outputs. Intermediate-edge connectivities are represented by the areas under the curves. The conclusion is that the uniformity, reliability, and computational richness of the TO-nets is greater. The reason for the broad range of different outcomes for the D4-nets is that the neighboring outputs $v_1^+$ and $v_2^+$ belong to different connected components of the kernel architecture. Since the input belongs to the same component as $v_2^+$, much more information is carried along the kernel architecture between these two nodes than "bleeds across" to the other component via the nonlocal edges. In the TO-net, by contrast, there is only one connected component in the kernel architecture. Networks with considerable local structure, such as D4-nets and TO-nets, tend to display lower average intermediate connectivity than random networks, even if their input-output connectivity is greater. This is because the families of paths between input-output pairs tend to "cluster together" rather than spreading randomly throughout the network. This is not always a disadvantage, because the intermediate structure in random networks is too disorganized to resolve features. FIGS. 8C and 8D illustrate that intermediate connectivity is not "too deficient" for small TO-nets, even if one of the inputs or outputs is "at the edge" of the network. FIG. 8C compares intermediate-node connectivity for an arbitrary pair in a random network (green) with specially-chosen pairs in a TO-net of the same size (red). The pair with highest connectivity consists of a central input and central output, while the others involve at least one edge. FIG. 8D illustrates similar data for intermediate-edge connectivity. The conclusion is that the TO-net favors the influence of centralized nodes at around 99% connectivity, but not to the point of preventing significant computation between arbitrary nodes. The preference for central nodes is actually an advantage in many cases; for example, central pixels in an image are typically much more important to its classification than edge pixels.

Sparse Local Connected (SLC) G-Networks

This section defines and describes sparse local connected G-networks, or SLC-networks. Informally, an SLC-network is a G-network $\mathcal{N} = (G, \mathcal{P})$ that simultaneously exhibits the three typically conflicting properties of sparsity, locality, and connectivity. Omitting one or more of these properties produces more general families, for example, L-networks or SC-networks. The same properties are sometimes used to describe an individual subgraph N of G, due to the important special case in which $\mathcal{N} = N$, i.e., $\mathcal{P}(N) = 1$.

Definition (expander graphs): Let $N = (V_N, E_N, \alpha_N, \omega_N)$ be a subgraph of a digraph G, and let $W \subset V_N$ be a set of nodes of cardinality $|W|$. N is called a node expander if the set of strict nearest neighbors of a typical such W is large compared to $|W|$. N is called an edge expander if relatively many edges must be removed to disconnect a typical such W from the rest of G. N is called a spectral expander if a (possibly generalized) adjacency matrix for G satisfies a certain eigenvalue condition found in the scientific references.

Expander graphs are usually defined as undirected graphs, but the digraph case is more appropriate to the ANN context. Especially important for an ANN is connectivity between the input and output node sets $V^\pm$. Input-output connectivity does not precisely match typical definitions of expander graphs, but correlates strongly with them. Expander graph-based ANNs may be called sparse connected or SC-networks.

Sparsity and connectivity are a priori conflicting properties, because sparsity means that few edges are available to create connections. SLC status is even harder to achieve, because these few edges must be largely expended on building local structure, rather than "reaching across the network." Random G-networks achieve good SC behavior and are g-homogeneous, but lack good local structure. The present invention combines (generally random) nonlocal processes with (generally deterministic) local methods to achieve all three SLC properties. D4 and TO-nets provide examples of this approach. Random G-networks are often used as "benchmarks." For example, a G-network N is considered to be relatively highly-connected if it is more connected than a typical random G-network with the same number of edges. If G is a metric digraph, then N is considered to be relatively local if it is more local than a typical random G-network.

Figure 4A:
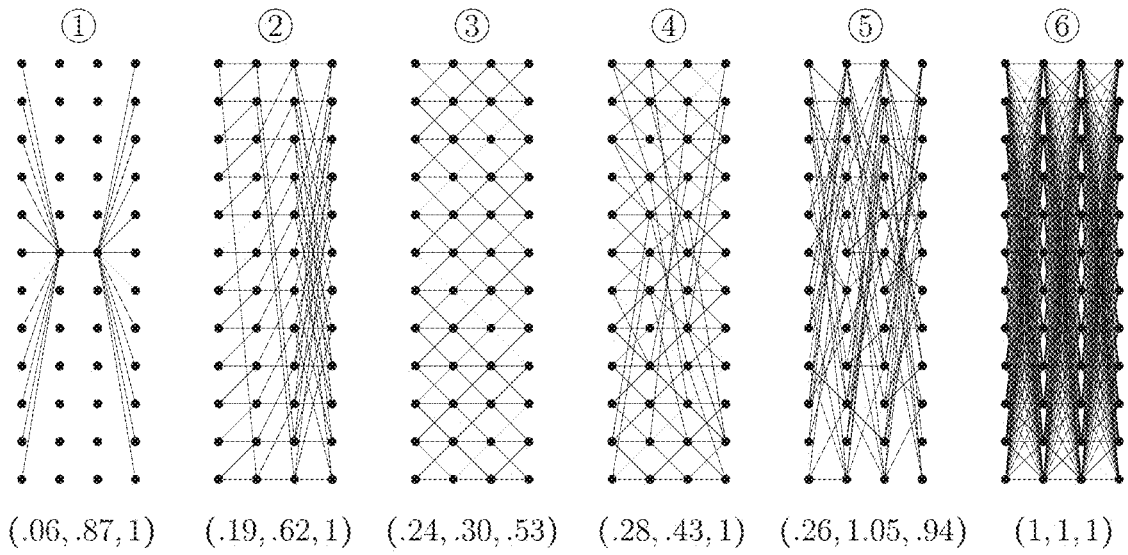
FIG. 4A shows six "toy" networks, along with triples of numbers encoding their density, locality, and input-output connectivity, in accordance with several different embodiments of the present invention.

It is easy to achieve 100% input-output connectivity with even sparser structure than that of a random G-network, but in a way that is useless for ANNs. For example, Diagram 1 in FIG. 4A shows a trivial SC-network in which all information flows through a "bottleneck" and most of the nodes are nonfunctional. This network has low intermediate and volume connectivities. Recent fully-connected expander graph-based ANNs such as RadiX-Nets, illustrated in Diagram 2 in FIG. 4A, also outperform random networks in both sparsity and connectivity, besides being m-homogeneous on a layer-by-layer basis (using a cylinder $S^1 \times \mathbb{R}$ as the underlying geometric space). This homogeneity leads to a connectivity-symmetry property described in the scientific references. Like random networks, RadiX-Nets lack significant local structure, and their basic building blocks are rather rigid in terms of size and number of layers.

Sparsity (property S) means that the G-network $\mathcal{N} = (G, \mathcal{P})$ includes few of the edges of the ambient digraph G, while density means that it includes many. For an individual subgraph N of G, these properties are measured by comparing the sizes of the edge sets of N and G, then extended to general G-networks by taking $\mathcal{P}$-weighted averages.

Definition (sparsity): Let $G = (V, E, \alpha, \omega)$ be a digraph, $N = (V_N, E_N, \alpha_N, \omega_N)$ a node-complete subgraph of G, and $\mathcal{N} = (G, \mathcal{P})$ a G-network. The density D(N) of N is the ratio $|E_N|/|E|$. The sparsity S(N) of N is $1/D(N)$, where $1/0$ is interpreted as $+\infty$. The density $D(\mathcal{N})$ of $\mathcal{N}$ is the $\mathcal{P}$-weighted average $$D(\mathcal{N}) := \sum_{N \in \mathcal{N}(G)} \mathcal{P}(N) |E_N|/|E|.$$

The sparsity $S(\mathcal{N})$ of $\mathcal{N}$ is $1/D(\mathcal{N})$, where $1/0$ is interpreted as $+\infty$.

Optimizing the sparsity $S(\mathcal{N})$ means making it large, or equivalently, making the density $D(\mathcal{N})$ small. $D(\mathcal{N})$ lies in the unit interval $I = [0,1]$, with $D(\mathcal{N}) = 1$ if and only if $\mathcal{N} = G$, and $D(\mathcal{N}) = 0$ if and only if $\mathcal{N} = V$, the node set of G, viewed as its unique node-complete subgraph with zero edges. $S(\mathcal{N})$ lies in the extended real interval $[1, \infty]$, with $S(\mathcal{N}) = 1$ if and only if $\mathcal{N} = G$, and $D(\mathcal{N}) = \infty$ if and only if $\mathcal{N} = V$. A prototypical sparse G-network with good connectivity and homogeneity is a uniform random G-network of density $1/|V| < D(\mathcal{N}) \ll 1$. Typical CNNs are also sparse. Since density and sparsity are defined relative to G, the same digraph N generally has different density and sparsity viewed as a subgraph of two different ambient digraphs. In practice, this is rarely a problem, since the structure of G is largely dictated by the application.

Connectivity (property C) means that the G-network $\mathcal{N} = (G, \mathcal{P})$ preserves a large proportion of the connections in G. Several different notions of connectivity are possible. Five are examined here (a) Intermediate-node connectivity involves the number of nodes along directed paths between pairs of nodes $(v^-, v^+) \in V^- \times V^+$; (b) intermediate-edge connectivity involves the number of edges along directed paths between pairs of nodes $(v^-, v^+) \in V^- \times V^+$; (c) intermediate-path connectivity involves the number of directed paths between pairs of nodes $(v^-, v^+) \in V^- \times V^+$; (d) input-output connectivity involves the proportion of connections between special input and output subsets $V^\pm$ of the node set V of G; (e) volume connectivity involves the proportion of total connections in G, measured via a $\mathcal{P}$-weighted average over subgraphs N.

Definition (connectivity): Let $G = (V, E, \alpha, \omega)$ be a digraph with specified input and output sets $V^\pm \subset V$, where each choice of $(v^-, v^+) \in V^- \times V^+$ defines an input output pair. Let N be a node-complete subgraph of G, and let $\mathcal{N} = (G, \mathcal{P})$ be a G-network. The intermediate-node connectivity $v_N(v^-, v^+)$ is the number of nodes along directed paths between $v^-$ and $v^+$ in N. The intermediate-node connectivity $\nu_\mathcal{N}(v^-, v^+)$ of $\mathcal{N}$ is the $\mathcal{P}$-weighted average $$\nu_\mathcal{N}(v^-, v^+) = \sum_{N \in \mathcal{N}(G)} \mathcal{P}(N) \nu_N(v^-, v^+).$$

The intermediate-edge connectivity $\in_N(v^-, v^+)$ is the number of edges along directed paths between $v^-$ and $v^+$ in N. The intermediate-edge connectivity $\epsilon_\mathcal{N}(v^-, v^+)$ of $\mathcal{N}$ is the $\mathcal{P}$-weighted average $$\epsilon_\mathcal{N}(v^-, v^+) = \sum_{N \in \mathcal{N}(G)} \mathcal{P}(N) \epsilon_N(v^-, v^+).$$

The intermediate-path connectivity $\pi_N(v^-, v^+)$ is the number of edges along directed paths between $v^-$ and $v^+$ in N. The intermediate-path connectivity $\pi_\mathcal{N}(v^-, v^+)$ of $\mathcal{N}$ is the $\mathcal{P}$-weighted average $$\pi_\mathcal{N}(v^-, v^+) = \sum_{N \in \mathcal{N}(G)} \mathcal{P}(N) \pi_N(v^-, v^+).$$

The input-output connectivity C(N) is the ratio of the number of strongly connected input-output pairs in N to the total number $|V^-||V^+|$ of such pairs. The input-output connectivity $C(\mathcal{N})$ of $\mathcal{N}$ is the $\mathcal{P}$-weighted average $$C(\mathcal{N}) := \sum_{N \in \mathcal{N}(G)} \mathcal{P}(N) C(N).$$

The volume connectivity $C_{vol}(N)$ of N is the ratio of the number of strongly-connected node pairs in N to the number of strongly-connected node pairs in G. The volume connectivity $C_{vol}(\mathcal{N})$ of $\mathcal{N}$ is the $\mathcal{P}$-weighted average $$C_{vol}(\mathcal{N}) := \sum_{N \in \mathcal{N}(G)} \mathcal{P}(N) C_{vol}(N).$$

The intermediate connectivities $\nu_N(v^-, v^+)$, $\epsilon_N(v^-, v^+)$, and $\pi_N(v^-, v^+)$ may be summed over input-output pairs $(v^-, v^+)$ of G and normalized to yield global integrated intermediate connectivities $v(\mathcal{N})$, $\in(\mathcal{N})$, and $\pi(\mathcal{N})$.

Optimizing one of the intermediate connectivities $n_N(v^-, v^+)$, $c_N(v^-, v^+)$, or $p_N(v^-, v^+)$, either for a specific input-output pair or in general, means making it large. All three connectivities lie in the interval $[0, \infty)$, though finite upper bounds exist for any finite network. Values of 0 signify zero connectivity, which is possible even for a rather dense network, for example, a network constructed by deleting all edges from a single layer of G in the strictly-graded case. Optimizing one of the integrated intermediate connectivities $n(\mathcal{N})$, $e(\mathcal{N})$, or $p(\mathcal{N})$ means making it large. All three connectivities lie in the interval $I=[0, 1]$ due to normalization. Values of 0 signify zero connectivity, which again is possible even for a rather dense network. G and $V^\pm$ are usually chosen so that the connectivity of G is 1. Optimizing either global connectivity $C(\mathcal{N})$ or $C_{vol}(\mathcal{N})$ means making it large. Both connectivities lie in the unit interval $I=[0,1]$, with 0 signifying zero connectivity and 1 signifying 100% connectivity. G and $V^\pm$ are usually chosen so that $C(G)=1$, while $C_{vol}(G)=1$ by definition. The only network $\mathcal{N}$ for which $C_{vol}(\mathcal{N})=0$ is the edgeless network $\mathcal{N}=V$, but $C(\mathcal{N})$ may vanish even for a rather dense network, as in the case of intermediate connectivities.

Input-output connectivity $C(\mathcal{N})$ is a measure of perceptivity in a network $\mathcal{N}$, since large C means that each output has a large perceptive field in the input layer. Integrated intermediate connectivities $v(\mathcal{N})$, $\in(\mathcal{N})$, and $\pi(\mathcal{N})$, as well as volume connectivity $C_{vol}$, are measures of computational richness, since they indicate that the network can significantly "mix" or "sort" data. The connectivities defined here are stronger than topological connectivity, but weaker than bidirectional connectivity in the giant strongly-connected component of a highly-cyclic digraph such as a social network. They are appropriate for ANNs, since the key questions in machine learning are which inputs can influence which outputs (perceptivity), and in how many independent ways (computational richness). For an ANN, $V^\pm$ are typically just the usual input and output nodes. For a FFN (acyclic case), $V^\pm$ are almost always subsets of the sets of minimal and maximal nodes of G, often the entire subsets.

A prototypical highly-connected G-network with good sparsity and homogeneity is a uniform random G-network of density $1/|V|<D(\mathcal{N})<<1$. This is because horizons in random subgraphs tend to grow exponentially. A typical (pure) CNN has poor connectivity, because its exclusively local connections fail to "reach across the network." Since input-output connectivity and integrated intermediate connectivities are defined relative to $V^\pm$, the same digraph N may have different connectivity values for different choices of $V^\pm$ in the same ambient digraph G. In practice, this is rarely a problem, since $V^\pm$ are largely dictated by the application. For example, in image classification, $V^-$ and $V^+$ might represent pixel locations and class labels, respectively. Since C, $C_{vol}$, and integrated intermediate connectivities are all defined relative to G, the same digraph N may have different connectivity values viewed as a subgraph of two different ambient digraphs. In practice, this is rarely a problem, since the structure of G is largely dictated by the application. It is easy to achieve high connectivity (by any of the measures defined above) by sacrificing sparsity, as in a dense network, but this incurs high computational cost. It is easy to achieve high C (but not $C_{vol}$) by running information through a "bottleneck" as in diagram 1 in FIG. 4A, but this is useless for applications.

It is sometimes useful to adjust a preexisting network to achieve higher input-output connectivity. For example, a network with good overall connectivity properties, such as high integrated intermediate connectivities, may often be increased to 100% input-output connectivity with the addition of a few edges. Two algorithms for increasing input-output connectivity are briefly described here, one purely graph-theoretic, and the other involving metric structure. Both are modifications of well-known breadth-first search algorithms involving two sources.

Definition (GIO algorithm): Let $N=(V_N, E_N, \alpha_N, \omega_N)$ be a subgraph of a strictly-graded digraph G, with input and output node sets $V^\pm$. The graph-theoretic input-output algorithm, or GIO algorithm, is a modified two-source breadth-first search with the following steps:
  (a) Choose linear orders for $V^-$ and $V^+$ and order input-output pairs via the induced lexicographic order.
  (b) For each input-output pair $(v^-, v^+)$, seek a directed path from $v^-$ to $v^+$ via two-source breath-first search.
  (c) If such a path is found, proceed to the next input-output pair.
  (d) If no such a path is found, and if there exists a pair of nodes a and b in adjacent layers (generally not unique) such that there are directed paths from $v^-$ to a and from b to $v^+$, then add an edge from a to b, and proceed to the next input-output pair, or halt if the desired connectivity is achieved.
  (e) If no such a path is found, and if there exists no such pair, then there exists a minimum positive integer $\ell>1$, and nodes a and b in layers m and m+$\ell$ (generally not unique), such that there are directed paths from $v^-$ to a and from b to $v^+$; in this case, add a minimal number of edges to construct a directed path from a to b, and proceed to the next input-output pair, or halt if the desired connectivity is achieved.

Definition (MIO algorithm): The metric input-output algorithm, or MIO algorithm, is defined by modifying the GIO algorithm to the metric context in the obvious way, by choosing the pairs a and b to be at minimal metric distance from each other.

If N has significant local structure (for example, if N is a CNN), then choosing linear orders on $V^\pm$ in the most naïve way in the GIO or MIO algorithm can result in most of the "new" edges being concentrated on one side of the network. For balance, random linear orders may be chosen. In the MIO algorithm, different levels of priority may be given to the number of layers separating a and b versus the metric distance between a and b. For example, one choice of a and b might be separated by 3 layers, but on opposite sides of the network from a metric perspective, whereas another choice might be separated by 5 layers, but metrically close. Several different versions of the algorithm may be defined via such considerations. Neither algorithm minimizes the number of added edges needed to connect $v^-$ to $v^+$, since non-optimal choices of a and b may leverage long pre-existing intermediate paths in the network. However, searching for such "shortcuts" may be much more demanding because it is essentially global. Passing once through the lexicographic order on $V^- \times V^+$ results in 100% connectivity. Often adding an edge or path will connect more than one new input-output pair. Storing data about intermediate connections can speed up the algorithms. Performing either algorithm on a very poorly-connected graph may result in a computationally poor network like the one in Diagram 1 in FIG. 4A, so such algorithms are most useful for "touching up" highly-connected graphs. If applications limit the overall number of edges, then edges that do not affect input-output connectivity may be randomly deleted, if any such edges exist. Typically, such edges should be chosen from among the nonlocal edges in the network, so as not to interfere with homogeneity of local structure defined by a kernel architecture. If the same number of edges are added and deleted, then the overall effect is to adjust or reconnect a certain number of edges.

Locality (property L) makes sense only if G is a metric digraph. It means $\mathcal{N}$ that the G-network $\mathcal{N} = (G, \mathcal{P})$ has a large proportion of short edges. Locality is measured by taking the $\mathcal{P}$-weighted average of ratios of average edge lengths of N and G, where N ranges over N(G). When dealing with a specific subgraph, such as a specific output of a NACA, no weighted average is needed.

Definition (locality): Let G be a metric digraph, N a node-complete subgraph of G, and $\mathcal{N} = (G, \mathcal{P})$ a G-network. The locality L(N) of $\mathcal{N}$ is the ratio $\ell(N)/\ell(G)$ of average edge lengths of N and G. The locality $L(\mathcal{N})$ of $\mathcal{N}$ is the $\mathcal{P}$-weighted average $$L(\mathcal{N}) := \sum_{N \in N(G)} \mathcal{P}(N) L(N).$$

Optimizing the locality $L(\mathcal{N})$ means making it small, which may seem like a counterintuitive choice of definition. However, it is convenient to have both $C(\mathcal{N})$ and $L(\mathcal{N})$ fall between 0 and 1 for a typical SLC-network. For a general G-network, $L(\mathcal{N})$ lies in the interval $[0, \infty)$. Values less than 1 mean that $\mathcal{P}$ selects for "short" edges, while values greater than 1 mean that $\mathcal{P}$ selects for "long" edges. E is assumed to be nonempty to avoid division by zero. $L(V)=0$ by convention. A prototypical local G-network with good sparsity and homogeneity is a pure CNN. A random G-network has poor locality, since its average edge length is comparable to the overall size of the network. Since locality is defined relative to G, the same digraph N may have different locality viewed as a subgraph of two different ambient digraphs. In practice, this is rarely a problem, since the structure of G is largely dictated by the application.

Random G-networks are often used as "benchmarks" for the sparsity and/or connectivity of other networks. A particular 1-parameter family of uniformly random G-networks is especially useful for this role.

Definition (uniform random networks): Let $G=(V, E, \alpha, \omega)$ be a digraph, and let $\delta$ be an element of the unit interval $I=[0,1]$. The uniform random G-network of density $\delta$, denoted by $\mathcal{R}_G(\delta)$, is the G-network given by selecting $\lfloor \delta |E| \rfloor$ edges of G randomly with equal probability. $S_G(\delta)$ is used as an abbreviation for the sparsity $$S(\mathcal{R}_G(\delta)) \approx \frac{1}{\delta} \text{ of } \mathcal{R}_G(\delta).$$

Similar abbreviations are used for other properties such as locality $L_G(\delta)$, integrated intermediate connectivities $v_G(\delta)$, $\in_G(\delta)$, and $\pi_G(\delta)$, input-output connectivity $C_G(\delta)$, and volume connectivity $C_{G,vol}(\delta)$.

$\lfloor \delta |E| \rfloor$ means the floor function of $\delta$ (i.e. the largest integer not exceeding $\delta$) times the cardinality $|E|$ of the edge set E. $\mathcal{R}_G(\delta)$ is a discrete 1-parameter family of networks with parameter $\delta$. In fact, $\delta$ is "quantized" in units of $1/|E|$, but the floor function allows for naïve real-valued choices of $\delta$. Alternatively, one could define a 1-parameter family $\mathcal{R}_G(p)$, where p is a uniform probability of including each edge in the network. The difference between the two families is that $\mathcal{R}_G(\delta)$ is supported on subgraphs with exactly $\lfloor \delta |E| \rfloor$ edges, while $\mathcal{R}_G(p)$ is merely sharply peaked near the value of $p|E|$ edges, with nontrivial probability for every subgraph (if $p \neq 0$). For large G, the two families are "almost identical" for $p=\delta$. Working in terms of $\mathcal{R}_G(\delta)$ is convenient for a NACA involving a specific number of edges. The connectivities $C_G(\delta)$, $C_{G,vol}(\delta)$, $n_G(\delta)$, $e_G(\delta)$, and $p_G(\delta)$, are well-defined monotone-increasing functions of $\delta$. Their precise functional forms are known in only a few cases, but numerical approximation is usually sufficient for applications. Examples: if G is bipartite with generations of $L_0$ and $L_1$ nodes, then $$C_G(\delta) = \frac{\delta}{L_0 L_1}.$$

It has been proven that if G is strictly-graded with 3 generations of L nodes each, then $$C_G(\delta) = \frac{1}{\binom{2L^2}{\delta}} \sum_{n=1}^{L} (-1)^{n+1} \binom{L}{n} \binom{2L^2 - 2n}{\delta - 2n}.$$

If G is strictly-graded with M generations of L nodes each, and L is much larger than M, then a reasonable approximation is $$C_G(\delta) \approx 1 - \exp\left(-\frac{\delta^{M-1}}{(M-1)^{(M-1)} L^M}\right).$$

For large G, $\mathcal{R}_G(\delta)$ typically achieves large $C_G(\delta)$, say 0.99, with small $\delta$, say 0.01. This illustrates the fact that random networks tend to be sparse and highly-connected. In a random or mostly random network, high input-output connectivity (perceptivity) is a reliable indicator of high volume connectivity or integrated intermediate connectivity (computational richness), because the presence of at least one connection between almost every input-output pair correlates strongly with the presence of many connections between typical pairs. The same is true for a highly local network, since if even typical "distant" pairs are connected, then many connections will exist between typical pairs at short or intermediate distances. However, the "bottleneck" example in Diagram 1 in FIG. 4A demonstrates that input-output connectivity is much less correlated with other measures of connectivities in the general case.

When comparing an arbitrary G-network $\mathcal{N}$ to a corresponding uniform random G-network $\mathcal{R}_G$, ratios of connectivities at a common density, or ratios of sparsities at a common connectivity, are often used. If such a ratio exceeds 1, then $\mathcal{N}$ is said to exhibit an advantage with respect to the property under consideration, which may be quantified as the appropriate ratio minus one. In particular, for the hybrid local/nonlocal ANN architectures described below, the term hybrid advantage is sometimes used.

Definition (sparsity/locality/density advantages): Let G be a digraph, $\mathcal{N}$ a G-network, and $\mathcal{R}$ a corresponding uniform random G-network. If $\mathcal{N}$ and $\mathcal{R}$ share the same connectivity according to some global measure of connectivity such as input-output connectivity C, then the common-connectivity sparsity advantage/disadvantage of $\mathcal{N}$ with respect to $\mathcal{R}$ is the quantity $S(\mathcal{N})/S(\mathcal{R})-1$. If G is a metric digraph and $\mathcal{N}$ and $\mathcal{R}$ share the same density, then the common-density locality advantage/disadvantage of $\mathcal{N}$ with respect to $\mathcal{R}$ is the quantity $L(\mathcal{R})/L(\mathcal{N})-1$. If $\mathcal{N}$ and $\mathcal{R}$ share the same density, then the common-density input-output connectivity advantage/disadvantage of $\mathcal{N}$ with respect to $\mathcal{R}$ is the quantity $C(\mathcal{N})/C(\mathcal{R})-1$.

Figure 13:
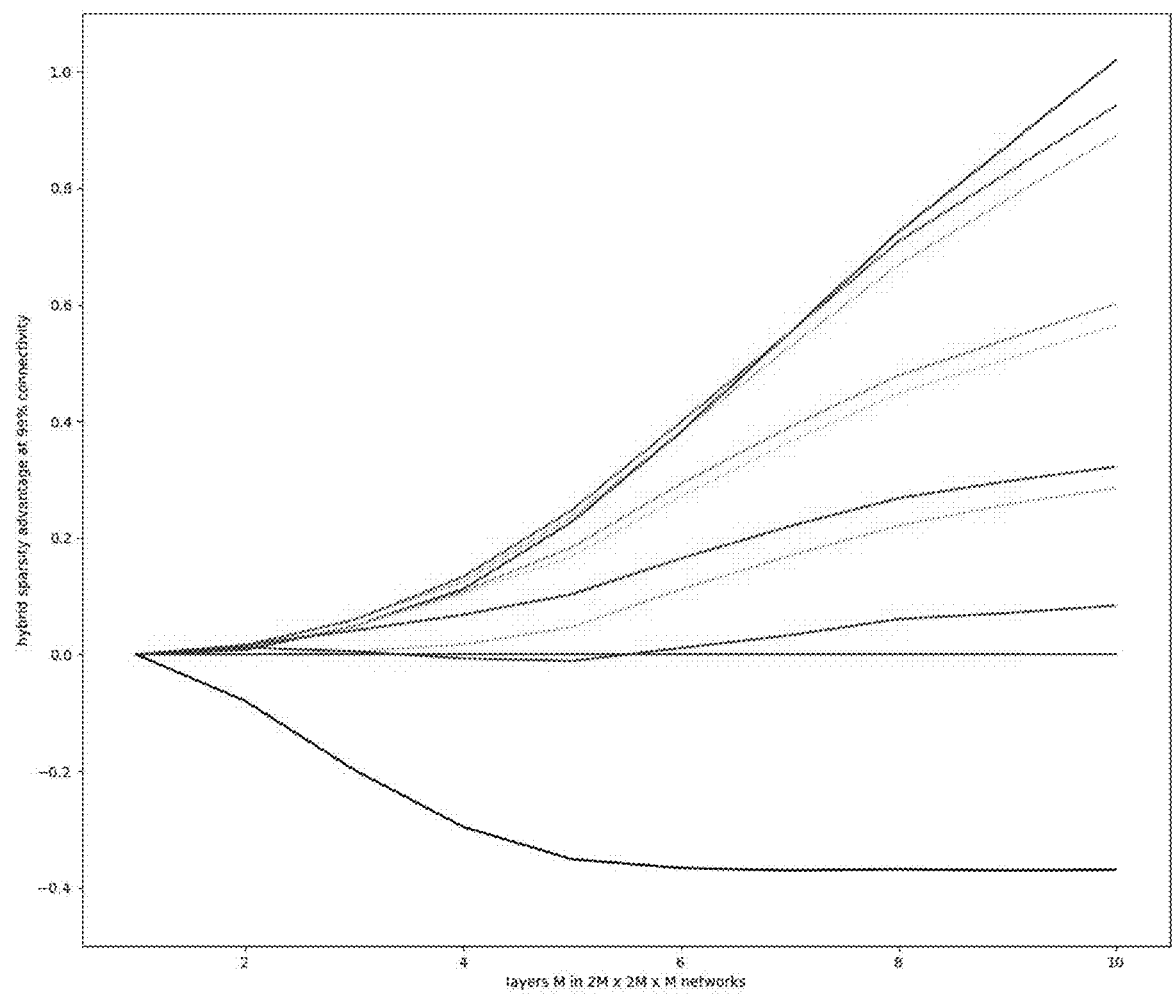
FIG. 13 shows variable hybrid sparsity advantage for 2M×2M×M networks with 99% input-output connectivity as network size increases, in accordance with several different embodiments of the present invention.
Figure 14:
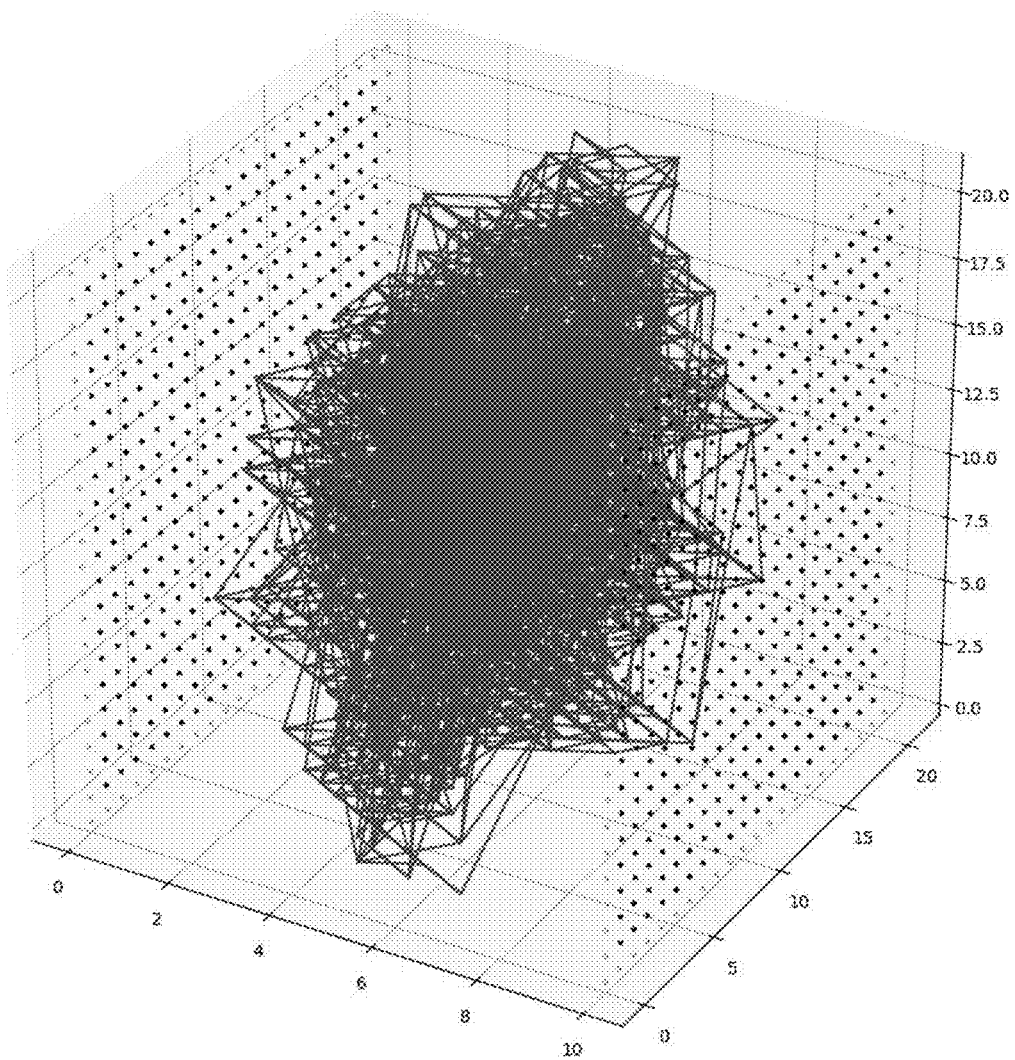
FIG. 14 illustrates the extreme increase in connectivity between a typical input-output pair of nodes induced by adding a small proportion of random edges to the kernel architecture of a 20×20×10 D4-net, in accordance with one embodiment of the present invention.

Many other such comparisons may be defined, for example, using different measures of connectivity, or using a fixed locality. Also, plain ratios may be used, rather than differences between ratios and the unit ratio. The inverted ratio $L(\mathcal{R})/L(\mathcal{N})$ may also be used, since small locality is optimal. For very large networks, considerable computational resources may be required merely to test basic network architectural properties such as input-output connectivity. This prompts the study of how sparsity/locality/density advantages scale with network size for small networks of fixed shape. Using common-density input-output connectivity advantage as an example, this may be done by first fixing a target connectivity, then constructing a sequence $\mathcal{N}_1, \mathcal{N}_2, \ldots$ of networks of fixed shape and increasing size that achieve the target, and tracking their advantages over corresponding random networks $\mathcal{R}_1, \mathcal{R}_2, \ldots$ sharing the same density. To be clear, $\mathcal{R}_i$ shares the same density as $\mathcal{N}_i$, but typically neither sequence $\mathcal{N}_1, \mathcal{N}_2, \ldots$ or $\mathcal{R}_1, \mathcal{R}_2, \ldots$ maintains a constant density as i increases, because lower density typically achieves the target connectivity for larger networks. FIG. 13 illustrates how sparsity advantage at the common input-output connectivity of 99% scales with network size for small 3D 2M×2M×M HLE-nets with ten different kernel seeds.

SLC-networks are now defined. Their precise degree of sparsity is application-dependent, so they are classified in terms of their behavior relative to random networks and CNNs of similar size and/or density.

Definition (SLC-networks): Let G be a metric digraph, and let $\mathcal{N}$ be a G-network of density $\delta \ll 1$. Then $\mathbf{N}$ is called a sparse local connected G-network, or SLC-network, if its locality is small (comparable to that of a typical CNN of similar size) and its connectivity is large (comparable to that of $\mathcal{R}$ G($\delta$)).

The measure of connectivity used in the definition of SLC-networks is not specified, because it is more convenient to use multiple different measures to define multiple different varieties of SLC-networks. Examples illustrate why the phrase "comparable to" in the definition of SLC-networks is reasonable. For instance, in a typical image-classification problem involving 224×224-pixel images, the average edge length of a highly-connected but nonlocal random network $\mathcal{R}$ might be 25 times that of a poorly $\mathcal{R}$ connected but local CNN $\mathcal{C}$ of the same density. It is possible to design a SLC-network $\mathcal{N}$ (again of the same density) with average edge length at most 2 or 3 times that of $\mathcal{C}$, but with higher input-output connectivity than that of $\mathcal{R}$. In this case, the locality and connectivity properties of $\mathcal{N}$ are quite close to those of $\mathcal{C}$ and $\mathcal{R}$, respectively, but it would be unnatural to fix specific cutoffs.

Alternative definitions of SLC-networks incorporating specific cutoffs could be given purely in terms of random networks, e.g., by requiring that $L(\mathcal{N}) < L_G(\delta)$ and $C(\mathcal{N}) > C_G(\delta)$. Such definitions are undesirable for at least three reasons:

(a) Their locality constraints are often too weak. Typically locality close to that of a CNN is needed; surpassing a random network is insufficient.

(b) Their connectivity constraints are often too strong, since near-100% connectivity is not always needed. For example, knowledge of 90% of the pixels in an image is typically enough to decide a class label such as "dog" or "cat" with much greater than 90% accuracy, while a large random network with a density of 1% or 2% will often exhibit >99.9% input-output connectivity, which may be functionally equivalent to 100% connectivity in this setting.

SLC-network construction may be viewed as a problem of discrete optimization, subject to constraints which arise from application-dependent requirements and/or resource limitations. For example, classification accuracy might demand a minimum connectivity, or hardware limitations might impose a maximum parameter space dimension. Specific examples of such problems are:

(a) Minimize $L(\mathcal{N})$ and maximize $S(\mathcal{N})$, subject to a choice of G and $C(\mathcal{N})$.

(b) Minimize $L(\mathcal{N})$ and maximize $C(\mathcal{N})$, subject to a choice of G and $S(\mathcal{N})$.

In maximizing sparsity and connectivity, the goal is to equal or surpass alternative architectures used for similar purposes, unless other considerations are enough to compensate for a modest disadvantages. For example, random networks such as certain X-Nets, or specific SC-networks based on arithmetic constructions such as RadiX-Nets, may be sparser, but lack significant local structure, while CNNs are often more local, but much less connected.

NACAs often include steps in which edges are added to a preexisting structure such as a kernel architecture. In this context, it is convenient to quantify the "value" of a given edge for increasing the connectivity of a subgraph. Connectivity values may be defined for general G-networks via weighted sums.

Definition (connectivity values, individual subgraph): Let $G=(V, E, \alpha, \omega)$ be a digraph with input and output node sets $V^\pm$. Let N be a node-complete subgraph of G, and e an element of $E-E_N$. Let $N_e$ be the subgraph defined by adding e to N. The intermediate-node connectivity value $v_{N,v^-,v^+}(e)$ is the difference $$v_{N_e}(v^-,v^+) - v_N(v^-,v^+).$$

The intermediate-edge connectivity value $\in_{N,v^-,v^+}(e)$ is the difference $$\in_{N_e}(v^-,v^+) - \in_N(v^-,v^+).$$

The intermediate-path connectivity value $\pi_{N,v^-,v^+}(e)$ is the difference $$\pi N_e(v^-,v^+) - \pi_N(v^-,v^+).$$

The input-output connectivity value $C_N(e)$ of e to N is the difference between the number of strongly connected input-output pairs $(v^-, v^+)$ in $N_e$ and N. The volume connectivity value $C_{N,vol}(e)$ of e to N is the difference between the total number of strongly connected node pairs $(v, v')$ in $N_e$ and N. Intermediate connectivity values $v_{N,v^-,v'}(e), \in_{N,v^-,v'}(e)$, and $\pi_{N,v^-,v'}(e)$ may also be summed over input-output pairs $(v^-, v^+)$ of G to yield global integrated intermediate connectivity values $v_N(e), \in_N(e)$, and $\pi_N(e)$.

Definition (connectivity value, G-network): Let G=(V, E, α, ω) be a digraph with input and output sets $V^±$, N a node-complete subgraph of G, $\mathcal{N}$ =(G, $\mathcal{P}$) a G-network, and e an element of E. The intermediate-node connectivity value $\nu_\mathcal{N}$ (e) of e to $\mathcal{N}$ is the weighted sum $$\nu_\mathcal{N}(e) = \sum_{\{N|e \notin E_N\}} \mathcal{P}(N)\nu_N(e).$$

The intermediate-edge connectivity value $\epsilon_\mathcal{N}$ (e) of e to $\mathcal{N}$ is the weighted sum $$\epsilon_\mathcal{N}(e) = \sum_{\{N|e \notin E_N\}} \mathcal{P}(N)\epsilon_N(e).$$

The intermediate-path connectivity value $\pi_\mathcal{N}$ (e) of e to $\mathcal{N}$ is the weighted sum $$\pi_\mathcal{N}(e) = \sum_{\{N|e \notin E_N\}} \mathcal{P}(N)\pi_N(e).$$

The input-output connectivity value $c_\mathcal{N}$ (e) of e to $\mathcal{N}$ is the weighted sum $$C_\mathcal{N}(e) = \sum_{\{N|e \notin E_N\}} \mathcal{P}(N)c_N(e).$$

The volume connectivity value $c_{\mathcal{N},vol}(e)$ of e to $\mathcal{N}$ is the weighted sum $$C_{\mathcal{N},vol}(e) = \sum_{\{N|e \notin E_N\}} \mathcal{P}(N)c_{N,vol}(e).$$

Figure 9:
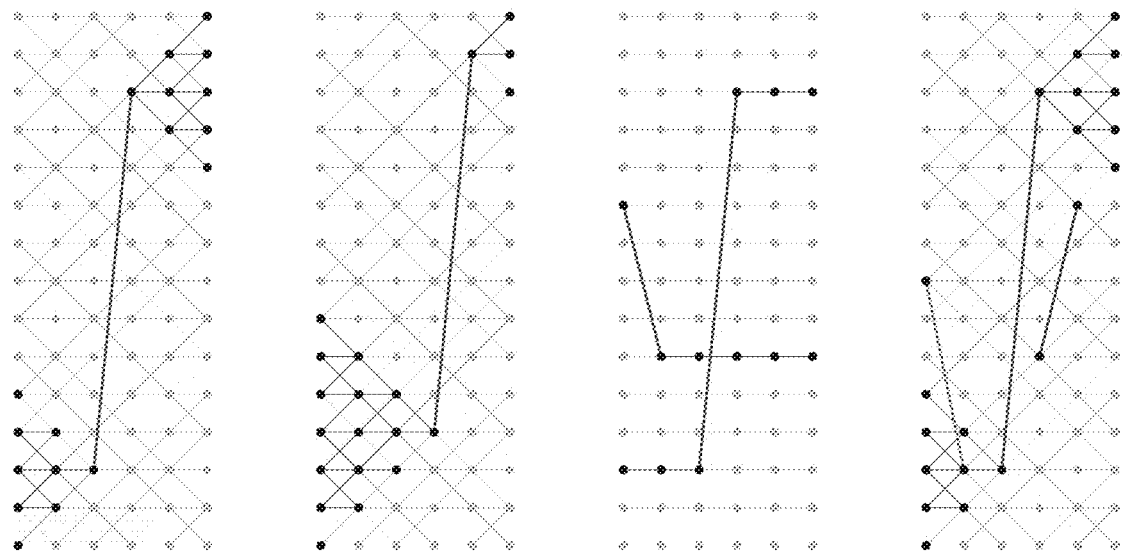
FIG. 9 illustrates the varying connectivity effects ("connectivity values") of adding edges to different layers in a pre-existing architecture, in accordance with one embodiment of the present invention.

An important use of connectivity values is to decide how to distribute nonlocal edges in a network with a predefined kernel architecture. For example, an edge added to the middle layers of a typical CNN, or other network with sufficient local structure, has greater input-output connectivity value than an edge added to an outside layer. This difference is illustrated in FIG. 9, where the input-output connectivity values are 25 (red middle-layer edge in first diagram) versus 21 (red next-layer edge in second diagram) versus 9 (outer-layer edges in either diagram). This is also the rationale for the binomial weight vector in the D4-net example above. Layer-based differences in connectivity value depend on the presence of sufficient local structure in N. For example, both red edges in the third diagram in FIG. 9 have input-output connectivity value 1. Connectivity values can be sensitive/unstable/order-dependent for edge-addition processes, for at least two reasons. First, an added edge e may be "leveraged" by a subsequent added edge e' to create connections that would not have been created by e' alone; for example, if the green edge in the fourth diagram of FIG. 9 is added after the red edge, then it can leverage the red edge to create more connections. Second, an added edge e may "claim rights" to connections that would otherwise have been attributed to a subsequent added edge e'. For example, if the blue edge in the same diagram is added after the red edge, then some of the connections it creates are already "claimed" by the red edge.

A useful way to describe the locality and connectivity properties of G-networks is via LC phase plane diagrams, which are now introduced.

Definition: Let G be a metric digraph. An LC-plane for G is a copy of the subset $[0, \infty) \times I$ of the Euclidean plane $\mathbb{R}^2$, where the first coordinate measures locality for a G-network $\mathcal{N}$, and the second coordinate measures connectivity.

Figure 4B:
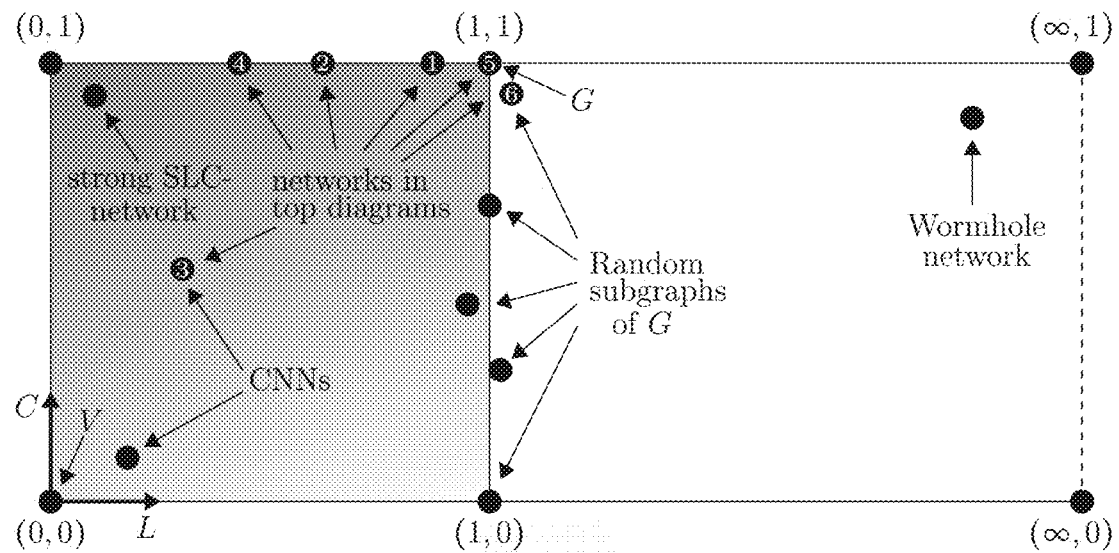
FIG. 4B shows a locality/connectivity or LC phase plane representation for various networks, including the six shown in the top diagram, in accordance with several different embodiments of the present invention.

Examples: FIG. 4B illustrates an LC-plane using input-output connectivity for the second coordinate, with nodes showing the locations of various G-networks explained below. SLC behavior for a given sparsity is characterized by proximity to the point {0,1} in the LC-plane. LC-plane positions are shown for a few representative G-networks, which illustrate the exceptional nature of strong SLC-behavior. Input-output connectivity is used for the second coordinate. Shading indicates "strength of SLC behavior" classified on this basis.

G as a G-network. L(G)=1 by the definition of locality, since G is a subgraph of itself. Similarly, C(G)=1 by the definition of input-output connectivity. G therefore appears at the point (1,1) in the LC-plane. G is dense by definition; for example, Diagram 6 in FIG. 4A shows a choice of G for a small 2-dimensional lattice-Euclidean or LE-network. Besides being dense, G is usually non-local; average edge lengths in a typical CNN of similar size are usually much smaller, often by orders of magnitude. Hence, G is usually not even close to being a SLC-network.

No edges. In this case, L(V)=0 by convention, so that V is "vacuously local." Clearly C(V)=0 as well. V therefore appears at the point (0,0) in the LC-plane. Since it is totally disconnected, it is not close to being a SLC-network.

Typical CNN. Let $\mathcal{N}$ =N be a 3-dimensional CNN with M layers (M+1 generations including inputs), each consisting of $l^2$ nodes, and 2-dimensional k×k kernel, where k=2h+1 is odd. Identify the node set V of $\mathcal{N}$ with an l×l×(M+1) family of lattice points in $\mathbb{R}^3$, with coordinates (x, y, t). G is the dense strictly graded metric digraph with grading induced by the t-coordinate and metric induced by the Euclidean metric. For large l, the average edge length $\ell$ (G) in G is slightly more than the average distance between two points in a square of side length l, i.e., $$\ell(G) \approx \frac{l}{15}(2 + \sqrt{2} + 5\log(1 + \sqrt{2})) \approx .5214l.$$

Meanwhile, k is a safe overestimate for the average distance between nodes in the kernel. Hence, $$\frac{k}{l} < L(\mathcal{N}) < \frac{2k}{l}.$$

The perceptive field of an input node has size at most $$((2M-1)h+1)^2 < M^2k^2$$

in the output layer, and at least half this value for large l. Hence, $$\frac{M^2k^2}{2l^2} < C(\mathcal{N}) < \frac{M^2k^2}{l^2}.$$

Reasonable values for M, l, and k might be 16, 224, and 5, producing overestimates L($\mathcal{N}$)<0.05 and C($\mathcal{N}$)<0.05. $\mathcal{N}$ is therefore quite local but poorly connected. A typical $\mathcal{N}$ random subgraph of G of the same density has nearly 100% connectivity, so such a CNN is not close to being a SLC-network.

Random subgraph of G. A random subgraph N of G, chosen with uniform probability, has locality L(N)≈1, and connectivity between 0 and 1, depending on its density. It therefore lies near the vertical line from (1,0) to (1,1) in the LC-plane. It is much less local than a typical CNN, and is therefore not even close to being a SLC-network.

Wormhole network. The case L($\mathcal{N}$)>>1 rarely merits consideration in its own right, but such behavior may occur in the residual part of a SLC-network given by deleting local structure, usually defined via a kernel architecture. Typical edges in such a residual network are longer than the average for G, and are therefore analogous to wormholes directly connecting distant galaxies. Since it is very nonlocal, such a network is not close to being a SLC-network.

Networks from FIG. 4A. FIG. 4A illustrates a family of six small 2-dimensional lattice-Euclidean or LE-networks. Below each network is a triple of numbers (D, L, C), where D is the density, L is the locality, and C is the input-output connectivity. The sixth network is the ambient digraph G for the family. The first network is the "bottleneck" network discussed above, which is sparse and highly connected (in terms of C, though not in terms of $C_{vol}$ or the intermediate measures of connectivity), but not much more local than G. The second network is a small RadiX-net (before applying the Kronecker product with an auxiliary network). It is sparse and highly connected, but not very local. The third network is a small CNN. It is sparse and local, but not very connected. The fourth network is a hybrid network combining the CNN kernel architecture of the third network with sparse nonlocal structure. It is not quite as local as the CNN, but exhibits the best overall SLC behavior of the five networks. The fifth network is a sparse random network, which is mostly connected but not very local.

Hybrid SLC-Network NACAs Via Geometric Embeddings

This section describes geometry-induced network architecture construction algorithms (GINACAs) for specific classes of hybrid SLC-networks whose SSPs combine local structure, often chosen deterministically, with sparse nonlocal structure, often chosen nondeterministically. Properties of sample networks are demonstrated via Python scripts.

The following NACAs are included:
(a) Hybrid lattice-Euclidean (HLE) NACA 0, a general NACA for SLC-networks whose nodes are subsets of a Euclidean lattice.
(b) HLE NACA 1, which combines an m-homogeneous deterministic local kernel architecture with a weighted-random nonlocal edge addition process.
(c) HLE NACA 2, which combines two m-homogeneous deterministic kernel architectures, one local and one nonlocal.
(d) HLE NACA 3, which is defined via a non-deterministic distance-dependent edge-selection process producing both local and nonlocal structure.
(e) Hybrid lattice-torus (HLT) NACA 0, a general NACA for SLC-networks whose nodes are subsets of a lattice on a cylinder $T^u \times \mathbb{R}$ over a torus $T^n$.
(f) HLT NACA 1, which combines an m-homogeneous deterministic local kernel architecture with a weighted-random nonlocal edge addition process.
(g) HLT NACA 2, which combines two m-homogeneous deterministic kernel architectures, one local and one nonlocal.
(h) HLT NACA 3, which is defined via a non-deterministic distance-dependent edge-selection process producing both local and nonlocal structure.

The SLC-networks resulting from these NACAs are described as "hybrid" because they combine "opposite" types of structure: primarily local/nonlocal, but also deterministic/nondeterministic. Alternatively, they could be described via individual kernel architectures or edge-selection processes, for example, by including a few specified local edges with probability 1 and remaining edges with much lower probabilities. However, the hybrid viewpoint is advantageous for several reasons. First, distinguishing between local/nonlocal and deterministic/nondeterministic aspects of structure elucidates why the networks exhibit certain properties. Second, fruitful comparisons may be made among different local kernel architectures augmented via identical or very similar nonlocal edge-selection processes. Third, weight-sharing in a kernel architecture may give local edges qualitatively different meaning than nonlocal edges in terms of the number of network parameters they generate.

NACAs typically contain more information than just a digraph G and SSP P, since they specify both a product and a method. Usually, they involve detailed lists of arguments, such as a manifold, a metric, coordinates, nodes, edges, etc.

The general GINACA "unpacks" a network architecture from schematic form involving four types of structure $\mathbb{N}$ (geometric data, digraph data, local data, nonlocal data), to yield a specific output architecture N involving a list of arguments $$N(X,g,\Psi,V,E,\alpha,\omega,V^\pm,\mathcal{K},\Omega),$$

where X, g, $\Psi$ are the geometric data, V, E, $\alpha$, $\omega$, $V^\pm$ are the digraph data, $\mathcal{K}$ is the local data, and $\Omega$ is the nonlocal data.

The geometric data is described in more detail as follows: X is a space such as a real manifold, g is a choice of geometric structure on X, which induces a metric d on the to-be-constructed ambient digraph G, $\Psi$ is a choice of local analytic-geometric structure on X, such as compatible family of coordinate systems $\psi_i=(x_i, t_i): U_i \to \mathbb{R}^n \times \mathbb{R}$, where $\{U_i\}_{i \in \mathcal{I}}$ is a family of subsets of X, and $\mathcal{I}$ is an index set.

The digraph data is described in more detail as follows: V is a finite subset of $U:=\bigcup_{i \in \mathcal{I}} U_i \subset X$, identified as the node set of G, E is a dense subset of the edge set of the full digraph F over V induced by $\Psi$, identified as the edge set of G, $\alpha$ is the restriction to E of the initial node map $\alpha_F$ of F, identified as the initial node map of G, $\omega$ is the restriction to E of the terminal node map $\omega_F$ of F, identified as the terminal node map of G, and $V^\pm$ are subsets of the sets of maximal and minimal nodes of the ambient digraph G:=(V, E, $\alpha$, $\omega$), identified as input and output sets for the network.

The local data is described in more detail as follows: $\mathcal{K}$ is a local kernel architecture, used to select a subgraph N$\mathcal{K}$ of G or of a larger digraph G'⊃G defined via padding.

The nonlocal data is described in more detail as follows: $\Omega$ is a non-local edge-selection process (usually an edge-inclusion or edge-addition process, though sometimes a nonlocal kernel architecture), used to augment the existing structure of $N_{\mathcal{K}}$, or a special pruned subgraph, to produce the output subgraph N of G after removing padding.

Such a list of arguments may be modified in cases where part of the geometric or digraph structure is already specified, or where additional auxiliary structure is needed to specify some of the ingredients. For example, if X is already specified to be $\mathbb{R}^{n+1}$ with the Euclidean metric and the Cartesian product coordinate system $\Psi_x:=(x,t)$, then the three arguments X, g, $\Psi$ may be replaced by the single natural-number argument n. On the other hand, if V is chosen to be an intersection $\Lambda \cap U \subset X$, where X is $\mathbb{R}^{n+1}$ or a quotient space such as a torus, $\Lambda$ is a lattice in X, and $U \subset X$ is a subset, then the single argument V may be replaced by the pair of arguments $\Lambda$ and U.

Hybrid Lattice-Euclidean Networks (HLE-Nets)

This section provides NACAs for hybrid lattice-Euclidean networks, or HLE-nets, such as the D4-nets and TO-nets described above. The non-degenerate case is emphasized. To preview the terminology, elaborated below, hybrid means that these NACAs combine local structure, often deterministic, with nonlocal structure, often non-deterministic; Euclidean means that the underlying geometric space X is $\mathbb{R}^{n+1}$ with the Euclidean metric and the Cartesian product coordinate system; lattice means that the node set V is a finite subset of a lattice $\Lambda \subset \mathbb{R}^{n+1}$ and non-degenerate means that the local kernel architecture, when one is used, has dimension at least n.

Definition (Euclidean Networks): Let $X=\mathbb{R}^{n+1}$ with the Euclidean metric, and let $\Psi_x=(x, t)$ be the Cartesian product coordinate system on $\mathbb{R}^{n+1}$. Let $V \subset \mathbb{R}^{n+1}$ be a finite subset, and let G be a dense subgraph of the full digraph F over V induced by $\Psi_x$. A Euclidean network, or E-net, is a G-network $\mathcal{N}=(G,\mathcal{P})$ for such a choice of G. A lattice-Euclidean network, or LE-net, is an E-net whose node set V is a subset of a lattice $\Lambda \subset \mathbb{R}+^{n+1}$. A local lattice-Euclidean network, or LLE-net, is a LE-net whose SSP is defined in terms of local structure, usually via a local kernel architecture $\mathcal{K}$. A random lattice-Euclidean network, or RLE-net, is a LE-net whose SSP is defined via a weighted-random edge-selection process $\Omega$. A hybrid lattice-Euclidean network, or HLE-net, is a LE-net whose SSP combines local structure, usually defined via a local kernel architecture $\mathcal{K}$, and nonlocal structure, usually defined via a weighted-random edge-selection process $\Omega$.

Other network families may be specified by combining the attributes "sparse," "local," "connected," "lattice," "Euclidean," "random," and "hybrid" in different ways. While "L" may stand for either "local" or "lattice," most of the networks provided by the present invention are hybrid networks that are assumed by default to combine local and nonlocal properties. Hence, in this section, "L" means "lattice" unless stated otherwise. Any FFN may be realized as a E-net, and even as a LE-net, although this may require a complicated choice of lattice points. These broad network types are too general to be associated with specific NACAs.

A LLE-net architecture may be described via a list of arguments:

$N(n,\Lambda,U,E,\alpha,\omega,V^{\pm},\mathcal{K})$, where argument 1 specifies the dimension n+1, arguments 2-7 specify the ambient digraph G with its inputs and outputs, and argument 8 specifies the kernel architecture, which determines the SSP. Typical CNNs are LLE-nets.

A RLE-net architecture may be described via a list of arguments of the form:

$N(n,\Lambda,U,E,\alpha,\omega,V^{\pm},\Omega)$, where the only difference from the LLE-net case is that a non-local edge-selection process $\Omega$ determines the SSP instead of a local kernel architecture. Sparse random networks such as random X-Nets are RLE-nets.

A HLE-net architecture may be described via a list of arguments:

$N(n,\Lambda,U, E, \alpha,\omega,V^{\pm},K,\Omega)$, including both local structure $\mathcal{K}$ and nonlocal structure $\Omega$ in its SSP. Occasionally, both local and non-local structure may be combined in a single edge-selection process $\Omega$, as in the HLE NACA 3 below. RadiX-Nets may be realized as degenerate HLE-nets with 0-dimensional kernel architectures, where the underlying geometric space is $\mathbb{R}^2$.

A non-degenerate kernel architecture in a LLE-net or HLE-net can detect, in a single step, data features of the same geometric dimension as the input data. For example, if $\mathcal{N}$ is a 3D network designed for gray-scale image classification, then the input data is a 2D family of pixels, and a 2D kernel is necessary to detect a 2-dimensional feature in a single step. However, the following factors encourage consideration of technically degenerate architectures in some cases:

(a) Complementary degenerate kernels in a sequence of layers, analogous to crossed polarization filters, can detect high-dimensional features over several steps; the notion of non-degeneracy may therefore be generalized to incorporate cases in which small families of consecutive layers are designed to work together as "generalized layers" or network "subunits."

(b) One of the layer dimensions in a network may parameterize different kernel architectures, representing different "data filters;" for example, a 4-dimensional network using multiple filters might be used for gray-scale image classification. In this case, geometric correlations in the input data are still at most 2D. The definition of non-degeneracy may therefore be adjusted by one dimension in the case of multiple kernel architectures.

(c) The proper structural understanding of non-degeneracy is unchanged by such considerations; in all cases, it means that the kernel architecture accommodates the geometric complexity of the data.

HLE NACA 0

A general NACA for constructing HLE-nets is now provided. It is numbered 0, to distinguish it from subsequent special cases with positive integer labels.

Definition (HLE NACA 0): The general hybrid lattice-Euclidean network architecture construction algorithm, or HLE NACA 0, has the following steps:

(a) Geometric data:
 (i) Choose a natural number n. Define $X:=\mathbb{R}^{n+1}$, with the Euclidean metric g and the Cartesian product coordinate system $\Psi_x:=(x, t)$. The direction of data flow is defined to be the positive-t direction.

(b) Digraph data:
 (i) Choose a lattice $\Lambda \subset \mathbb{R}^{n+1}$, and a subset $U \subset \mathbb{R}^{n+1}$. Define $V=\Lambda \cap U$ as the node set for the network. Let $F=(V, E_F, \alpha_F, \omega_F)$ be the full digraph over V induced by $\Psi_x$.
 (ii) Choose an edge set $E \subset E_F$, and define initial and terminal node maps $\alpha, \omega:E \to V$ by restricting $\alpha_F$ and $\omega_F$, such that the digraph $G:=(V, E, \alpha, \omega)$ is dense with respect to F. G is the ambient digraph for the network. Define a metric d on G by restricting the Euclidean metric to V. (G, d) is then a metric digraph.

(iii) Choose input and output node sets $V^{\pm} \subset V$ as subsets of the sets of maximal and minimal nodes of G, respectively.

(c) Local data:

(i) Optionally, choose a subset $W \subset V$, called the homogeneous node set, over which G is g- or m-homogeneous to some radius in the negative direction.

(ii) Optionally, choose padding for G to yield a larger digraph $G'=(V', E', \alpha', \omega')$, homogeneous over a larger node set.

(iii) For some node $v \in V$, choose as a kernel seed a pointed metric subgraph $(K_v, d, v)$ of the g-star $\bigstar_{G,1}^-(v)$, of small m-radius, where d is the metric on G restricted to $K_2$.

(iv) Choose an isomorphic or isometric image of $(K_v, d, v)$ at each node in some set W' of V or V'.

(v) Choose a kernel architecture $\mathcal{K}$ over W' by assigning probabilities to the edges in the chosen images of $(K_v, d, v)$.

(vi) Choose an edge set $E_{\mathcal{K}}$ for a node-complete subgraph $N_{\mathcal{K}}$ of G or G' by applying the probabilities encoded by $\mathcal{K}$.

(vii) Optionally, repeat items i through vi with additional kernel architectures, to choose different types of local or mesoscale structure. Denote by $N_{\mathcal{K}}$ the subgraph of G or G' defined by all its kernel architectures.

(viii) Optionally, prune $N_{\mathcal{K}}$ to obtain a special subgraph, such as a topologically connected component. Reassign the notation $N_{\mathcal{K}}$ to this subgraph.

(d) Nonlocal data:

(i) Choose and apply a nonlocal edge-selection process $\Omega$ to the dual graph $N_{\mathcal{K}}^*$ of $N_{\mathcal{K}}$, to augment the existing structure of $N_{\mathcal{K}}$ with an addition set $E_\Omega$ of edges from $E - E_{\mathcal{K}}$.

(ii) Optionally, add or adjust a small number of edges to increase input-output connectivity.

(iii) Apply further pruning and/or strip away padding if necessary. The resulting subgraph
N(n, Λ, U, E, α, ω, $V^{\pm}$, $\mathcal{K}$, $\Omega$)
of G, viewed as an ANN architecture, is the final output of the HLE NACA 0.

Previous discussion of the general GINACA applies to the HLE NACA 0. In some cases, judicious choice of U can eliminate the need for pruning. For example, the TO-nets in an earlier example may be obtained by choosing a 3D "checkerboard-shaped" subset, rather than by pruning a D4-net. However, the pruning approach is more natural in this case, because a baroque choice of subset can only be motivated by knowledge of the properties of the kernel architecture, which may not be evident before it is constructed. Choice of U could be placed either in "geometric data" or "digraph data." The latter is chosen principally because it facilitates a convenient notion of "scaling networks of the same shape" via dilation of U by a constant factor. U may be chosen to be compact without loss of generality, since V must be finite.

HLE NACA 1

More-specific HLE NACAs provided by the present invention are now described. The first such NACA, the HLE NACA 1, is already familiar at an informal level from the examples of D4-nets and TO-nets. Further examples appear below.

Definition (HLE NACA 1): The following HLE NACA 1 describes how to construct a graded HLE-net $\mathcal{N} = (G, \mathcal{P})$, whose individual output architectures N exhibit m-homogeneous deterministic local kernel architectures, and weighted-random families of nonlocal edges.

(a) Geometric data:

(i) Choose a natural number n. Define $X := \mathbb{R}^{n+1}$, with the Euclidean metric g and the Cartesian product coordinate system $\Psi_x(x,t)$. The direction of data flow is defined to be the positive-t direction.

(b) Digraph data:

(i) Choose a lattice $\Lambda \subset \mathbb{R}^{n+1}$.

(ii) Choose a subset $U \subset \mathbb{R}^{n+1}$. Define $V = \Lambda \cap U$ to be the node set for the network. The full digraph F over V induced by the Cartesian product coordinate system $\Psi_x := (x, t)$ includes an edge between nodes $v = (x, t)$ and $v' = (x', t')$ whenever $t < t'$. The non-empty intersections $\Sigma_t(U) \cap V$ form a finite family $\{V_i\}_{i=0}^M$ with strict total order induced by t. Define these to be the network layers.

(iii) Choose a natural number $\ell$ between 1 and M−1 inclusive. Define an edge set E, and initial and terminal node maps α and ω, by placing an edge between each pair of nodes $(v, v') \in V_i \times V_{i+j}$ for $0 \leq i < i+j \leq i+\ell \leq M$. Define $G = (V, E, \alpha, \omega)$ to be the ambient digraph for the network. By construction, G is dense with respect to F, and is g-homogeneous to radius 1 in the negative direction over $V - \bigcup_{i=0}^{\ell-1} V_i$. G is strictly graded if $\ell = 1$, and non-strictly graded if $\ell > 1$. Define a metric d on G by restricting the Euclidean metric to V. (G, d) is then a metric digraph.

(iv) Choose input set $V^- = V_0$ and output set $V^+ = V_M$.

(c) Local data:

(i) For some node $v \in V$, choose as a kernel seed a pointed metric subgraph $(K_v, d, v)$ of the g-star $\bigstar_{G,1}^-(v)$, whose m-radius k is small compared to the m-diameter of G.

(ii) Choose padding, if necessary, to define a larger digraph $G' = (V', E', \alpha', \omega')$ that is m-homogeneous to radius k in the negative direction over the node set $W' := V - V^-$. Padding is defined by extending layers to include additional lattice points in directions orthogonal to the t-axis, adding pre-input layers if necessary, and defining edges between all pairs of nodes in layers with indices differing by at most $\ell$.

(iii) Choose an isometric image of $(K_v, d, v)$ at each node in W'. Define a kernel architecture $\mathcal{K}$ for G or G' over W' by assigning probability 1 to the edges $E_{\mathcal{K}}$ in the chosen images of $(K_v, d, v)$. By construction, $\mathcal{K}$ is m-homogeneous to radius k and deterministic. There is a unique node-complete subgraph $N_{\mathcal{K}}$ of G or G' with edge set $E_{\mathcal{K}}$.

(iv) Optionally, prune $N_{\mathcal{K}}$ to obtain a special subgraph, such as a topologically connected component. Reassign the notation $N_{\mathcal{K}}$ to this subgraph.

(d) Nonlocal data:

(i) Choose and apply a weighted-random edge-inclusion or edge-addition process $\Omega$ to the dual graph $N_{\mathcal{K}}^*$ of $N_{\mathcal{K}}$ to augment the existing structure of $N_{\mathcal{K}}$ with edges from $E - E_{\mathcal{K}}$.

(ii) Optionally, add or adjust a small number of edges to increase input-output connectivity.

(iii) Apply further pruning and/or strip away padding if necessary. The resulting subgraph
N(n, Λ, U, E, α, ω, $V^{\pm}$, $\mathcal{K}$, $\Omega$)

of G, viewed as an ANN architecture, is the final output of the HLE NACA 1.

Previous discussion of the general GINACA and the HLE NACA 0 apply to the HLE NACA 1. G is connected if there are at least two layers $V_i$. The subset U need not be connected; in fact, consecutive nonempty intersections $V_i = \Sigma_r(U) \cap V$ and $V_{i+1} = \Sigma_r(U) \cap V$ may be "far apart" with respect to t, since empty intersections do not count as layers. The subsets of $E - E_{\mathcal{K}}$ defining the partition for $\Omega$ usually consist of all (remaining) edges between pairs of layers of G, or all (remaining) edges of a given length, or within a given length range.

Figure 11:
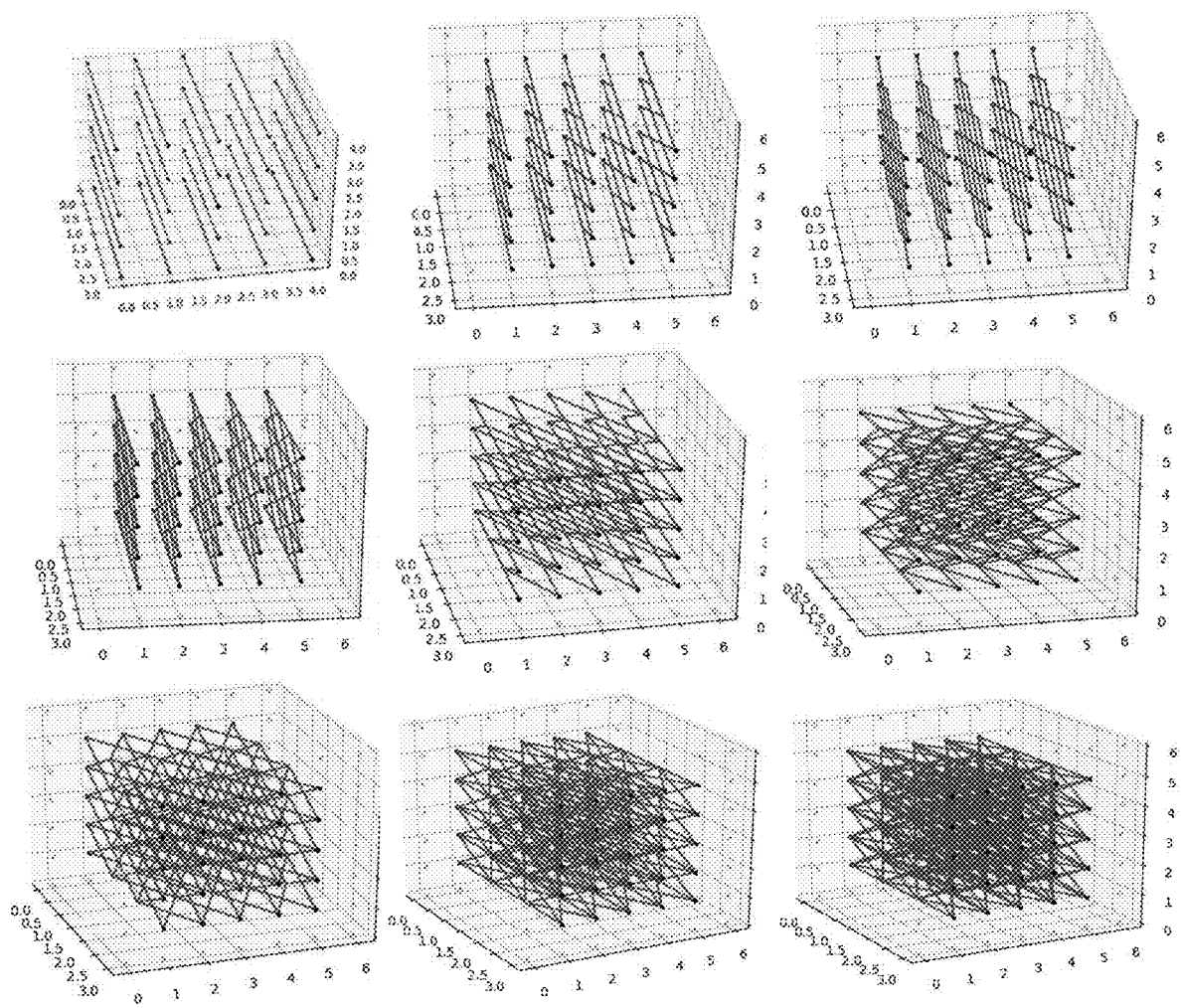
FIG. 11 illustrates the complete kernel architectures for the same networks shown in FIG. 10, in accordance with several embodiments of the present invention.
Figure 12A:
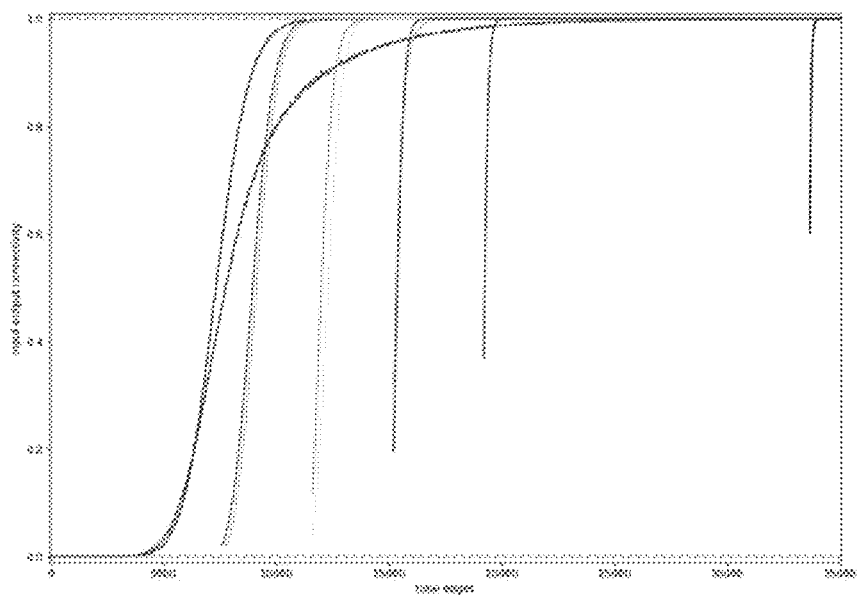
FIG. 12A compares input-output connectivity versus total numbers of edges for ten different 10×20×20 networks, in accordance with several different embodiments of the present invention.
Figure 12B:
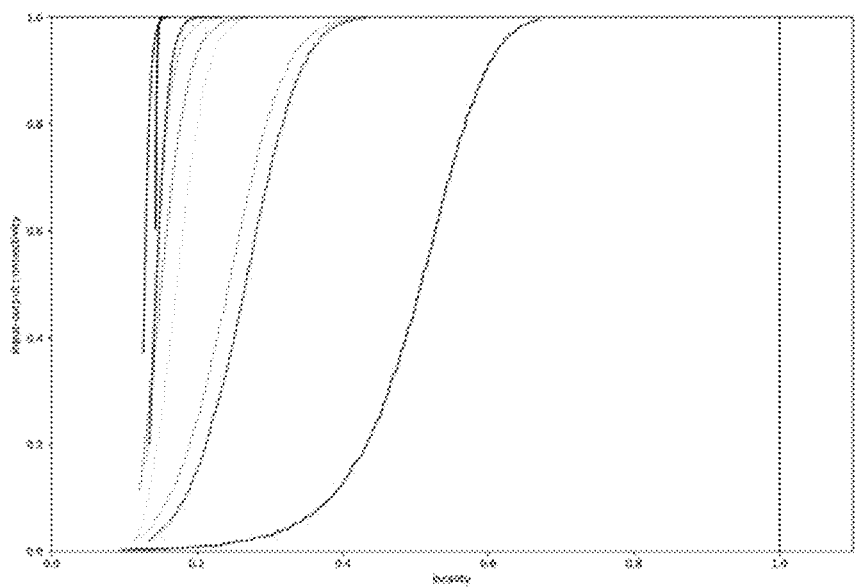
FIG. 12B shows diagram illustrates LC-plane behavior for the same networks, in accordance with several different embodiments of the present invention.

Examples. A few possible output architectures N of the HLE NACA 1 in the case n=2 are now described, using integer lattice points inside the specific discrete hyperrectangle $I_{20}{}^2 \times I_{11}$. In this case, $X = \mathbb{R}^3$, $\Lambda = \mathbb{Z}^3$, and U is the product of closed intervals $[1, 20] \times [1, 20] \times [0,10]$. The size of such N is described as 20×20×10, excluding input nodes by convention. Smaller networks of the same shape are also considered, to demonstrate how certain network properties scale. The ambient digraph G is chosen to be strictly graded; in the 20×20×10 case, it has $1.6 \times 10^6$ total edges. For local structure, subkernels of a 3×3 kernel are used. For non-local structure, a uniform random edge-addition process is employed. Closely-related architectures involving the D4 kernel seed and weighted-random edge-addition processes were discussed previously. Here the focus is on the properties of sparsity, locality, and input-output connectivity, referring to FIGS. 10, 11, 12 and 13 for visualization. In particular, FIG. 12A shows that these networks exhibit phase transitions in input-output connectivity induced by their edge-addition processes. These phase transitions are sharper for larger kernel seeds, as each new edge is able to "leverage" existing local structure in a process resembling crystallization of a supersaturated solution.

Empty kernel seed. In this case, N is a uniform random subgraph, with no regular local structure. The black domino in FIG. 5A encodes the kernel seed, while the green plot in FIG. 12A shows the approximate expected input-output connectivity (i.e., the connectivity of the corresponding G-network $\mathbb{N}$) as a function of total edge number, obtained experimentally by constructing and measuring actual networks. Connectivity reaches 99% at about $2.1 \times 10^4$ edges, or about 1.3% density, and 99.9% at about $3 \times 10^4$ edges, or about 1.9% density. Expected locality is equal to 1 for any number of edges, because edges are selected uniformly from G. LC-plane behavior is represented by the green vertical line in FIG. 12B. The hybrid sparsity advantage at 99% target connectivity, represented by the green line in FIG. 13, is equal to 1 by definition, since N coincides with the uniform random network.

Figure 10:
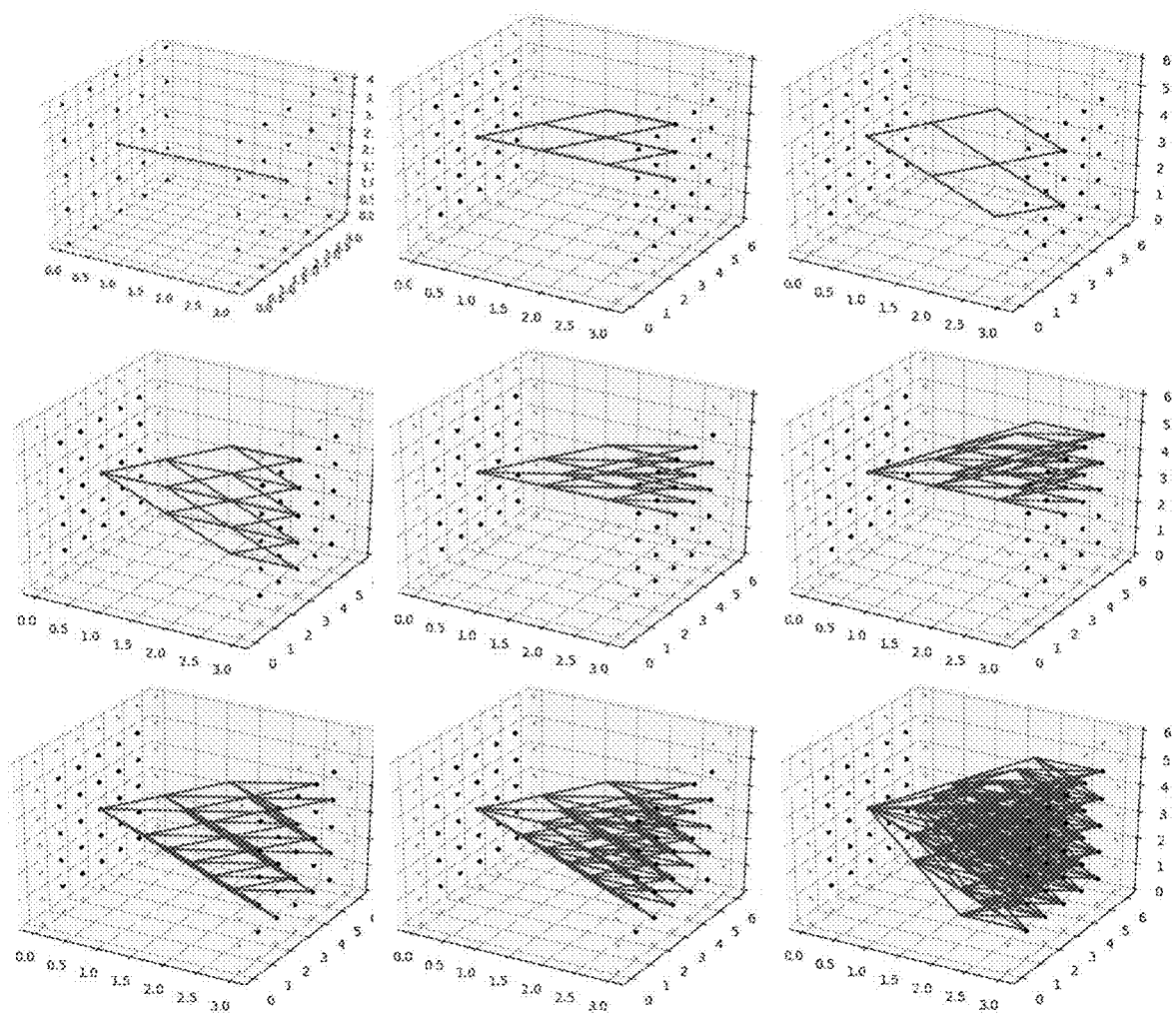
FIG. 10 illustrates horizon growth from central input nodes in 3D-networks with nine different kernel architectures, in accordance with several different embodiments of the present invention.

1×1 kernel seed. In this case, N has minimal nontrivial local structure, similar to that of a RadiX-Net. The blue domino in FIG. 5A and the top-left diagrams in FIGS. 10 and 11 illustrate the kernel architecture (using a smaller 10×10×5 network). The blue plot in FIG. 12A shows how the expected input-output connectivity changes as random edges are added. Connectivity reaches 99% at about $1.05 \times 10^4$ edges, or about 0.66% density, and 99.9% at about $1.2 \times 10^4$ edges, or about 0.75% density. Locality is roughly 0.65 and 0.70 at these values, so the hybrid locality advantage over the corresponding random networks is not very pronounced. LC-plane behavior is represented by the blue curve in FIG. 12B. The blue plot in FIG. 13 shows how the hybrid sparsity advantage at 99% target connectivity scales for networks of size 2M×2M×M for M=1, . . . ,10. The advantage exceeds 1 for M=10, meaning that N uses, on average, less than half as many edges as a uniform random network with the same input-output connectivity. 1×1-kernel HLE-nets seem to be comprehensively superior to their random counterparts; in particular, such networks may be constructed with simultaneously better sparsity, locality, and connectivity properties.

Asymmetric 2×1 kernel seed. In this case, N has more-robust local structure than a 1×1-kernel HLE-net, but the kernel architecture is still degenerate. The light-magenta domino in FIG. 5A and the top-middle diagrams in FIGS. 10 and 11 illustrate the kernel architecture. The light-magenta plot FIG. 12A shows how the input-output connectivity changes as random edges are added. Connectivity reaches 99% at about $1.13 \times 10^4$ edges, or about 0.71% density, and 99.9% at about $1.26 \times 10^4$ edges, or about 0.79% density. Locality is roughly 0.39 and 0.45 at these values, considerably better than for 1×1-kernel HLE-nets. LC-plane behavior is represented by the light-magenta curve in FIG. 12B. The light-magenta curve in FIG. 13 shows that the hybrid sparsity advantage reaches nearly 0.9 for 20×20×10 networks. Asymmetric 2×1-kernel HLE-nets achieve better locality than 1×1-kernel HLE-nets without sacrificing much connectivity advantage, at least for high target connectivity.

"North/south" (NS) kernel seed. This case is similar to the asymmetric 2×1 case, but each non-output node is connected to nodes on either side of its next-layer counterpart. The kernel architecture is again degenerate. The dark-magenta domino in FIG. 5A and the top-right diagrams in FIGS. 10 and 11 illustrate the kernel architecture. The light-magenta plot in FIG. 12A shows how the input-output connectivity changes as random edges are added. Connectivity reaches 99% at about $1.11 \times 10^4$ edges, or about 0.69% density, and 99.9% at about $1.19 \times 10^4$ edges, or about 0.74% density. The latter number shows slightly better efficiency than the 1×1 case, which is surprising since twice as many edges spent building local structure. Locality is roughly 0.41 and 0.45 at these values, slightly less than for asymmetric 2×1-kernel HLE-nets. LC-plane behavior is represented by the dark-magenta curve in FIG. 12B. The dark-magenta curve in FIG. 13 shows that the hybrid sparsity advantage reaches nearly 0.95 for 20×20×10 networks. For very high target connectivity, NS-kernel HLE-nets seem to be comprehensively superior to 1×1-kernel HLE-nets in SLC behavior.

3×1 kernel seed. In this case, the kernel seed is large enough to be 2-dimensional, but is arranged in a 1-dimensional shape, so the kernel architecture is again degenerate. The light-orange domino in FIG. 12A and the middle-left diagrams in FIGS. 10 and 11 illustrate the kernel architecture. The light-orange plot in FIG. 12A shows how the input-output connectivity changes as random edges are added. Connectivity reaches 99% at about $1.37 \times 10^4$ edges, or about 0.86% density, and 99.9% at about $1.42 \times 10^4$ edges, or about 0.89% density. Locality is roughly 0.26 and 0.28 at these values. LC-plane behavior is represented by the light-orange curve in FIG. 12B. The light-orange curve in FIG. 13 shows that the hybrid sparsity advantage reaches about 0.55 for 20×20×10 networks.

Asymmetric triangle (T3) kernel seed. This is the first non-degenerate (2-dimensional kernel considered here. The orange domino in FIG. 5A and the middle-middle diagrams in FIGS. 10 and 11 illustrate the kernel architecture. The orange plot in FIG. 12A shows how the input-output connectivity changes as random edges are added. Connectivity reaches 99% at about $1.34 \times 10^4$ edges, or about 0.84% density, and 99.9% at about $1.41 \times 10^4$ edges, or about 0.88% density. Locality is roughly 0.24 and 0.28 at these values. LC-plane behavior is represented by the orange curve in FIG. 12B. The orange curve in FIG. 13 shows that the hybrid sparsity advantage reaches about 0.60 for 20×20×10 networks. T3-kernel HLE-nets seem to be comprehensively superior to 3×1-kernel HLE-nets in SLC behavior.

Asymmetric 2×2 (S4) kernel seed. The light-red domino in FIG. 5A and the middle-right diagrams in FIGS. 10 and 11 illustrate this kernel architecture. The light-red plot in FIG. 12A shows how the input-output connectivity changes as random edges are added. Connectivity reaches 99% at about $1.65 \times 10^4$ edges, or about 1.03% density, and 99.9% at about $1.73 \times 10^4$ edges, or about 1.08% density. Locality is roughly 0.20 and 0.24 at these values. LC-plane behavior is represented by the light-red curve in FIG. 12B. The light-red curve in FIG. 13 shows that the hybrid sparsity advantage exceeds 0.25 for 20×20×10 networks. Compared to T3-kernel HLE-nets, S4-kernel HLE-nets sacrifice sparsity for locality. Their main drawback is their asymmetric structure.

D4 kernel seed. Closely-related weighted-random D4-nets were analyzed above. The red domino in FIG. 5A and the lower-left diagrams in FIGS. 10 and 11 illustrate the D4 kernel architecture. The red plot in FIG. 12A shows how the input-output connectivity changes as random edges are added. Connectivity reaches 99% at about $1.61 \times 10^4$ edges, or about 1.01% density, and 99.9% at about $1.65 \times 10^4$ edges, or about 1.03% density. Locality is roughly 0.18 and 0.20 at these values. LC-plane behavior is represented by the red curve in FIG. 12B. The red curve in FIG. 13 shows that the hybrid sparsity advantage exceeds 0.30 for 20×20×10 networks. D4-kernel HLE-nets seem to be comprehensively superior to S4-kernel HLE-nets in SLC behavior. Of course, as explained in previous examples, weighted-random D4-nets and TO-nets can be even better.

D5 kernel seed. The D5 kernel seed is obtained from the D4 kernel seed by "filling in the middle," i.e., by taking the union of the subgraphs defined by the D4 and 1×1 kernel architectures. The brown domino in FIG. 5A and the lower-middle diagrams in FIGS. 10 and 11 illustrate the D5 kernel architecture. The brown plot in FIG. 12A shows how the input-output connectivity changes as random edges are added. Connectivity reaches 99% at about $1.97 \times 10^4$ edges, or about 1.23% density, and 99.9% at about $1.99 \times 10^4$ edges, or about 1.24% density. Locality is roughly 0.15 and 0.16 at these values. LC-plane behavior is represented by the brown curve in FIG. 12B. The brown curve in FIG. 13 shows that the hybrid sparsity advantage is a little less than 0.10 for 20×20×10 networks. Compared to D4-kernel HLE-nets, D5-kernel HLE-nets sacrifice sparsity for locality. They also gain uniformity, since the subgraph generated by the kernel architecture has just one connected component.

3×3 kernel seed. This is the only example here involving a kernel architecture in common use, namely in CNNs. However, the corresponding hybrid networks are new. The black domino in FIG. 12A and the lower-right diagrams in FIGS. 10 and 11 illustrate the D5 kernel architecture. The black plot in FIG. 12A shows how the input-output connectivity changes as random edges are added. Connectivity reaches 99% at about $3.39 \times 10^4$ edges, or about 2.12% density, and 99.9% at about $3.40 \times 10^4$ edges, or about 2.13% density. Locality is roughly 0.15 and both values, no better than for D5-nets, although an advantage does emerge for larger network sizes. LC-plane behavior is represented by the black curve in FIG. 12B. The black curve in FIG. 13 shows a hybrid sparsity disadvantage of about 0.40 for 20×20×10 networks, since 3×3-kernel HLE-nets do not surpass the input-output connectivity of the corresponding random networks until a connectivity level much higher than 99%.

HLE NACA 2

The second specific HLE NACA provided by the present invention involves deterministic nonlocal structure defined via a nonlocal kernel architecture. The only possible non-deterministic aspect of this NACA involves minor adjustment of the edge set after the construction of the output architecture is nearly finished. Although the underlying geometry, lattice, and local structure is chosen in the same way as in the HLE NACA 1, all the steps are listed in detail for reference.

Definition (HLE NACA 2): The following HLE NACA 2 describes how to construct a graded HLE-net $\mathcal{N} = (G, \mathcal{P})$, whose individual output architectures N exhibit two m-homogeneous deterministic kernel architectures, one local and the other sparse and nonlocal.

(a) Geometric data:
  (i) Choose a natural number n. Define $X := \mathbb{R}^{n+1}$, with the Euclidean metric g and the Cartesian product coordinate system $\Psi_x := (x,t)$. The direction of data flow is defined to be the positive-t direction.

(b) Digraph data:
  (i) Choose a lattice $\Lambda \subset \mathbb{R}^{n+1}$,
  (ii) Choose a subset $U \subset \mathbb{R}^{n+1}$. Define $V = \Lambda \cap U$ to be the node set for the network. The full digraph F over V induced by the Cartesian product coordinate system $\Psi_x := (x, t)$ includes an edge between nodes $v = (x, t)$ and $v' = (x', t')$ whenever $t < t'$. The non-empty intersections $\Sigma_r(U) \cap V$ form a finite family $\{V_i\}_{i=0}^{M}$ with strict total order induced by t. Define these to be the network layers.
  (iii) Choose a natural number $\ell$ between 1 and M−1 inclusive. Define an edge set E, and initial and terminal node maps $\alpha$ and $\omega$, by placing an edge between each pair of nodes $(v, v') \in V_i \times V_{i+j}$ for $0 \leq i < i+j \leq i + \ell \leq M$. Define $G = (V, E, \alpha, \omega)$ to be the ambient digraph for the network. By construction, G is dense with respect to F, and is g-homogeneous to radius 1 in the negative direction over $V - \cup_{i=0}^{\ell-1} V_i$. G is strictly graded if $\ell = 1$, and non-strictly graded if $\ell > 1$. Define a metric d on G by restricting the Euclidean metric to V. (G, d) is then a metric digraph.
  (iv) Choose input set $V^- = V_0$ and output set $V^+ = V_M$.

(c) Local data:
  (i) For some node $v \in V$, choose as a kernel seed a pointed metric subgraph $(K_v, d, v)$ of the g-star $\star_{G,1}^-(v)$, whose m-radius k is small compared to the m-diameter of G.
  (ii) Choose padding, if necessary, to define a larger digraph $G' = (V', E', \alpha, \omega')$ that is m-homogeneous to radius k in the negative direction over the node set $W' := V - V^-$. Padding is defined by extending layers to include additional lattice points in directions orthogonal to the t-axis, adding pre-input layers if necessary, and defining edges between all pairs of nodes in layers with indices differing by at most $\ell$.
  (iii) Choose an isometric image of $(K_v, d, v)$ at each node in W'. Define a local kernel architecture $\mathcal{K}$ for G or G' over W' by assigning probability 1 to the edges $E_{\mathcal{K}}$ in the chosen images of $(K_v, d, v)$. By construction, $\mathcal{K}$ is m-homogeneous to radius $k$ and deterministic. There is a unique node-complete subgraph $N_{\mathcal{K}}$ of G or G' with edge set $E_{\mathcal{K}}$.
  (iv) Optionally, prune $N_{\mathcal{K}}$ to obtain a special subgraph, such as a topologically connected component. Reassign the notation $N_{\mathcal{K}}$ to this subgraph.

(d) Nonlocal data:
  (i) Copy and modify items (c) i-iv, to construct a sparse nonlocal kernel seed ($K_\nu'$, d', v') of m-radius $k$ comparable to the m-diameter of G. This yields an m-homogeneous, deterministic, nonlocal kernel architecture Q over a padded node set W", with edge set $E_Q$. Construct a node-complete subgraph of the appropriate ambient digraph, with edge set $F_{\mathcal{K}} \cup E_Q$.
  (ii) Optionally, add or adjust a small number of edges to increase input-output connectivity.
  (iii) Apply further pruning and/or strip away padding if necessary. The resulting subgraph
     N(n, Λ, U, E, α, ω, $V^\pm$, $\mathcal{K}$, Ω)
  of G, viewed as an ANN architecture, is the final output of the HLE NACA 2.

Previous discussion of the general GINACA and the HLE NACA 0 apply to the HLE NACA 2. Possible nondeterminism plays less of a role here than the corresponding step in the HLE NACA 1, since the deterministic nonlocal kernel architecture can usually be chosen to achieve the desired connectivity properties.

HLE NACA 3

The third specific HLE NACA provided by the present invention uses a single (generally) nondeterministic metric-dependent edge-selection process to define both local and nonlocal structure. All the steps are again listed in detail for reference.

Definition (HLE NACA 3: The following HLE NACA $3$ describes how to construct a graded HLE-net $\mathcal{N} = (G, \mathcal{P})$, whose individual output architectures N exhibit a non-deterministic distance-dependent edge-selection process including both local and nonlocal structure.

(a) Geometric data:
  (i) Choose a natural number n. Define $X := \mathbb{R}^{n+1}$, with the Euclidean metric g and the Cartesian product coordinate system $\Psi_x := (x,t)$. The direction of data flow is defined to be the positive-t direction.

(b) Digraph data:
  (i) Choose a lattice $\Lambda \subset \mathbb{R}^{n+1}$
  (ii) Choose a subset $U \subset \mathbb{R}^{n+1}$. Define $V = \Lambda \cap U$ to be the node set for the network. The full digraph F over V induced by the Cartesian product coordinate system $\Psi_x := (x, t)$ includes an edge between nodes $v=(x, t)$ and $v'=(x', t')$ whenever $t < t'$. The non-empty intersections $\Sigma_r(U) \cap V$ form a finite family $\{V_i\}_{i=0}^M$ with strict total order induced by t. Define these to be the network layers.
  (iii) Choose a natural number $\ell$ between 1 and M−1 inclusive. Define an edge set E, and initial and terminal node maps α and ω, by placing an edge between each pair of nodes $(v, v') \in V_i \times V_{i+j}$ for $0 \leq i < i+j \leq i+\ell \leq M$. Define $G=(V, E, α, ω)$ to be the ambient digraph for the network. By construction, G is dense with respect to F, and is g-homogeneous to radius 1 in the negative direction over $V - \bigcup_{i=0}^{\ell-1} V_i$. G is strictly graded if $\ell = 1$, and non-strictly graded if $\ell > 1$. Define a metric d on G by restricting the Euclidean metric to V. (G, d) is then a metric digraph.
  (iv) Choose input set $V^- = V_0$ and output set $V^+ = V_M$.

(c) Local/nonlocal data: Let $\Omega: [0, \infty) \to I$ be a function. Include each edge $e \in E$ in the network with probability $\omega(\ell(e))$, where $\ell(e)$ is the edge length.

(d) Optionally, add or adjust a small number of edges to increase input-output connectivity.

(e) The resulting node-complete subgraph
   N(n, Λ, U, E, α, ω, $V^\pm$, Ω)
of G, viewed as an ANN architecture, is the final output of the HLE NACA 3.

Previous discussion of the general GINACA and the HLE NACA 0 apply to the HLE NACA 3. The conceptual intent of the HLE NACA 3 is that the function Q defines a "fuzzy kernel architecture," where sufficiently short edges are selected with high probabilities, while longer edges are selected with low probability. Such a function may have deterministic aspects, since $\Omega(\ell(e))$ may be equal to 1 for certain edge lengths. Perhaps the most interesting choices of Ω for the purposes of constructing SLC architectures are monotone non-increasing functions that decay rapidly outside a certain radius $\ell(e) = r$. These include inverse powers, decaying exponentials, and one-sided Gaussians. One may also choose piecewise-defined functions composed of a constant or slowly-decaying local part and a rapidly decaying nonlocal part. Of course, the domains of all these functions are actually discrete.

Hybrid Lattice-Torus Networks (HLT-Nets)

This section provides NACAs for hybrid lattice-torus networks, or HLT-nets, again focusing on the case of a non-degenerate local kernel architecture. To preview the terminology, elaborated below, hybrid means that these NACAs combine local structure, often deterministic, with nonlocal structure, often non-deterministic; torus means that the underlying manifold X is $T^n \times \mathbb{R}$, where $T^n$ is regarded as (an appropriately-scaled version of) the quotient $\mathbb{R}^n / \mathbb{Z}^n$ with the quotient metric, X has the product metric, and the family of coordinate systems T on X is the Cartesian product family $\Psi_x := \{(x_i, t)\}_{i \in \mathcal{I}}$ given by combining any reasonable family of coordinate systems $\Psi_T := \{x_i\}_{i \in \mathcal{I}}$ on $T^n$ with the usual t-coordinate on $\mathbb{R}$, where $\mathcal{I}$ is some index set. Lattice means that the node set $\mathbb{R}V$ is a finite subset of a (smaller-scale) lattice on $T^n$; non-degenerate means that the local kernel architecture, when one is used, has dimension at least n.

Although the torus $T^n$ is usually identified with $\mathbb{R}^n / \mathbb{Z}^n$ for purposes of simplicity, a much larger scale is typically used for $T^n$ itself than for discrete structure on $T^n$. For example, $T^n$ might be regarded, at a more-detailed level, as $\mathbb{R}^n / \mathbb{Z}^n$ for some large integer L, while V might be a subset of (the quotient of) $\mathbb{Z}^n$ on $T^n$. Alternatively, if $T^n$ is regarded as $\mathbb{R}^n / \mathbb{Z}^n$, V might be a subset of (the quotient of) the small-scale lattice $(1/L)\mathbb{Z}^n$.

An obvious modification of this construction is to replace the torus $T^n$ with a different quotient space, for example, a quotient space defined by gluing together equivalent faces of a convex polytope in $\mathbb{R}^n$. Since $T^n$ is the quotient space of a hyper $\mathbb{R}$ cube with opposite faces glued together, similar constructions involving steps such as gluing together opposite faces of a regular dodecahedron obviously fall under the same conceptual umbrella provided that they achieve sparse local connected architecture via a combination of local structure and sparse nonlocal structure. An basic restriction to such constructions is that the quotient operation must avoid creating cycles of data flow, since the networks constructed under the present invention are exclusively feedforward networks (FFNs).

Definition (Torus Networks): Let $X := T^n \times \mathbb{R}$ with the Cartesian product metric, and let $\Psi_x = \{(x_i, t)\}_{i \in \mathcal{I}}$ be the Cartesian product family of coordinate systems on $T^n \times \mathbb{R}$ induced by an appropriate family of coordinate systems $\Psi_T := \{x_i\}_{i \in \mathcal{I}}$ on $T^n$. Let $V \subset X$ be a finite subset, and let G be a dense subgraph of the full digraph F over V induced by $\Psi_x$.

A torus network, or T-net, is a G-network $\mathcal{N} = (G, \mathcal{P})$ for such a choice of G. A lattice-torus network, or LT-net, is a T-net whose node set V is a subset of a lattice $\Lambda \subset X$. A local lattice-torus network, or LLT-net, is a LT-net whose SSP is defined in terms of local structure, usually defined via a local kernel architecture $\mathcal{K}$. A random lattice-torus network, or RLT-net, is a LT-net whose SSP is defined via a weighted-random edge-selection process $\Omega$. A hybrid lattice-torus network, or HLT-net, is a LT-net whose SSP combines local structure, usually defined via a local kernel architecture $\mathcal{K}$, and nonlocal structure, usually defined via a weighted-random edge-selection process $\Omega$.

Many of the clarifying remarks about Euclidean networks included above also apply to torus networks, and to obvious modifications in which $T^n$ is replaced by a different quotient space such as a one given by gluing together pairs of equivalent faces of a convex polytope. As in the case of E-nets, other families of such networks may be specified by combining the properties "sparse," "local," "connected," "lattice," "torus," "random," and "hybrid" in different ways. In this section, "L" means "lattice" unless stated otherwise. The underlying manifold X for a T-net is actually not the torus $T^n$ itself, but a cylinder $T^n \times \mathbb{R}$ over the torus, and similarly for networks involving different quotient spaces. However, the term "torus network" is useful for descriptive purposes, since any FFN may be realized as a cylinder network over some base. Any T-net may be realized as a E-net, and vice versa, for example, by embedding $T^n$ in a higher dimensional Euclidean space, or by scaling a node set in $\mathbb{R}^{n+1}$ to fit inside a single unit hypercube in $\mathbb{R}^{n+1}$ before forming the quotient space. However, some networks are realized more naturally as one type of network than the other. NACAs for HLE and HLT-nets generally define distinct classes of networks. Unlike the case of E-nets, the constant-t "spatial sections" of the underlying manifold X in a T-net are compact. This gives the option of including all lattice points within a certain t-interval in the node set V. This can eliminate "spatial boundary effects," which is one of the principal advantages of T-nets. In particular, it facilitates construction of networks with "modular arithmetic," similar to RadiX-Nets, in which structural building blocks "wrap around" the compact geometry. Obvious modifications of this idea can lead to networks that exhibit modular arithmetic in some directions but not others.

HLT NACA 0

A general NACA for constructing HLT-nets is now provided. It is numbered 0, to distinguish it from subsequent special cases with positive integer labels.

Definition: The general hybrid lattice-torus network architecture construction algorithm, or HLT NACA 0, has the following steps:

(a) Geometric data:
  (i) Choose a natural number n. Define $X := T^n \times \mathbb{R}$ with the Cartesian product metric induced by the quotient metric on $T^n \cong \mathbb{R}^n / \mathbb{Z}^n$. Equivalently, X is the quotient space given by identifying the first n pairs of opposite faces of an (n+1)-dimensional hypercube.
  (ii) Choose a family $\Psi_T := \{x_i\}_{i \in J}$ of coordinate systems on $T^n$. Define the unique corresponding family $\Psi_X = \{(x_i, t)\}_{i \in J}$ of coordinate systems on X via the Cartesian product. The direction of data flow is defined to be the positive-t direction.

(b) Digraph data:
  (i) Choose a lattice $\Lambda \subset X$, and a subset $U \subset X$. Define $V = \Lambda \cap U$ as the node set for the network. Let $F = (V, E_F, \alpha_F, \omega_F)$ be the full digraph over V induced by $\Psi_x$.
  (ii) Choose an edge set $E \subset E_F$, and define initial and terminal node maps $\alpha, \omega: E \to V$ by restricting $\alpha_F$ and $\omega_F$, such that the digraph $G := (V, E, \alpha, \omega)$ is dense with respect to F. G is the ambient digraph for the network. Define a metric d on G by restricting g to V. (G, d) is then a metric digraph.
  (iii) Choose input and output node sets $V^\pm \subset V$ as subsets of the sets of maximal and minimal nodes of G, respectively.

(c) Local data:
  (i) Optionally, choose a subset $W \subset V$, called the homogeneous node set, over which G is g- or m-homogeneous to some radius in the negative direction.
  (ii) Optionally, choose padding for G to yield a larger digraph $G' = (V', E', \alpha', \omega')$, homogeneous over a larger node set.
  (iii) For some node $v \in V$, choose as a kernel seed a pointed metric subgraph $(K_v, d, v)$ of the g-star $\overset{\star}{\star}_{G,1}^-(v)$, of small m-radius, where d is the metric on G restricted to $K_v$.
  (iv) Choose an isomorphic or isometric image of $(K_v, d, v)$ at each node in some set W' of V or V'.
  (v) Choose a kernel architecture $\mathcal{K}$ over W' by assigning probabilities to the edges in the chosen images of $(K_v, d, v)$.
  (vi) Choose an edge set $E_\mathcal{K}$ for a node-complete subgraph $N_\mathcal{K}$ of G or G' by applying the probabilities encoded by $\mathcal{K}$.
  (vii) Optionally, repeat items i through vi with additional kernel architectures, to choose different types of local or mesoscale structure. Denote by $N_\mathcal{K}$ the subgraph of G or G' defined by all desired kernel architectures.
  (viii) Optionally, prune $N_\mathcal{K}$ to obtain a special subgraph, such as a topologically connected component. Reassign the notation $N_\mathcal{K}$ to this subgraph.

(d) Nonlocal data:
  (i) Choose and apply a nonlocal edge-selection process $\Omega$ to the dual graph $N_\mathcal{K}^*$ of $N_\mathcal{K}$, to augment the existing structure of $N_\mathcal{K}$ with an addition set $E_\Omega$ of edges from $E - E_\mathcal{K}$.
  (ii) Optionally, add or adjust a small number of edges to increase input-output connectivity.
  (iii) Strip away padding if necessary. The resulting subgraph
  $N(n, \Psi_T, \Lambda, U, E, \alpha, \omega, V^\pm, \mathcal{K}, \Omega)$
  of G, viewed as an ANN architecture, is the final output of the HLT NACA 0.

Previous discussion of the general GINACA applies to the HLT NACA 0. The simplest choice of coordinates for S consists of two "overlapping semicircular" charts, and this produces a simple and concrete choice of $2^n$ charts on $T^n$ via the Cartesian product. In some cases, judicious choice of U can eliminate the need for pruning. Choice of U could be placed either in "geometric data" or "digraph data." The latter is chosen principally because it facilitates a convenient notion of "scaling networks of the same shape" via dilation of U by a constant factor. U may be chosen to be compact without loss of generality, since V must be finite. "Spatial" padding plays no role in cases where "spatial sections" include every available node.

HLT NACA 1

More-specific HLT NACAs provided by the present invention are now described.

Definition: The following HLT NACA 1 describes how to construct a graded HLT-net $\mathcal{N} = (G, \mathcal{P})$, whose individual output architectures N exhibit a m-homogeneous deterministic local kernel architecture, and a weighted-random family of nonlocal edges.

1. Geometric Data:
   (a) Choose a natural number n. Define $X:=T^n\times \mathbb{R}$ with the Cartesian product metric induced by the quotient metric on $T^n \cong \mathbb{R}^n/\mathbb{Z}^n$. Equivalently, X is the quotient space given by identifying the first n pairs of opposite faces of an (n+1)-dimensional hypercube.
   (b) Choose a family $\Psi_T:=\{x_1\}_{i\in \mathcal{I}}$ of coordinate systems on $T^n$. Define the unique corresponding family $\Psi_x=\{(x_i,t)\}_{i\in \mathcal{I}}$, of coordinate systems on X via the $\{(x_i,t)\}_{i\in \mathcal{I}}$ Cartesian product. The direction of data flow is defined to be the positive-t direction.
2. Digraph Data:
   (i) Choose a lattice $\Lambda \subset X$.
   (ii) Choose a subset $U \subset X$. Define $V=\Lambda \cap U$ to be the node set for the network. The full digraph F over V induced by the Cartesian product coordinate system $\Psi_x:=(x, t)$ includes an edge between nodes $v=(x, t)$ and $v'=(x', t')$ whenever $t<t'$. The non-empty intersections $\Sigma_r(U)\cap V$ form a finite family $\{V_i\}_{i=0}^M$ with strict total order induced by t. Define these to be the network layers.
   (iii) Choose a natural number $\ell$ between 1 and M−1 inclusive. Define an edge set E, and initial and terminal node maps $\alpha$ and $\omega$, by placing an edge between each pair of nodes $(v, v')\in V_i\times V_{i+j}$ for $0\le i<i+j\le i+\ell \le M$. Define $G=(V, E, \alpha, \omega)$ to be the ambient digraph for the network. By construction, G is dense with respect to F, and is g-homogeneous to radius 1 in the negative direction over $V-\bigcup_{i=0}^{\ell-1} V_i$. G is strictly graded if $\ell=1$, and non-strictly graded if $\ell>1$. Define a metric d on G by restricting the Euclidean metric to V. (G, d) is then a metric digraph.
   (iv) Choose input set $V^-=V_0$ and output set $V^+=V_M$.
3. Local Data:
   (i) For some node $v\in V$, choose as a kernel seed a pointed metric subgraph $(K_v, d, v)$ of the g-star $\star_{G,1}^-(v)$, whose m-radius $k$ is small compared to the m-diameter of G.
   (ii) Choose padding, if necessary, to define a larger digraph $G'=(V',E', \alpha', \omega')$ that is m-homogeneous to radius k in the negative direction over the node set $W':=V-V^-$. Padding is defined by extending layers to include additional lattice points in directions orthogonal to the t-axis (if V does not already include all node in each constant-t section), adding pre-input layers if necessary, and defining edges between all pairs of nodes in layers with indices differing by at most $\ell$.
   (iii) Choose an isometric image of $(K_v, d, v)$ at each node in W'. Define a kernel architecture $\mathcal{K}$ for G or G' over W' by assigning probability 1 to the edges $E_{\mathcal{K}}$ in the chosen images of $(K_v, d, v)$. By construction, $\mathcal{K}$ is m-homogeneous to radius k and deterministic. There is a unique node-complete subgraph $N_{\mathcal{K}}$ of G or G' with edge set $E_{\mathcal{K}}$.
   (iv) Optionally, prune $N_{\mathcal{K}}$ to obtain a special subgraph, such as a topologically connected component. Reassign the notation $N_{\mathcal{K}}$ to this subgraph.
4. Nonlocal Data:
   (i) Choose and apply a weighted-random edge-inclusion or edge-addition process $\Omega$ to the dual graph $N_{\mathcal{K}}^*$ of $N_{\mathcal{K}}$ to augment the existing structure of $N_{\mathcal{K}}$ with edges from $E-E_{\mathcal{K}}$.
   (ii) Optionally, add or adjust a small number of edges to increase input-output connectivity.
   (iii) Apply further pruning and/or strip away padding if necessary. The resulting subgraph
   $N(n, \Psi_T, \Lambda, U, E, \alpha, \omega, V^\pm, \mathcal{K}, \Omega)$
   of G, viewed as an ANN architecture, is the final output of the HLT NACA 1.

Previous discussion of the general GINACA and the HLT NACA 0 apply to the HLT NACA 1. G is connected if there are at least two layers V. The subset U need not be connected; in fact, consecutive nonempty intersections $V_i=\Sigma_r(U)\cap V$ and $V_{i+1}=\Sigma_r(U)\cap V$ may be "far apart" with respect to t, since empty intersections do not $E_{\mathcal{K}}$ count as layers. The subsets of $E-E_{\mathcal{K}}$ defining the partition for $\Omega$ usually consist of all (remaining) edges between pairs of layers of G, or all (remaining) edges of a given length, or within a given length range.

HLT NACA 2

The second specific HLT NACA provided by the present invention involves deterministic nonlocal structure defined via a nonlocal kernel architecture. The only possible non-deterministic aspect of this NACA involves minor adjustment of the edge set after the output is nearly finished. Although the underlying geometry, lattice, and local structure is chosen in the same way as in the HLT NACA 1, all steps are listed in detail for reference.

Definition: The following HLT NACA 2 describes how to construct a graded HLT-net $\mathcal{N}=(G, \mathcal{P})$, producing individual output architectures N, with two m-homogeneous deterministic kernel architectures, one local and the other sparse and nonlocal.

1. Geometric data:
   (a) Choose a natural number n. Define $X:=T^n\times \mathbb{R}$ with the Cartesian product metric induced by the quotient metric on $T^n \approx \mathbb{R}^n/\mathbb{Z}^n$. Equivalently, X is the quotient space given by identifying the first n pairs of opposite faces of an (n+1)-dimensional hypercube.
   (b) Choose a family $\Psi_T:=\{x_i\}_{i\in \mathcal{I}}$ of coordinate systems on $T^n$. Define the unique corresponding family $\Psi_x=\{(x_i,t)\}_{i\in \mathcal{I}}$ of coordinate systems on X via the Cartesian product. The direction of data flow is defined to be the positive-t direction.
2. Digraph data:
   (i) Choose a lattice $\Lambda \subset X$.
   (ii) Choose a subset $U \subset X$. Define $V=\Lambda \cap U$ to be the node set for the network. The full digraph F over V induced by the Cartesian product coordinate system $\Psi_x:=(x, t)$ includes an edge between nodes $v=(x, t)$ and $v'=(x', t')$ whenever $t<t'$. The non-empty intersections $\Sigma_r(U)\cap V$ form a finite family $\{V_i\}_{i=0}^M$ with strict total order induced by t. Define these to be the network layers.
   (iii) Choose a natural number $\ell$ between 1 and M−1 inclusive. Define an edge set E, and initial and terminal node maps $\alpha$ and $\omega$, by placing an edge between each pair of nodes $(v, v')\in V_i\times V_{i+j}$ for $0\le i<i+j\le i+\ell \le M$. Define $G=(V, E, \alpha, \omega)$ to be the ambient digraph for the network. By construction, G is dense with respect to F, and is g-homogeneous to radius 1 in the negative direction over $V-\bigcup_{i=0}^{\ell-1} V_i$. G is strictly graded if $\ell=1$, and non-strictly graded if $\ell>1$. Define a metric d on G by restricting the Euclidean metric to V. (G, d) is then a metric digraph.
   (iv) Choose input set $V^-=V_0$ and output set $V^+=V_M$.

3. Local data:
   (i) For some node v∈V, choose as a kernel seed a pointed metric subgraph $(K_v, d, v)$ of the g-star $\star_{G,1}^-(v)$, whose m-radius k is small compared to the m-diameter of G.
   (ii) Choose padding, if necessary, to define a larger digraph $G'=(V', E', \alpha', \omega')$ that is m-homogeneous to radius $k$ in the negative direction over the node set $W':=V-V^-$. Padding is defined by extending layers to include additional lattice points in directions orthogonal to the t-axis (if V does not already include all node in each constant-t section), adding pre-input layers if necessary, and defining edges between all pairs of nodes in layers with indices differing by at most $\ell$.
   (iii) Choose an isometric image of $(K_v, d, v)$ at each node in W'. Define a kernel architecture $\mathcal{K}$ for G or G' over W' by assigning probability 1 to the edges $E_\mathcal{K}$ in the chosen images of $(K_v, d, v)$. By construction, $\mathcal{K}$ is m-homogeneous to radius $k$ and deterministic. There is a unique node-complete subgraph $N_\mathcal{K}$ of G or G' with edge set $E_\mathcal{K}$.
   (iv) Optionally, prune $N_\mathcal{K}$ to obtain a special subgraph, such as a topologically connected component. Reassign the notation $N_\mathcal{K}$ to this subgraph.

4. Nonlocal data:
   (i) Copy and modify HLT NACA 1 item 3, replacing the local kernel seed $(K_v, d, v)$ (item ??) with a sparse seed $(K_v', d', v')$ of n-radius k comparable to the n-diameter of G. This defines an n-homogeneous, deterministic, nonlocal kernel architecture Q over W', with edge set $E_Q$. Construct a node-complete subgraph of the appropriate ambient digraph, with edge set $E_\mathcal{K} \cup E_Q$.
   (ii) Optionally, add or adjust a small number of edges to increase input-output connectivity.
   (iii) Apply further pruning and/or strip away padding if necessary. The resulting subgraph
   $N(n, \Psi_T, \Lambda, U, E, \alpha, \omega, V^\pm, \mathcal{K}, Q)$
   of G, viewed as an ANN architecture, is the final output of the HLT NACA 2.

Previous discussion of the general GINACA and the HLT NACA 0 apply to the HLT NACA 2. The optional step of adding or adjusting a small number of edges to increase input-output connectivity is the only step of the HLT NACA 2 that can involve any nondeterminism. This step plays less of a role than the corresponding step in the HLT NACA 1, since the deterministic nonlocal kernel architecture can usually be chosen to achieve the desired connectivity properties. This step can still play a role in compensating for boundary effects, but these are less-pronounced than in the HLE case, since constant-t sections of the cylinder are compact without boundary.

HLT NACA 3

The third specific HLT NACA provided by the present invention uses a single (generally) nondeterministic metric-dependent edge-selection process to define both local and nonlocal structure. All steps are again listed for reference.

Definition: The following HLT NACA 3 describes how to construct a graded HLT-net $\mathcal{N}=(G, \mathcal{P})$, whose individual output architectures N exhibit a non-deterministic $\mathcal{N}$ distance-dependent edge-selection process including both local and nonlocal structure.

(a) Geometric data:
   (i) Choose a natural number n. Define $X:=T^n \times \mathbb{R}$ with the Cartesian product metric induced by the quotient metric on $T^n \cong \mathbb{R}^n/\mathbb{Z}^n$. Equivalently, X is the quotient space given by identifying the first n pairs of opposite faces of an (n+1)-dimensional hypercube.
   (ii) Choose a family $\Psi_T := \{\mathbf{x}_i\}_{i \in \mathcal{I}}$, of coordinate systems on $T^n$. Define the unique corresponding family $\Psi_X = \{(\mathbf{x}_i, t)\}_{i \in \mathcal{I}}$ of coordinate systems on X via the Cartesian product. The direction of data flow is defined to be the positive-t direction.

(b) Digraph data:
   (i) Choose a lattice $\Lambda \subset X$.
   (ii) Choose a subset $U \subset X$. Define $V = \Lambda \cap U$ to be the node set for the network. The full digraph F over V induced by the Cartesian product coordinate system $\Psi_x := (x, t)$ includes an edge between nodes $v=(x, t)$ and $v'=(x', t')$ whenever $t<t'$. The non-empty intersections $\Sigma_t(U) \cap V$ form a finite family $\{V_i\}_{i=0}^M$ with strict total order induced by t. Define these to be the network layers.
   (iii) Choose a natural number $\ell$ between 1 and M−1 inclusive. Define an edge set E, and initial and terminal node maps $\alpha$ and $\omega$, by placing an edge between each pair of nodes $(v, v') \in V_i \times V_{i+j}$ for $0 \leq i < i+j \leq i+\ell \leq M$. Define $G=(V, E, \alpha, \omega)$ to be the ambient digraph for the network. By construction, G is dense with respect to F, and is g-homogeneous to radius 1 in the negative direction over $V - \bigcup_{i=0}^{\ell-1} V_i$. G is strictly graded if $\ell=1$, and non-strictly graded if $\ell>1$. Define a metric d on G by restricting the Euclidean metric to V. (G, d) is then a metric digraph.
   (iv) Choose input set $V^-=V_0$ and output set $V^+=V_M$.

(c) Local/nonlocal data: Let $\Omega: [0, \infty) \to I$ be a function. Include each edge $e \in E$ in the network with probability $\Omega(\ell(e))$, where $\ell(e)$ is the edge length.

(d) Optionally, add or adjust a small number of edges to increase input-output connectivity.

(e) Apply further pruning and/or strip away padding if necessary. The resulting subgraph
$N(n, \Psi_T, \Lambda, U, E, \alpha, \omega, V^\pm, \Omega)$
of G, viewed as an ANN architecture, is the final output of the HLT NACA 3.

Previous discussion of the general GINACA and the HLT NACA 0 apply to the HLT NACA 3. The conceptual intent of the HLT NACA 3 is that the function Q defines a "fuzzy kernel architecture," where sufficiently short edges are selected with high probabilities, while longer edges are selected with low probability. Such a function may have deterministic aspects, since $\Omega(\ell(e))$ may be equal to 1 for certain edge lengths. The functions of rapid decay on $[0, \infty)$ typically used for $\Omega$ in the HLE case do not apply directly in the HLT case due to the compact geometry of constant-t sections of the cylinder $T^n \times \mathbb{R}$. Instead functions may be used that reach a minimum at the maximal edge length. Issues involving existence of certain function types on compact manifolds (for example, in complex analysis) do not play a role since the domains of these functions are actually discrete.

The invention claimed is:

1. A method of constructing a geometry-induced sparse hybrid-local-nonlocal highly-connected artificial neural network architecture, the method comprising:
at least one processing unit, a computer readable memory and a computer non-transitory readable storage medium associated with a computing device;

choosing a geometry defined in terms of a manifold;
choosing a direction of data flow in the geometry;
choosing a node set as a finite subset of the geometry, where nodes specify the locations of artificial neurons in the geometry-induced sparse hybrid-local-nonlocal highly-connected artificial neural network architecture;
partitioning the node set into layers with respect to the geometry and the direction of data flow, wherein each node belongs to a unique layer of the layers, and wherein the layers are ordered, wherein a first layer of the layers is called an input layer and a last layer of the layers is called an output layer;
choosing local edges between each node in each non-input layer of the layers and nearby nodes in one or more preceding layers of the layers with respect to the geometry and the direction of data flow, wherein a degree of locality of the local edges is restricted by limiting connections to the one or more preceding layers to be among the $\sqrt{N}$ closest nodes as defined by the geometry, where N is the number of nodes in the one or more preceding layers, and wherein the local edges specify physical locations of local synaptic connections between pairs of artificial neurons in the geometry-induced sparse hybrid-local-nonlocal highly-connected artificial neural network architecture;
choosing sparse nonlocal edges between each node in the each non-input layer and nodes in one or more preceding layers with respect to the geometry and the direction of data flow, wherein the nodes in the one or more preceding layer connected to at this step are not among the nodes connected via the local edges chosen in the previous step, and wherein the nonlocal edges specify physical locations of nonlocal synaptic connections between pairs of artificial neurons in the geometry-induced sparse hybrid-local-nonlocal highly-connected artificial neural network architecture;
modifying a predetermined percentage of the local synaptic connections and the nonlocal synaptic connections to achieve a specific target connectivity or to accommodate boundary effects;
implementing the geometry-induced sparse hybrid-local-nonlocal highly-connected artificial neural network architecture concretely complete by assigning edge weights to each synaptic connection and activation functions to each artificial neuron; and
training the geometry-induced sparse hybrid-local-nonlocal highly-connected artificial neural network architecture using at least one physical dataset, wherein the training is accomplished by means of a gradient descent algorithm and wherein the trained network geometry-induced sparse hybrid-local-nonlocal highly-connected artificial neural network architecture performs operations that solve specified problems and/or carry out specified tasks.

2. The method of claim 1, wherein at least ninety (90) percent of the local and nonlocal edges in the geometry-induced sparse hybrid-local-nonlocal highly-connected artificial neural network architecture connect pairs of nodes whose distance from each other is at most ten (10) percent of the size of the largest dimension of either of corresponding layers.

3. The method of claim 1, wherein the input-output connectivity of the geometry-induced sparse hybrid-local-nonlocal highly-connected artificial neural network architecture is greater than the average input-output connectivity of a random network having the same shape and size and the same total number of edges.

4. The method of claim 1, wherein the local edges are defined via a family of kernel architectures, where each kernel specifies a family of local synaptic connections between a single artificial neuron in a given layer and a family of nearby artificial neurons in a preceding layer, and wherein a kernel architecture consists of a choice of kernel for each neuron in a given layer; and wherein the nonlocal edges are defined via a weighted-random edge selection process.

5. The method of claim 4, further comprising, locking-together corresponding edges in different kernels in the given layer in a weight sharing scheme during the training process, wherein the gradient descent algorithm changes each of the locked-together weights in the same way so that they maintain their relative relationships throughout the training process, where different numbers of weights may be shared at different neurons, and where the weights assigned to the nonlocal edges are allowed to vary independently during the geometry-induced sparse hybrid-local-nonlocal highly-connected artificial neural network architecture training.

6. The method of claim 5, wherein each layer of the layers is partitioned into multiple sublayers in which weight sharing in the kernel architecture between any given pair of sublayers is independent of weight sharing in the kernel architecture between any other pair of sublayers.

7. A method of constructing a Euclidean sparse hybrid-local-nonlocal highly-connected artificial neural network comprising:
at least one processing unit, a computer readable memory and a computer non-transitory readable storage medium associated with a computing device;
choosing a finite dimensional Euclidean space;
choosing a direction of data flow as one axis of the Euclidean space;
choosing a node set consisting of a finite subset of the finite dimensional Euclidean space, where nodes specify the physical locations of artificial neurons in a finished network;
partitioning the node set into layers with respect to the direction of data flow;
choosing local edges between each node and the nodes within a predetermined degree of relationship in preceding layers with respect to the direction of data flow, wherein the local edges specify physical locations of local synaptic connections between pairs of artificial neurons in the finished network;
choosing sparse nonlocal edges between each node and the nodes outside a predetermined degree of relationship in preceding layers with respect to the direction of data flow, wherein the nonlocal edges specify physical locations of nonlocal synaptic connections between pairs of artificial neurons in the finished network,
modifying a predetermined percentage of the local synaptic connections and the nonlocal synaptic connections to achieve a specific target connectivity or to accommodate boundary effects;
implementing the resulting architecture as the Euclidean sparse hybrid-local-nonlocal highly-connected artificial neural network complete with edge weights associated with each synaptic connection and activation functions associated with each artificial neuron;
and training the Euclidean sparse hybrid-local-nonlocal highly-connected artificial neural network using at least one physical dataset, wherein the training is accomplished by means of a gradient descent algorithm, wherein the Euclidean sparse hybrid-local-nonlocal highly-connected artificial neural network performs operations that solve specified problems or carry out specified tasks.

8. The method of claim 7, wherein the local edges are defined via a family of kernel architectures, wherein each kernel specifies a family of local synaptic connections between a single artificial neuron in a given layer and a family of nearby artificial neurons in a preceding layer, and wherein a kernel architecture consists of a choice of kernel for each neuron in a given layer, and wherein the nonlocal edges are defined via a weighted-random edge selection process.

9. The method of claim 8, further comprising, locking-together corresponding edges in different kernels in a given layer in a weight sharing scheme during the Euclidean sparse hybrid-local-nonlocal highly-connected artificial neural network training, wherein the gradient descent algorithm changes each of the locked-together weights in the same way so that they maintain their relative relationships throughout the training process, where different numbers of weights may be shared at different neurons, and where the weights assigned to the nonlocal edges are allowed to vary independently during the Euclidean sparse hybrid-local-nonlocal highly-connected artificial neural network training.

10. The method of claim 9, wherein each layer of the layers is partitioned into multiple sublayers in which weight sharing in the kernel architecture between any given pair of sublayers is independent of weight sharing in the kernel architecture between any other pair of sublayers.

11. The method of claim 7, wherein the training process producing the finished network is periodically stopped and restarted with user-predefined hyperparameters, where hyperparameters consist of quantities including but not limited to learning rate, decay rates, batch size, and dropout rate, and wherein edges are pruned during network training based either on a weight threshold, a connectivity condition, or a degree condition, and wherein new edges are added during the training process based either on a condition governing the total number of edges at each point during training, a connectivity condition, or a weight sharing condition.

12. The method of claim 8, wherein the kernels defining the kernel architectures in each layer are ball kernels, where a ball kernel assigns nonzero edge connection probabilities between a given node in a given layer and the subset of nodes falling within a certain fixed distance of a single point in a previous layer.

13. The method of claim 7, wherein each network is either a Diamond 4 network, a Diamond 5 network, or a Tetra-octa-net network determined on a layer-by-layer basis.

14. The method of claim 8, wherein a different weighted random edge selection process is used for each pair of layers.

15. A method of constructing a non-Euclidean sparse hybrid-local-nonlocal highly-connected artificial neural-network comprising:

at least one processing unit, a computer readable memory and a computer non-transitory readable storage medium associated with a computing device;

choosing a non-Euclidean space defined in terms of a manifold;

choosing a direction of data flow as one of the axes of a local coordinate system on the non-Euclidean space;

choosing a node set consisting of a finite subset of the non-Euclidean space, where nodes specify physical locations of artificial neurons in a finished network;

partitioning the node set into layers with respect to the direction of data flow;

choosing local edges between each node and nodes within a specified locality in preceding layers with respect to the geometry and the direction of data flow, wherein the local edges specify physical locations of local synaptic connections between pairs of artificial neurons in the finished network;

choosing sparse nonlocal edges between each node and nodes outside a specified locality in preceding layers with respect to the geometry and the direction of data flow, wherein the nonlocal edges specify physical locations of nonlocal synaptic connections between pairs of artificial neurons in the finished network, and wherein both the local and the nonlocal edges are present among the edges connecting a majority of pairs of connected layers;

modifying a small percentage of the local synaptic connection and the nonlocal synaptic connections to achieve a specific target connectivity or to accommodate boundary effects;

implementing the resulting architecture as the non-Euclidean sparse hybrid-local-nonlocal highly-connected artificial neural-network complete with edge weights associated with each of the local synaptic connection, nonlocal synaptic connection and activation functions associated with each artificial neuron;

training the non-Euclidean sparse hybrid-local-nonlocal highly-connected artificial neural-network using at least one physical dataset, where the training is accomplished by means of a gradient descent algorithm, and wherein the trained the non-Euclidean sparse hybrid-local-nonlocal highly-connected artificial neural-network performs operations that solve specified problems or carry out specified tasks.

16. The method of claim 15, wherein the locality of the finished network is within a predetermined range and the input-output connectivity of the finished network is a predetermined multiple greater than that of the separate local and nonlocal subnetworks.

17. The method of claim 15, wherein the local edges are defined via a family of kernel architectures, where each kernel specifies, either deterministically or nondeterministically, a family of local synaptic connections between a single artificial neuron in a given layer and a family of nearby artificial neurons in a preceding layer, and where a kernel architecture consists of a choice of kernel for each neuron in a given layer.

18. The method of claim 15, wherein the input-output connectivity of the finished network is at least twice as great as the average input-output connectivity of a totally random network having the same shape and size and the same total number of edges.

19. The method of claim 15, wherein the weights assigned to the local edges are initiated with a different statistical distribution than the weights assigned to the nonlocal edges, and wherein the weights assigned to the nonlocal edges are allowed to vary independently during the finished network training.

20. The method of claim 15, further comprising, pruning the local and nonlocal edges based on a weight threshold, a connectivity condition, and/or a degree condition arising during the finished network training process, and creating new edges based on a condition associated with the total number of edges, a connectivity condition, and/or a weight sharing condition arising during the finished network training process.

* * * * *